United States Patent
Bodnar et al.

(10) Patent No.: US 6,232,970 B1
(45) Date of Patent: May 15, 2001

(54) USER INTERFACE METHODOLOGY SUPPORTING LIGHT DATA ENTRY FOR MICROPROCESSOR DEVICE HAVING LIMITED USER INPUT

(75) Inventors: Eric O. Bodnar; Jennifer J. Lee, both of Santa Cruz; Philippe R. Kahn; Roy W. Feague, both of Scotts Valley; David E. Jorgensen, Campbell; Gwoho H. Liu, Scotts Valley, all of CA (US)

(73) Assignee: Starfish Software, Inc., Scotts Valley, CA (US)

( * ) Notice: Subject to any disclaimer, the term of this patent is extended or adjusted under 35 U.S.C. 154(b) by 0 days.

(21) Appl. No.: 09/187,007

(22) Filed: Nov. 4, 1998

Related U.S. Application Data

(63) Continuation-in-part of application No. 08/905,463, filed on Aug. 4, 1997.
(60) Provisional application No. 60/098,607, filed on Aug. 31, 1998, and provisional application No. 60/093,949, filed on Jul. 23, 1998.

(51) Int. Cl.[7] ....................................................... G06F 3/00
(52) U.S. Cl. ......................... 345/338; 345/352; 345/963; 707/505
(58) Field of Search .................................... 345/357, 356, 345/339, 348, 352, 353, 354, 145, 146, 157, 160, 963, 336, 338; 707/505, 507

(56) References Cited

U.S. PATENT DOCUMENTS

| | | | |
|---|---|---|---|
| 5,398,310 | * | 3/1995 | Tchao et al. ........................... 345/341 |
| 5,477,447 | * | 12/1995 | Luciw et al. ............................. 704/9 |
| 5,544,358 | * | 8/1996 | Capps et al. ........................... 707/523 |
| 5,588,105 | * | 12/1996 | Foster et al. ........................... 345/326 |
| 5,621,903 | * | 4/1997 | Luciw et al. ........................... 345/326 |
| 5,634,100 | * | 5/1997 | Capps ......................................... 705/9 |
| 5,644,735 | * | 7/1997 | Luciw et al. ........................... 345/338 |
| 5,666,502 | * | 9/1997 | Capps ...................................... 345/352 |
| 5,745,716 | * | 4/1998 | Tchao et al. ........................... 345/350 |
| 5,774,540 | * | 6/1998 | Davidson et al. ...................... 379/387 |
| 5,805,159 | * | 9/1998 | Bertram et al. ....................... 345/339 |
| 5,864,340 | * | 1/1999 | Bertram et al. ....................... 345/352 |

* cited by examiner

*Primary Examiner*—Crescelle N. dela Torre
(74) *Attorney, Agent, or Firm*—John A. Smart

(57) ABSTRACT

A portable computing device or "information appliance" having terse user input (e.g., limit set of keys) is provided with an improved user interface. A six-key embodiment is described that provides a "super-key" light entry and editing input system for ultra-portable devices, thus making it well suited for use with credit card-sized devices. In a preferred six-button embodiment, a credit card-sized device is modified to include an additional input button, an EDIT key. In user operation, pressing the EDIT key brings up a context sensitive pop-up menu, thus invoking the super-key feature. Customized user input controls, such as a Text Input Control (e.g., letter and number strips), are provided at appropriate times, for facilitating input. Underlying the super-key input is a heuristic sub-system that remembers and anticipates user input. In this fashion, the system can present in-context options for each application running on the target device, and present appropriate options during different phases of the execution of a variety of tasks. By remembering what the user has previously inputted and by using context-sensitive menus and adaptive "quick" lists, the system can anticipate what the user needs to do at any given time and can guide the user through a step-by-step process to complete each task, thus facilitating the tasks that users most often perform. By including adaptive techniques or built-in intelligence that allows the device to be faster and easier to use with each user session, the target device may anticipate the tasks users need to perform in specific situations and thus make those tasks increasingly easier.

20 Claims, 55 Drawing Sheets

No participant
🗒 Person in Contacts
🗒 Company in Contacts
✳🗒 New Person
✳🗒 New Company
FIG. 13A
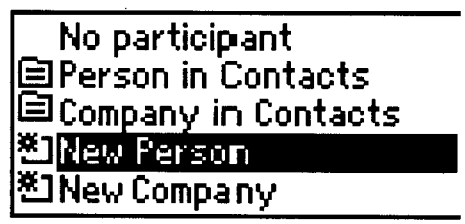
FIG. 13B
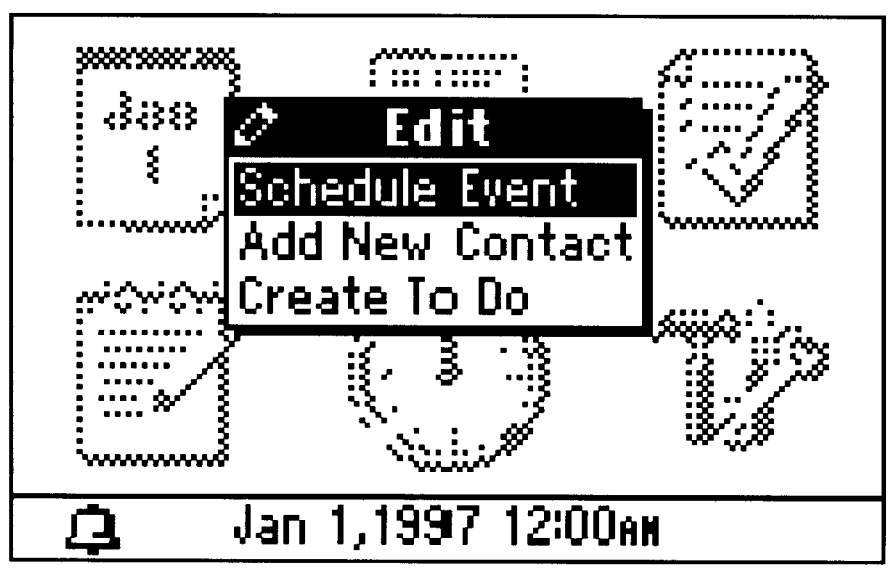
FIG. 13C ⌂ Home Key   ▤ Message (future)      *] New              ▣ Work Address
▯ View Key   ◉ Recording (future)    ▤ Choose Contact    ⌂ Home Address
✎ Edit Key   ⏰ Alarm                 ☻ Meeting           ☎ Phone Number
⊙ Select Key ▣ Battery               ⏲ Event             ▤ Note
             ←→ Left/Right Scroll    ▥ All-Day Event
             ↑↓ Up/Down Scroll       ▤ Multi-Day Event
                                     ▥ Annual Event
                                     ✈ Travel

```
2  Schedule Meeting
Enter the company name.
   With: ✻] New Company
   Name: Westridge Assoc_
  A B C D E F [G] H I J K L M N O P ⌂ Undo     ▭ Numbers    ✐ Done
```

*FIG. 15A*

```
2  Schedule Meeting
Do you wish to file the new entry?
      With: ✻] New Company
      Name: Westridge Associates File? [No            ⇅]

⌂ Undo
```

*FIG. 15B*

```
2  Schedule Meeting
Confirm participant.
      With: ✻] New Company
      Name: Westridge Associates
      File? Business ◁Back ▶Next▶
      ✐ Edit
```

Schedule Meeting
Enter the company name.
With: ✳] New Company
Name: Westridge Assoc_
A B C D E F G H I J K L M N O P
⌂ Undo   🔢 Numbers   ✎ Done

FIG. 23E

Schedule Meeting
Do you wish to file the new entry?
With: ✳] New Company
Name: Westridge Associates
File? [No ▼]
⌂ Undo

FIG. 23F

Schedule Meeting
Confirm participant.
With: ✳] New Company
Name: Westridge Associates
File? Business
✎ Edit   ◀ Back · Next ▶

Adding New Contact

FIG. 24A

Business Contact: Entering Names of People

FIG. 24B

Business Contact: Entering Companies

FIG. 24C

*Business Contact: Filing Contacts in Categories*

FIG. 24D

*Business Contact: Company Information for Business Contacts*

FIG. 24E

*Business Contact: Entering Numbers*

FIG. 24F

*Business Contact: Summary*

FIG. 24G

Create To Do

FIG. 25A

Entering a new description

FIG. 25B

Tasking Calls

FIG. 25C

Specifying a Due Date

Summary

*Smart Entry Assistant Control Flow Methodology 2700*

USER INTERFACE METHODOLOGY SUPPORTING LIGHT DATA ENTRY FOR MICROPROCESSOR DEVICE HAVING LIMITED USER INPUT

RELATED APPLICATIONS

The present application is a continuation-in-part application of and claims the benefit of priority from commonly-owned, co-pending application Ser. No. 08/905,463, filed Aug. 4, 1997, pending entitled USER INTERFACE METHODOLOGY FOR MICROPROCESSOR DEVICE HAVING LIMITED USER INPUT, the disclosure of which, including any appendices and attachments thereof, is hereby incorporated by reference for all purposes. Additionally, the present application claims the benefit of priority from the following commonly-owned, co-pending applications: application Ser. No. 60/098,607, filed Aug. 31, 1998, pending and entitled SYSTEM AND METHODOLOGIES FOR DATA ENTRY ON A MICROPROCESSOR DEVICE HAVING LIMITED USER INPUT, application Ser. No. 60/093,949, filed Jul. 23, 1998, pending and entitled USER INTERFACE METHODOLOGY FOR MICROPROCESSOR DEVICE HAVING LIMITED USER INPUT. The disclosures of the foregoing applications, including any appendices and attachments thereof, are hereby incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of portable hand-held devices and, more particularly, to system and methodology for facilitating user input in such devices having limited input capability.

The advent of portable hand-held devices, particularly credit card-sized devices, has resulted in wide acceptance of "PC companions" by consumers. These connected information "appliances" or devices offer greater mobility to today's PC users, while providing easy synchronization of information with desktop systems. Widespread acceptance has resulted in part from underlying product designs that provide greater mobility, while maintaining close synchronization with the user's PC's data. Users can have their essential data—events, contacts, and task lists—at their fingertips, at all times. Each "form factor" (i.e., physical size and dimensions) has its own set of expectations and constraints.

No matter how high the resolution is of a device's display, for instance, there still remains a finite amount of physical screen "real estate" which can be provided by the device. In the case of small hand-held devices, the amount of this screen real estate or physical screen area is obviously much less than that provided by desktop computers. If this problem is addressed by displaying items on screen at a smaller size, users have difficulty reading the information. Although virtual screen technology is available for users to "pan" across a larger virtual screen, the additional user input required to manage the process makes the approach undesirable. Information which cannot be seen is of no value to users.

Another problem facing small electronic devices is the difficulty of inputting information. With a small form factor or pocket-size device, it is simply not feasible to include a substantial keyboard for inputting information. Again, the size of the devices reduces the physical surface area available for accommodating input keys or the like. A conventional approach to the problem is to simply build a smaller keyboard, one using miniature input keys. The approach is problematic. In particular, most users find that their fingers are simply too big to use small keys with any degree of efficiency. Further, any efforts to increase the size of a keyboard or keypad in such a device reduces the amount of surface area available for the display screen.

An approach to this problem is to simply let the display screen double as an input device. The basic problem remains unsolved, however. Any display surface area allotted to display screen buttons decreases the amount available for displaying program information, such as output screens. Further, displaying different sets of keys during the operation of a program increases the complexity and, therefore, the learning curve for that program.

A similar approach to the above is handwriting recognition, such as is available with Apple's Newton device. With the current state of handwriting technology, however, the process is both processor intensive (and therefore slow) and error prone. These two disadvantages have combined to make present-day handwriting recognition unattractive to all but the most patient of users. Even with shorthand or gesture-based handwriting recognition, success of those devices remains limited, as most users are unwilling to spend the time mastering gesture strokes.

Again, the physical limitations imposed by these devices remains a problem. For handwriting recognition, for instance, the screen devices must be coated with a special material for receiving stroke input. That material adds yet another layer on top of the display screen thus making the screen more difficult to read (since screen contrast of an already small screen is decreased even further). All told, present-day handwriting recognition is far from an ideal solution.

Another popular PC companion is PalmPilot, which is designed to be used like a small writing tablet (i.e., requiring two hands). The success of the PalmPilot has, to an extent, resulted from a simplified handwriting recognition system called "Graffiti," which allows users to enter one letter at a time, using a specialized alphabet. Graffiti requires the use of a separate stylus, which is used to enter a modified single-stroke alphabet and a few special "gestures" on a specially designated area of the Palm-Pilot, separate from its main screen. To use Graffiti, users must employ a stylus on a touch-sensitive screen to draw single-stroke characters one at a time. The Graffiti area of the screen is further divided into two regions—one for letters and the other for numbers. Input mistakes are corrected by using the Backspace gesture—a horizontal line drawn from right to left. Once drawn, the figures are interpreted by Graffiti and displayed in the currently selected text input area. As the input for Graffiti is essentially simple text that is entered in a field, one character at a time, Graffiti is basically a pen-based replacement for an on-screen keyboard.

While the Graffiti model can be effective for some tasks, it comes with its own set of limitations and drawbacks. In particular, there is a steep learning curve for most end users, as the user must memorize a special input system. Users are required to memorize a special input alphabet, together with a complex set of additional punctuation markings and command gestures. While the basic alphabet poses little challenge to learn, the full mastery of the Graffiti system requires considerable effort on the part of a user, since most of the punctuation and alternate commands are rarely used and therefore are rarely reinforced. Input itself is slow, as it is entered only one character at a time, with the system requiring that each character be carefully drawn as designated. Handwriting recognition itself requires more hardware computing power, thus increasing the expense of the hardware while reducing battery life. Both the input stylus and touch-sensitive screen pose problems. The stylus is easily lost or broken. The touch-sensitive screens, which are relatively costly to produce, decreases screen clarity and brightness. Moreover, Graffiti provides no built-in intelligence for facilitating common input tasks, such an scheduling an appointment or editing an address book entry. Since Graffiti provides little more than an alternative to typing, the opportunity for increased efficiency in inputting information, particular in small devices, is left unrealized. These disadvantages are exacerbated for smaller devices, such as credit card-sized devices, where input resources are at a premium.

Despite all these shortcomings, there remains a growing interest in small or "form factor" smart electronic devices today. As a result, software applications which were typically the domain of desktop computers are now expected by users to be available on these small devices—devices which can easily fit in one's pocket or wallet. Although advances have occurred in software design which provide hand-held devices with substantial processing power, memory capacity, and display power, a number of "form factor" related problems nevertheless have remained unsolved by prior art devices.

What is needed is an improved input system and methodology for small devices, particularly credit card-sized devices having limited input capability. Such a system should facilitate user input by intelligently learning from and anticipating the user's actions. As a user employs the device, the system adapts to that user's personal styles and needs. In this manner, such a system may refine the user's choices, so that the process of entering and updating data becomes increasingly faster and easier, especially in devices where traditional input means (e.g., stylus) are awkward. The present invention fulfills this and other needs.

SUMMARY OF THE INVENTION

A portable computing device or "information appliance" having terse user input (e.g., limited set of keys) is provided with a user interface for navigating user data. The computing device comprises a central processing unit (e.g., microprocessor) connected via a system bus to a display, an input, I/O (input/output) ports, and memory. A display is a screen device for displaying information, such as a liquid crystal display (LCD) screen. An input comprises a keypad, either physical or logical (e.g., on screen buttons), but limited to a terse set numbering about three to ten buttons and more preferably about five buttons. Memory comprises persistent memory, volatile memory, and non-volatile RAM memory. Persistent memory is typically implemented as a ROM or read-only memory. It stores a single-purpose operating system (SPOS) and application(s). Volatile memory is a "scratch" memory, for storing temporary computation results. It typically is implemented as a RAM (random-access memory), for providing a work space for the operating system and applications. Non-volatile RAM memory represents battery-backed RAM memory, for storing context information from one session to another. When the device is powered down, the memory stores user data from that session.

The single purpose operating system (SPOS) functions to provide a consistent mechanism by which applications can communicate with the device. In this manner, applications are shielded from hardware complexity, such as hardware interrupts and ports. In other words, it serves to abstract hardware complexity to a high-level application programming interface (API).

Applications are software application programs or modules provided for user operation of the device. The application programs can be implemented as separate modules, which are controlled by a module selector. The module selector serves as a user interface or shell representing the top-level or "home" display presented to a user. In the currently-preferred embodiment, the module selector presents the user with selection icons for navigating to different applications or modules of functionality. In an exemplary embodiment, for instance, other modules include a calendar module, a to do module, and an address book module.

In typical use, the device is used in tandem with a desktop computer or PC. The desktop PC is used by the user when "at the office," and the portable computing device is employed when the user is "on the road" (i.e., out of the office). Thus during typical use, large repositories of data reside on the desktop PC which are periodically transferred or synchronized with data residing on the portable computing device. Multiple techniques exist for getting data from the desktop PC to the portable computing device, through device port(s). Using a device input/output (I/O) protocol or standard, such as the PC card standard (formerly PCMCIA standard), the user can easily transfer data to the device via a direct memory transfer. Alternatively, data can be streamed from the desktop PC to the portable computing device via a direct cable (or infrared) connection, such as using a serial port-to-serial port connection. Since the data transferred is that of an application operating on the desktop PC, potentially thousands of data items or records might be downloaded into the portable computing device. This potentially large dataset, coupled with the terse key set available at the portable computing device, poses a challenge to the location of desired information by a user. Therefore, improved user interface methodology is needed.

In the most-preferred embodiment, the present invention provides a user interface implementing a "single-click" style of button operation, so that users can associate each button with a particular task for a given program context. In addition to the single-click style, the preferred embodiment imposes "click consistency" for each button. Generally, the same buttons are used over and over again to perform their respective tasks, even though the user has navigated to different modules of an application. In this manner, the user is presented with a consistent interface or metaphor which can be easily mastered.

Also in the preferred embodiment, the user interface supports in a small form factor device the browser-style navigation that users have become accustomed to on desktop computers (e.g., using Web browsers). More particularly, the interface supports up, down, forward, and backward (reverse) navigation for allowing a user to "drill down" to "drill across" his or her data. This allows the user to find a data item (link) of interest and then drill down into it. Once at the appropriate level, the user can then easily select the particular item of interest. Further, once the user has selected or entered an item, the system provides the ability for the user to return to "home" with a single button click. In this manner, the present invention provides an interface allowing browser-style navigation in a device having a terse set of input keys.

A method for providing users with access to applications and user information in a computing device having a limited set of input keys may be summarized by the following method steps. At the outset, the device displays a user interface having a top-level view for allowing a user to select among applications available for the computing device. User interface navigation is provided in response to user operation of the limited set of input keys. In response to user selection of a forward key from said limited set of input keys, the device moves a screen cursor in a forward relative direction among screen objects at a given level. In response to user selection of a reverse key from said limited set of input keys, the device moves the screen cursor in a reverse relative direction among screen objects at a given level. In response to user selection of a select key from said limited set of input keys, the device selects a particular screen object at which the screen cursor is currently located, whereupon the device displays a lower level view of the user interface which pertains to the particular screen object. In response to user selection of a home key from said limited set of input keys, the device returns to the top level view. In this manner, access to the applications and user information is achieved for the computing device through use of said limited set of input keys.

Additionally, a device having a terse set of input keys provides password protection as follows. The interface implements a "graphical password" which can be entered directly from the terse set of keys. Instead of a conventional alphabetic or alphanumeric password as conventionally found on computing devices, the graphical password comprises a sequence of non-alphabetic key strokes from the terse set. Here, an exemplary graphical password might comprise, for example, FORWARD, FORWARD, BACK, BACK, SELECT, or, alternatively, the user could select HOME, SELECT, FORWARD, HOME, HOME, BACK.

During device operation, upon the user entering a graphical password, the device displays a password entry screen. When the device is configured for password protection, the screen appears each time the device is powered up. To gain access to information on the device, the user must at this point enter the same sequence of key strokes as that which comprises the user's graphical password. In an exemplary embodiment, a password mask field indicates entries of each key stroke, but with the actual keys themselves being masked.

A method for controlling access to a computing device having a limited set of input keys (particularly, a set of input keys including non-alphanumeric keys) may, therefore, be summarized as follows. At the outset, the device records a user-provided sequence of key strokes entered from the non-alphanumeric keys. The device stores the recorded sequence of key strokes as a "graphical password"—that is, a password comprising non-alphanumeric key strokes. Upon request from a user for access to the computing device, the device prompts the user to enter the graphical password. If the user enters a sequence of key strokes which matches that of the sequence of key strokes stored as the graphical password, the device grants device access to the user.

Additional methodology is provided for dynamically adjusting tab categories and subcategories. The method is, in the preferred embodiment, driven in part by the number of lines supported by the display. In the foregoing example, for instance, the interface supports seven displayable lines which the user can navigate. The number of displayable lines is employed to set a threshold number of items which must exist before creating further tab categories (i.e., subcategories). In the currently-preferred embodiment, the number is set equal to the number of displayable lines plus 1 (e.g., the number 8, for a display having 7 displayable lines). Any three-letter category which qualifies for subcategory tabs is determined by eight or greater items which satisfy that key. For clarity of the interface, the method adopted always creates a boundary tab—that is, a category tab for the starting index after the subcategory set. In the example presented above, the next tab category created is "Mo" (instead of the tab category "N"), even though the number of "Mo" entries might be less than the threshold value. By the same token, the methodology ignores combinations which do not exist in the user data. If no "J" items exist, for example, then a "J" tab is not created. Using the foregoing method, the system provides the user with a "find" operation based, not on a linear search, but on dynamically-created categories.

A method for providing access to a data set which stores information in data records having data fields may, therefore, be summarized as follows. An initial order for displaying the data set based on values of a particular data field is established. Commonly, this will be an alphabetic sort order, such as a descending sort by Last Name. The data set is displayed according to this established order. To facilitate navigation, the device displays category tabs for navigating among individual data records of the data set. This entails the following. The device determines dynamically, based on actual values stored at the particular data field of the data records, categories of information available for the particular data field. Based on this determination, the device displays a tab identifier allowing navigation to a particular category if at least one data item exists for the particular category. In this manner, at least some tab identifiers are eliminated from display—particularly, tab identifiers are eliminated for those categories of information which currently have no data items. The result is much faster and efficient navigation through large data sets when using a terse or limited key set.

An alternative six-key embodiment providing system and methodology for user input affords highly-efficient, simple one-handed operation of the underlying device, thus making it well suited for use with credit card-sized devices—devices where simplicity and efficiency are critical factors. The approach provided foregoes any special input system, such as input gestures, and adjusts to a user's own working style. It includes adaptive techniques or built-in intelligence that allows the device to be faster and easier to use with each user session. In this manner, the target device may anticipate the tasks users need to perform in specific situations and thus make those tasks increasingly easier. By providing an intelligent, efficient input system and methodology, one which does not require users to memorize codes and commands, the present invention facilitates data input for ultra-portable devices, including credit card-sized devices.

In a specific embodiment, the present invention provides a "super-key" light entry and editing input system for ultra-portable devices, such as a credit card-sized device. Underlying the super-key input is a heuristic sub-system that remembers and anticipates user input. By remembering what the user has previously inputted and by using context-sensitive menus and adaptive "quick" lists, the system can anticipate what the user needs to do at any given time and can guide the user through a step-by-step process to complete each task, thus facilitating the tasks that users most often perform. In a preferred six-button embodiment, a credit card-sized device, such as a REX™ device, is modified to include an additional input button, an EDIT key or button. In conjunction with this additional key, the system provides an integrated set of tools that interface directly with the applications on the target device. In user operation, pressing the EDIT key brings up a context sensitive pop-up menu, thus invoking the super-key feature.

Consider a user viewing the Calendar (module) and then pressing the EDIT key. This action activates a context sensitive, pop-up menu that allows the user to create a new event. If he or she then selects an existing event in the Calendar and presses the EDIT key, the user instantly gets different in-context options: Reschedule or Cancel the event. Still other in-context options are presented in each application, and during different phases of the execution of a variety of tasks. Consider, for instance, scheduling of a new event. Typical titles include "Interview," "Reception," "Speech," and so forth. Here, the system's adaptive lists automatically adjust to a user's personal working style. The more the device is used, the better the input system gets at anticipating the user's needs, by presenting the user with choices custom tailored to the user's working style. The choices are modified on the fly by the super-key system and can also be customized on a hand-held device or on the PC. In this manner, the input system, in conjunction with the EDIT key, functions intelligently to present the user with appropriate choices as he or she performs different tasks on the hand-held device.

Once a menu choice has been selected, the super-key system guides the user through the process of entering appropriate information step by step. By intelligently managing adaptive lists of words and phrases, the system learns from the user's employment of the device, and increasingly adapts to and anticipates the user's actions. Since users tend to select titles for items such as tasks or meetings from a relatively small set of words and phrases, the super-key system may employ simplified key entry for completing input. From the user's perspective, the system's unique context sensitivity means the ability to get the job done faster, with far less effort, and with no need to worry about methodology or input systems.

A method of the present invention for assisting a user with entering user input in a computing device having a limited set of input keys may be summarized as follows, First, the device is provided with a terse set of input keys comprising navigation keys, a select key, and an edit key. During device operation, the device displays a user interface that requires input of information from the user. Then, the device receives user input at the navigation keys for moving a screen cursor to different regions of the user interface. With the screen cursor positioned at a particular region of the user interface, the device receives user input at the edit key for invoking a context-sensitive input system. Now, the device can determine a set of appropriate user input entries for the device for the particular region of the user interface where the screen cursor is currently positioned, and display at the particular region a control based on at least some of said set of appropriate user input entries. Now, the device can receive user input at the navigation keys for positioning the screen cursor at a desired entry from said set of appropriate user input entries, and can receive user input at the select key for inputting the desired entry as user input for the device.

In another embodiment, a method of the present invention for assisting a user with completing input in a device, such as a portable computing device or the like, may be summarized as follows. First, the device displays a user interface comprising a sequence of input controls that are arranged sequentially for receiving user input and marks all input controls as initially unfilled, for indicating that each of the controls has not yet received input from the user. Now, the device can assist the user with completing input for the input controls, by performing substeps of: (1) receiving navigational input for moving a screen cursor among the sequence of input controls; (2) if the navigational input specifies forward movement, positioning the screen cursor at a next one of the sequence of input controls that is unfilled; (3) if the navigational input specifies backward movement, positioning the screen cursor at a previous one of the sequence of input controls that is unfilled; (4) receiving input from the user for the input control that the screen cursor is currently positioned at; (5) upon completion of input by the user at the control, marking the control as filled, for indicating that the control has received input; and (6) repeating substeps (1)–(5) until the user has completed all input desired.

A microprocessor-based device with improved user input capability in accordance with the present invention may be summarized as follows. The device comprises a microprocessor, a memory, a display, and a set of input keys, said device requiring input of information by a user, said display for displaying input controls for receiving input in response to user activation of at least some of said input keys. The device is provided with initialization logic for initializing all input controls to an activated and an unfilled state. The device is also provided with control logic operating to: set focus of input to a first located input control that is activated and unfilled if one is located, and otherwise transfer control to navigation logic of the device. The device includes entry logic operating to process input by a user at an input control currently having focus and thereafter mark the input control as filled and transfer control to the control logic of the device, and otherwise transfer focus to a prior input control that is activated and unfilled. Finally, the device has navigation logic operating to (1) set, in response to a forward navigation request from the user, focus of input to a next located input control that is activated and unfilled if one exists, (2) set, in response to a backward navigation request from the user, focus of input to a prior input control that is activated and unfilled if one exists, and (3) transfer, in response to an edit request from the user, control to the entry logic of the device.

BRIEF DESCRIPTION OF THE DRAWINGS

FIG. 5D is a flowchart summarizing internal methodology supporting the navigational model.

FIG. 7E is a flowchart summarizing internal methodology supporting dynamically adjusting tab categories.

FIGS. 13A–K illustrate bitmap screen shots that demonstrate user input controls, including new user input controls employed by the six-key embodiment of the present invention.

FIGS. 15A–C illustrate bitmap screen shots for exemplary input screens for the user task of scheduling a meeting.

FIGS. 23A–F illustrate bitmap screen shots showing how the Smart Assistant may adapt in response to user input.

FIGS. 24A–G illustrate bitmap screen shots that demonstrate exemplary input screens for the task of adding a new contact.

FIGS. 25A–E illustrate bitmap screen shots that demonstrate exemplary input screens for the task of creating a to do entry.

DETAILED DESCRIPTION OF A PREFERRED EMBODIMENT

The following description will focus on the presently-preferred embodiment of the present invention, which is typically operative in end-user application programs and/or operating system programs operating in a portable computing environment. The present invention, however, is not limited to any particular one application or any particular environment. Instead, those skilled in the art will find that the system and methods of the present invention may be advantageously applied to a variety of system and application software, including database management systems, word processors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

General system

A. Device hardware

Figure 1:
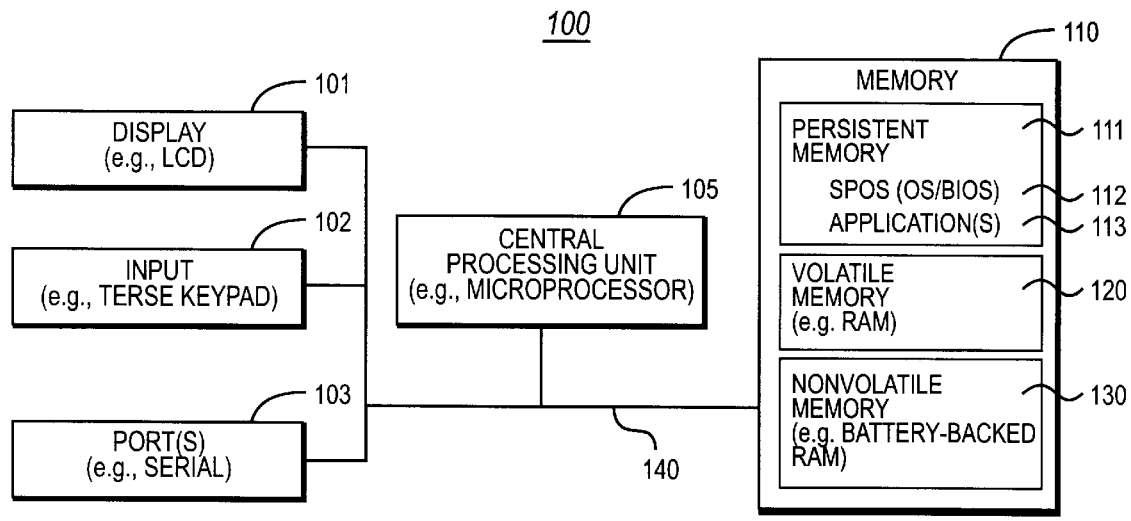
FIG. 1 is a block diagram illustrating the general architecture of a portable computing device or "information appliance" in which the present invention may be embodied.

FIG. 1 is a block diagram illustrating the general architecture of a portable computing device or "information appliance" in which the present invention may be embodied. As shown, computing device 100 comprises a central processing unit 105 (e.g., microprocessor) connected via a system bus 140 to a display 101, an input 102, ports 103, and memory 110. Display 101 is a screen device for displaying information, such as a liquid crystal display (LCD) screen. Input 102 comprises a keypad, either physical or logical (e.g., on screen buttons), but limited to a terse set numbering about three to ten buttons and more preferably about five buttons. Memory 110 comprises persistent memory 111, volatile memory 120, and non-volatile RAM memory 130. Persistent memory 111 is typically implemented as a ROM or read-only memory. As shown, it stores a single-purpose operating system (SPOS) 112 and application(s) 113, which are described in further detail below. Volatile memory 120 is a "scratch" memory, for storing temporary computation results. It typically is implemented as a RAM (random-access memory), for providing a work space for the operating system and applications. Non-volatile RAM memory 130 represents battery-backed RAM memory, for storing context information from one session to another. When the device 100 is powered down, the memory 130 stores user data from that session.

B. Device software

The single purpose operating system (SPOS) functions to provide a consistent mechanism by which applications 113 can communicate with the device 100. In this manner, applications 113 are shielded from hardware complexity, such as hardware interrupts and ports. In other words, it serves to abstract hardware complexity to a high-level application programming interface (API).

Figure 2:
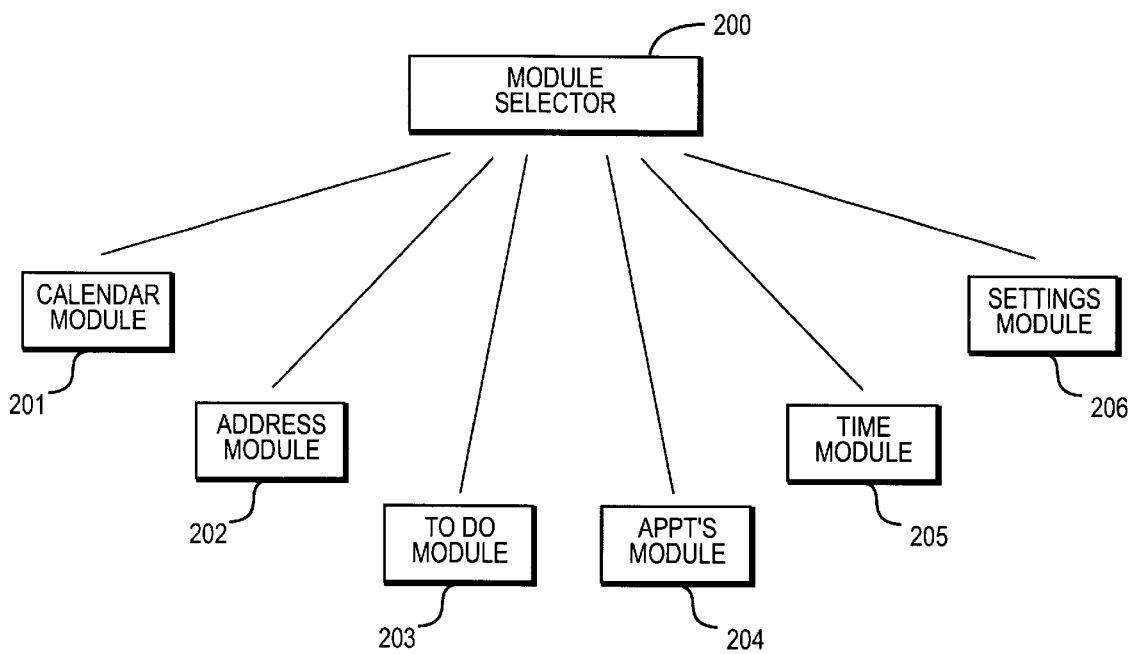
FIG. 2 is a block diagram illustrating implementation of the application programs as modules under the control of a module selector.

Applications 113 are software application programs or modules provided for user operation of the device. As shown in FIG. 2, for instance, the application programs can be implemented as modules 201–206, which are controlled by a module selector 200. The module selector 200 serves as a user interface or shell representing the top-level or "home" display presented to a user. In the currently-preferred embodiment, the module selector 200 presents the user with selection icons for navigating to different applications or modules of functionality. In an exemplary embodiment, for instance, other modules include a calendar module, a to do module, and an address book module.

In typical use, the device 100 is used in tandem with a desktop computer or PC. The desktop PC is used by the user when "at the office," and the portable computing device 100 is employed when the user is "on the road" (i.e., out of the office). Thus during typical use, large repositories of data reside on the desktop PC which are periodically transferred or synchronized with data residing on the portable computing device 100. Multiple techniques exist for getting data from the desktop PC to the portable computing device, through device port(s) 103. Using a device input/output (I/O) protocol or standard, such as the PC card standard (formerly PCMCIA standard), the user can easily transfer data to the device 100 via a direct memory transfer. Alternatively, data can be streamed from the desktop PC to the portable computing device via a direct cable (or infrared) connection, such as using a serial port-to-serial port connection. Since the data transferred is that of an application operating on the desktop PC, potentially thousands of data items or records might be downloaded into the portable computing device 100. This potentially large dataset, coupled with the terse key set available at the portable computing device, poses a challenge to the location of desired information by a user. Therefore, improved user interface methodology is needed.

Improved user interface

A. General design

The following description will focus on a preferred user interface and methodology for a form factor device having a terse set of input keys, preferably about five input keys. Those skilled in the art, enabled by the teachings herein, will appreciate that the invention can easily be adapted to form factor devices having more or fewer input keys. Hence, the description which follows is for purposes for illustration and not limitation.

In the most-preferred embodiment, the user interface of the present invention implements a "single-click" style of button operation. Given a device with five input buttons, for instance, various key combinations beyond the simple clicking of each individual button could be created. Buttons could, for example, be "double clicked" by users or combined to create double or triple (or even more) key combinations. Although such an approach yields more logical buttons from the available physical buttons, the approach requires users to memorize key combinations which are not intuitive (and are a source of endless grief for users of such devices). Accordingly, in the most-preferred embodiment, a single-click style is adopted, so that users can associate each button with a particular task for a given program context.

In addition to the single-click style, the preferred embodiment imposes "click consistency" for each button. Generally, the same buttons are used over and over again to perform their respective tasks, even though the user has navigated to different modules of an application. In this manner, the user is presented with a consistent interface or metaphor which can be easily mastered. If, on the other hand, behavior of the button changed from one portion or context of the application to another, the user must relearn the functionality of each button.

Also in the preferred embodiment, the user interface supports in a small form factor device the browser-style navigation that users have become accustomed to on desktop computers (e.g., using Web browsers). More particularly, the interface supports up, down, forward, and backward navigation for allowing a user to "drill down" to "drill across"

his or her data. This allows the user to find a data item (link) of interest and then drill down into it. Once at the appropriate level, the user can then easily select the particular item of interest. Further, once the user has selected or entered an item, the system provides the ability for the user to return to "home" with a single button click. As set forth below, the present invention provides an interface allowing browser-style navigation in a device having a terse set of input keys.

B. Navigation model

The module selector presents an array of icons, each one corresponding to a particular application within the system. At all times, the system displays a highlight on screen for indicating "focus"—that a particular item is the focus of further user input (at that point in time). At the top level or "home," focus is indicated by a highlight around one of the application icons.

Figure 3:
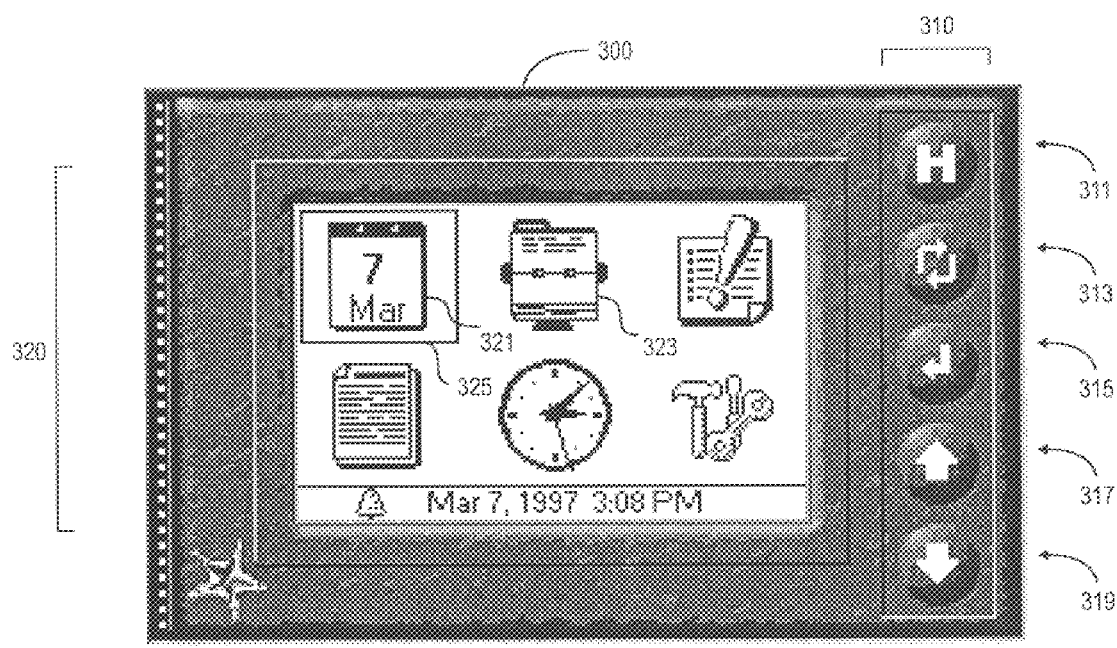
FIG. 3 is a bitmap screen shot illustrating a display interface comprising a plurality of application or module icons, from which the user can invoke particular application functionality.

As shown in FIG. 3 for device 300, for instance, display interface 320 comprises a plurality of application or module icons (e.g., icons 321, 323), from which the user can invoke particular application functionality. As shown, icon 321 currently has "focus," as indicated by focus outline (rectangle) 325. As also shown in FIG. 3, the device 300 includes five buttons 310. These buttons function as follows. Home key 311 provides a browser-like key allowing a user to always return to "home"—that is, a general or overview display screen. For the embodiment illustrated by FIG. 3, "home" is the module selector display or shell shown by display screen 320. In this manner, no matter how far a user has "drilled down" in the interface, the home key 311 will always return the user to the top-level view or shell, with a single button click.

Forward key 319 and backward key 317 allow the user to navigate forward or backward (respectively), within a given level of the interface. For the top-level view shown by display 320, for instance, the forward and backward keys move the selective or highlight from one icon to another, either in a forward or reverse direction depending on which of the two buttons 317, 319 is activated. In the currently-preferred embodiment, a highlight or selector is presented at all levels of the interface, so that the functionality of buttons 317, 319 remains consistent and intuitive. As a result, the user always knows how to shift focus from one item to another regardless of what level of the interface the user has navigated to.

Working in conjunction with the forward/backward buttons 317, 319 that shift focus through a current level, select button 315 invokes (or "selects") the item currently having focus, when the button is activated by the user. At the top-level view shown at 320, for instance, user activation of select button 315 serves to select the calendar module represented by icon 321. In response to this selection, the system "drills down" into the calendar module.

Using the select key in combination with the forward and backward keys, the user is easily able to navigate up and down interface levels as well as across a particular level. In other words, the buttons provide a navigation model where the user can move from point to point for changing direction within a level, selection itself always indicates the current focus or point of activity (which will occur) within a given level. Selecting that item with the select button 315 causes the system to drill down into the functionality represented by the selected item. Regardless of how many levels the user has drilled down into using this technique, the home button 311 will always return the interface back to the top-level view (e.g., such as the "home" view represented by display 320).

As shown in FIG. 3, buttons 310 include a fifth key or button, view switch button 313. The view switch button 313 allows the user to instruct the system to switch to a different view within a given level, thus providing the user with a different way of viewing the data. Consider, for instance, presentation of calendar data by a calendar module. Calendar or time-related data can be represented or displayed in multiple ways. One way to represent such information, for example, is to display a linear (event-by-event) list. Alternatively, such information could be presented on a week-by-week basis—that is, viewing data over a span of a given week. Yet another way to view such information is a monthly view which highlights dates for a given month which have events (or other user data). The view switch 313, therefore, cycles through different views at a particular level, with the actual views available being dictated by the particular application (module). In order to simplify the interface for the user, the number of views available at a given level should typically not exceed about four views.

C. Navigation model can be generically applied

Figure 4A:
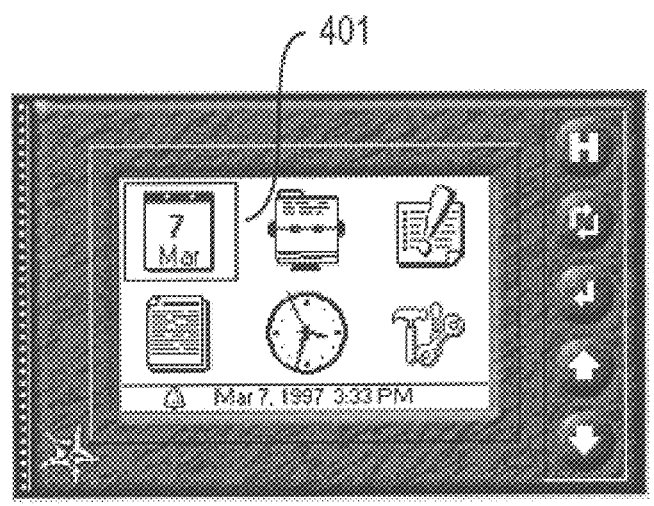
FIGS. 4A–G are bitmap screen shots illustrating use of a high-level navigation model of the present invention applied to a variety of types of user information.
Figure 4B:
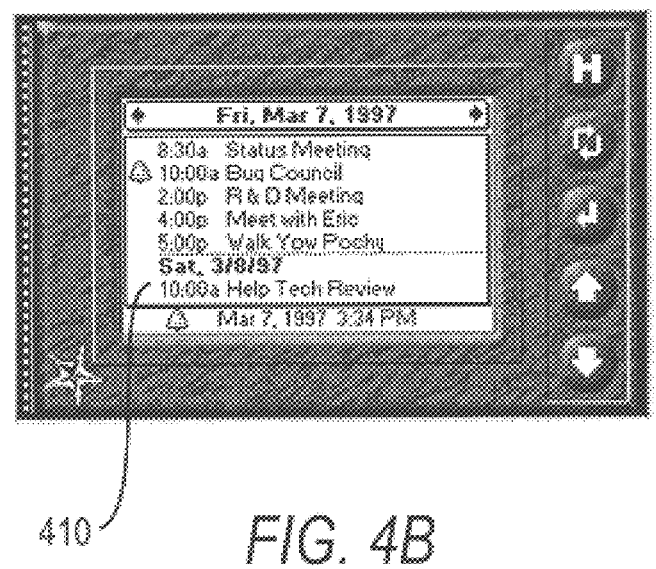
Figure 4C:
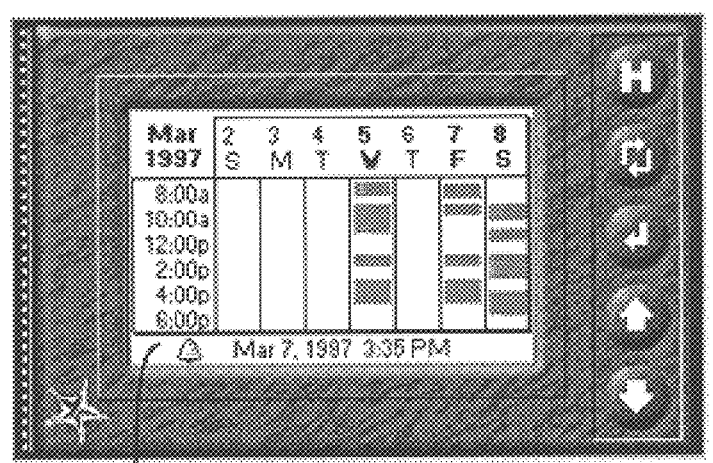
Figure 4D:
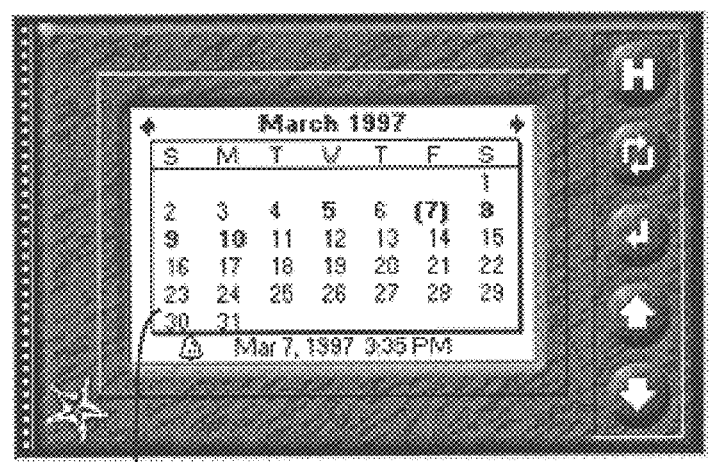
Figure 4E:
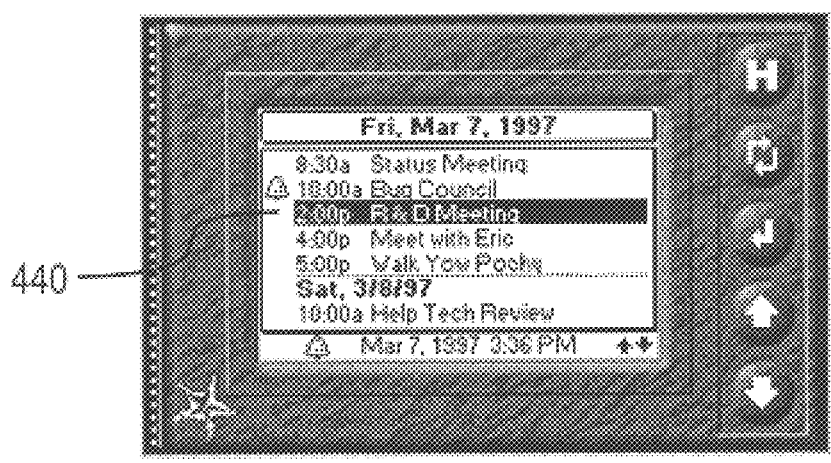
Figure 4F:
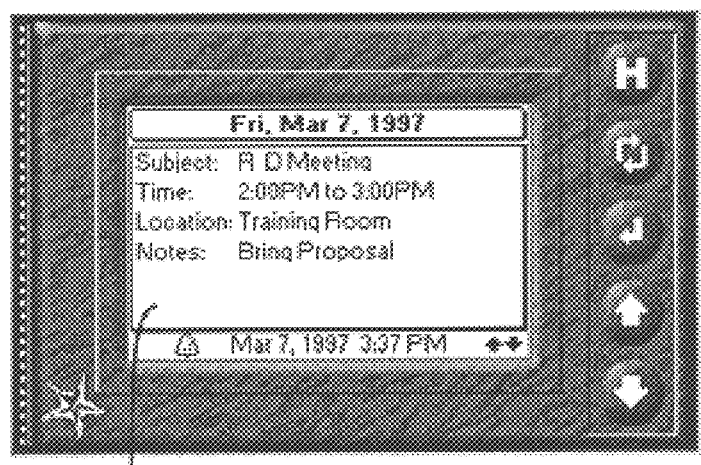
Figure 4G:
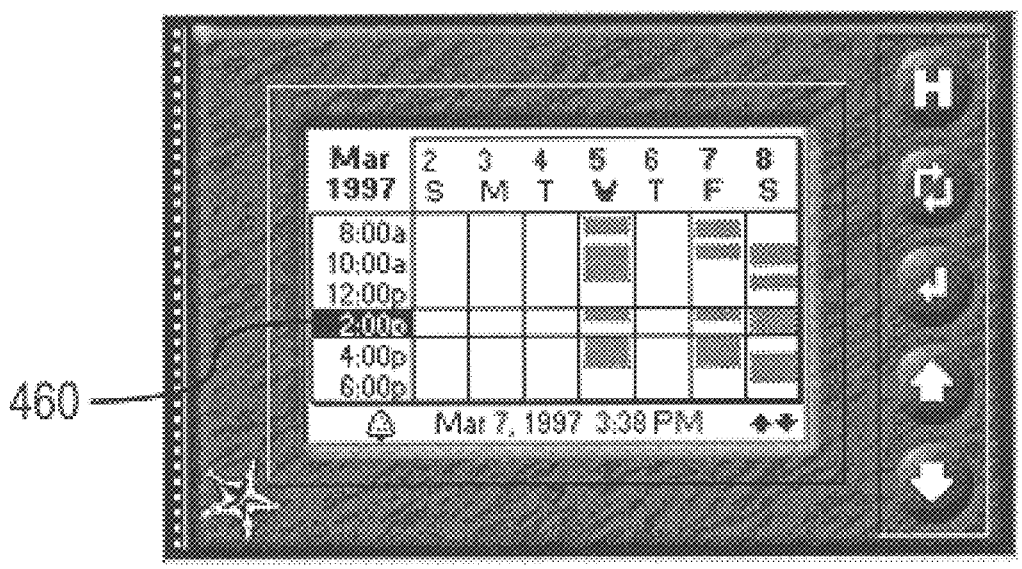

Generally, the high-level navigation model can be applied to other types of user information. This is illustrated in FIGS. 4A–B. In FIG. 4A, the calendar module has focus, as indicated at 401. Upon user activation of the select key, the interface invokes the calendar module, as indicated at 410 in FIG. 4B. By activating the view switch key, the user can switch the display to get another view of the data. For instance, upon the user first invoking the key, the display switches to a weekly view, as indicated at 420 in FIG. 4C. Further activation of the key switches the display to a monthly view, as shown at 430 in FIG. 4D. In any one of these views, the user can select an item and drill down into it. For the present example, this is illustrated by FIGS. 4E–F. In FIG. 4E, the user selects an item, shown at 440, using forward/backward keys. Now that a particular item has focus, the user can drill down into that item, by activating the select key. The result is shown at 450 in FIG. 4F. Here, the system displays the particular record corresponding to the selected item. As illustrated in FIG. 4G, the user can continue navigating using the selection and drill down approach. In FIG. 4G, the user has selected item 460 from the displayed list of items. As before, the user can invoke the select key for displaying further information about the selected item—detailed information for a particular time interval for this example (not shown). The foregoing example illustrates that the navigation module of the present invention can easily be applied to completely different data sets. At the same time, the user is still able to efficiently navigate among items in each data set even though the device itself only includes a terse set of input keys.

Although the foregoing focus is on the environment of the interface in a portable computing device such as a PDA (personal digital assistant), the interface methodology also has application to a variety of other devices. As enhanced processing power becomes available to more and more devices, including household appliances, there is a growing need for an interface for efficiently controlling such devices. Given the physical limitation of such devices, those devices will continue to have a small set of input keys, instead of larger keypads or handwriting recognition. For an intelligent coffee maker, for example, the physical size of the device makes it undesirable to incorporate a large keypad or a stylus for handwriting recognition.

D. Navigation model applied to preference settings

Figure 5A:
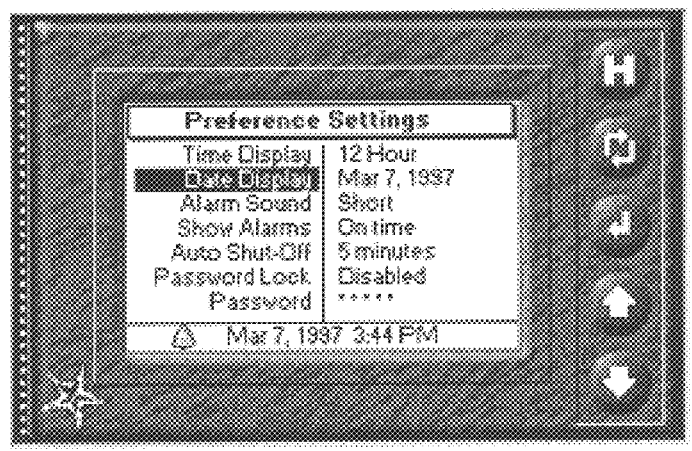
FIGS. 5A–C are bitmap screen shots illustrating use of the navigation model for setting user preferences.
Figure 5B:
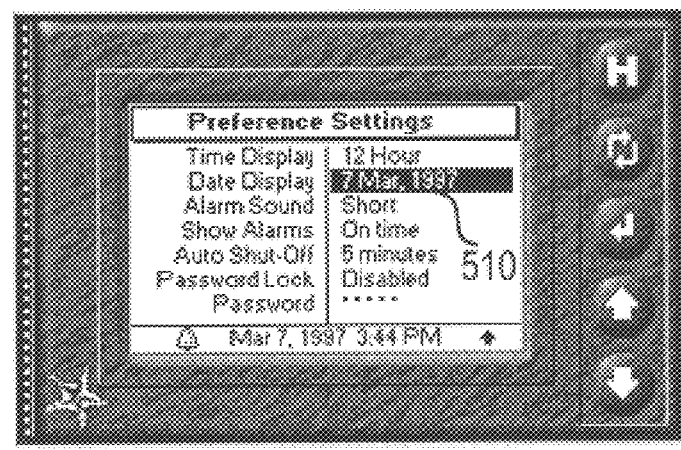
Figure 5C:
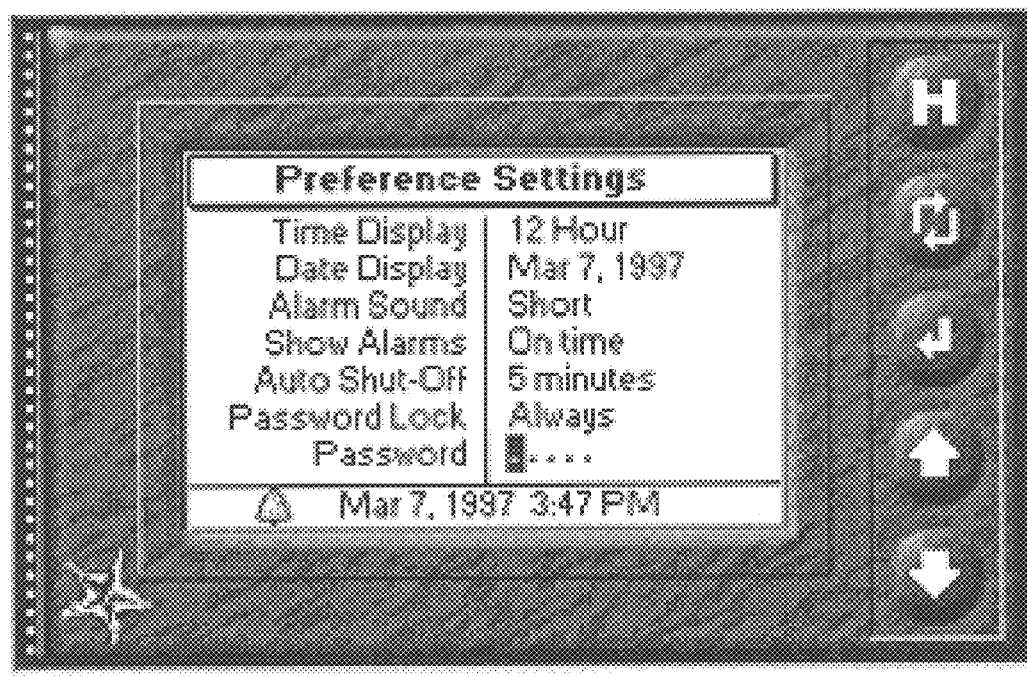

FIGS. 5A–C illustrate use of the navigation model for setting user preferences. The user begins by invoking the preference module from the module selector screen. At the preference setting screen, as illustrated in FIG. 5A, the user employs the forward and backward keys for navigating to a particular item, such as "date display." Once the user has selected a particular item to change, the user invokes the select key to navigate to the item's value, such as the date display value 510 as shown in FIG. 5B. Now the user can change the value by using the backward and forward keys. Once satisfied with a new value, the user can select that to be the preference value by invoking the select key. As shown in FIG. 5C, the selected value is now entered as the preferred setting.

A method for providing users with access to applications and user information in a computing device having a limited set of input keys, therefore, may be summarized as shown in FIG. 5D. At the outset, the device displays a user interface having a top level view for allowing a user to select among applications available for the computing device (step 531). User interface navigation is provided in response to user operation of the limited set of input keys (step 532). In response to user selection of a forward key from said limited set of input keys, the device moves a screen cursor in a forward relative direction among screen objects at a given level (step 533). In response to user selection of a reverse key from said limited set of input keys, the device moves the screen cursor in a reverse relative direction among screen objects at a given level (step 534). In response to user selection of a select key from said limited set of input keys, the device selects or invokes a particular screen object at which the screen cursor is currently located (step 535), whereupon the device displays a lower level view of the user interface which pertains to the particular screen object. In response to user selection of a home key from said limited set of input keys, the device returns to the top level view (step 536). The method or process loops (step 532) or continues for other user input. In this manner, access to the applications and user information is achieved for the computing device through use of said limited set of input keys.

E. Graphical passwords

Because the device 100 stores potentially sensitive information, a mechanism or "lock" is needed to prevent unauthorized access to that information. In accordance with the present invention, a device having a terse set of input keys implements password protection as follows. The interface implements a "graphical password" which can be entered directly from the terse set of keys. Instead of a conventional alphabetic or alphanumeric password as conventionally found on computing devices, the graphical password comprises a sequence of non-alphabetic key strokes from the terse set. Here, an exemplary graphical password might comprise, for example, FORWARD, FORWARD, BACK, BACK, SELECT, or, alternatively, the user could select HOME, SELECT, FORWARD, HOME, HOME, BACK.

Figure 6A:
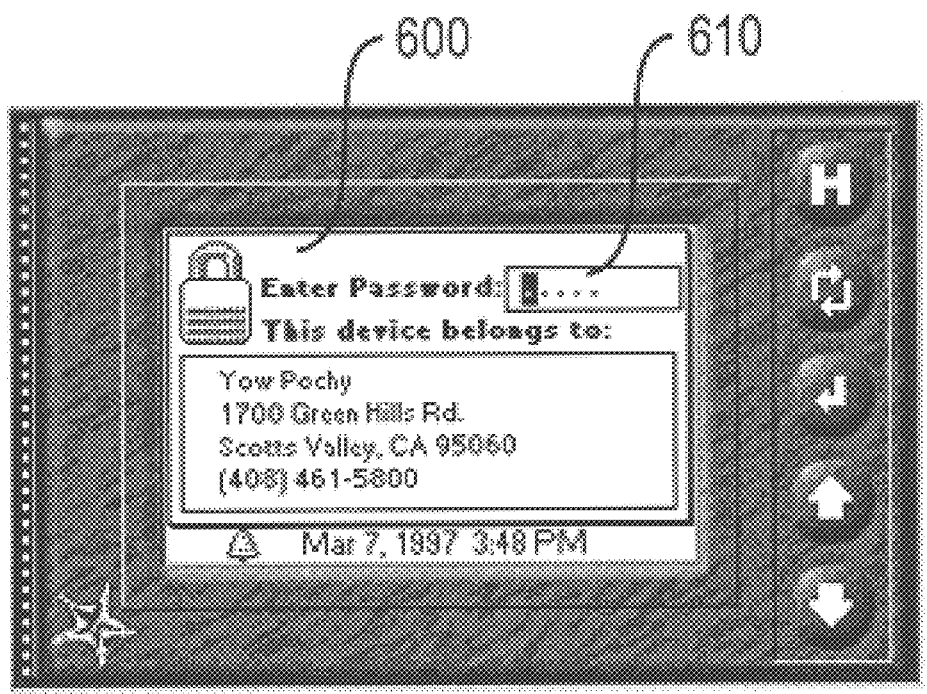
FIG. 6A is a bitmap screen shot illustrating use of "graphical" passwords for controlling user access to the device.

During device operation, upon the user entering a graphical password, the device displays a password entry screen 600, as shown in FIG. 6A. When the device is configured for password protection, the screen appears each time the device is powered up. To gain access to information on the device, the user must at this point enter the same sequence of key strokes as that which comprises the user's graphical password. In an exemplary embodiment, a password mask field 610 indicates entries of each key stroke, but with the actual keys themselves being masked.

Figure 6B:
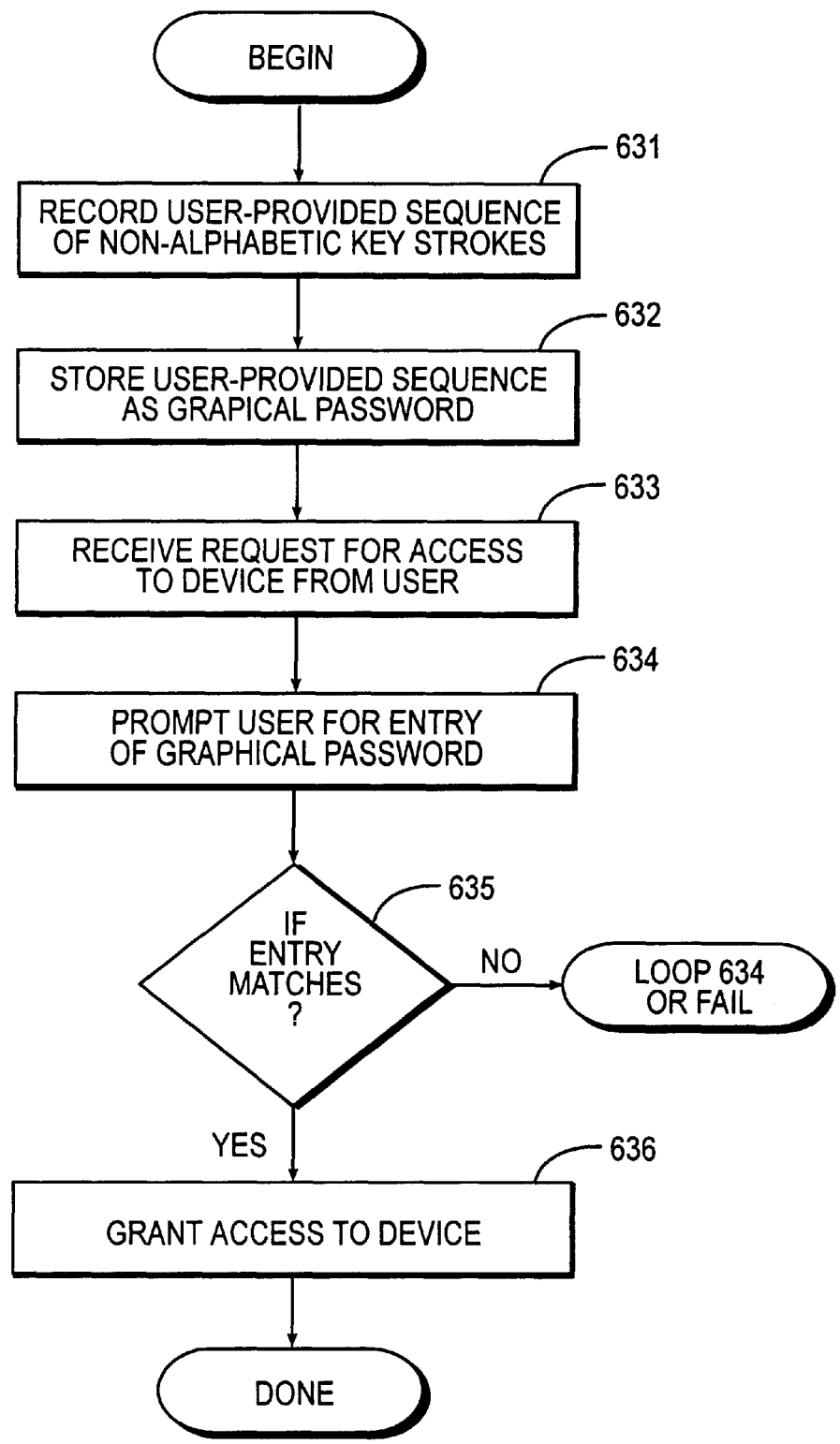
FIG. 6B is a flowchart summarizing internal methodology supporting device access with a graphical password.

A method for controlling access to a computing device having a limited set of input keys (particularly, a set of input keys including non-alphanumeric keys) may, therefore, be summarized as shown in FIG. 6B. At the outset, the device records a user-provided sequence of key strokes entered from the non-alphanumeric keys (step 631). The device stores the recorded sequence of key strokes as a "graphical password" (step 632)—that is, a password comprising non-alphanumeric key strokes. Upon request from a user for access to the computing device (step 633), the device prompts the user to enter the graphical password (step 634). If the user enters a sequence of key strokes which matches that of the sequence of key strokes stored as the graphical password (step 635), the device grants device access to the user (step 636). Otherwise, the method repeats the prompt (step 634) or fails.

Intelligent categorization and navigation of large data sets

A. Introduction

Often, a user desires to employ a portable computing device for storing and managing large lists of information, such as an electronic address book. Typically, such information is sorted by a particular key (i.e., indexed by one or more fields). For an address book, for instance, information can be indexed on the key of last name plus first name. Typically, such information is potentially a very large list.

A quick way to navigate to a desired entry in a large list is to perform a search. If one wanted to find an entry in an electronic address book beginning with the letter "S," for instance, the user could quickly search to names beginning with "S" if he or she could easily enter such a letter. For a portable computing device having a terse set of input keys, such as the device 100, the user does not have this option. Given a device with a terse set of input keys or buttons, therefore, a problem arises as to how one navigates such information efficiently.

Perhaps the simplest approach to navigating a list is to simply proceed through the list in a linear fashion. Such an approach is only workable for small lists, however. Another approach, which is popular with consumer electronic applications, is the "fast repeat" navigation technique. Here, the navigation starts out as a slow, repeating linear search but then increases to a fast-repeating linear search as the user continues to depress the (search) button. With "fast repeat," when the user clicks a button once the value represented by the button (e.g., minutes) advances by 1. If the user holds the button continuously, the value advances faster. With an alarm clock, the user is faced with a sorted list comprising the digits 0 through 9, thus making the "fast repeat" approach at least acceptable. For limited input, therefore, fast repeat is a good approach.

The difficulty with the approach, however, is that the user must still navigate a potentially large list. If something more than simple input is required, such as the input of alphabetic characters, the fast repeat approach becomes unacceptable. For instance, when inputting characters from an entire alphabetic character set, including both upper case and lower case characters, the approach is simply not a practical way to input the information into a device. The fast repeat approach is not practical for navigating large data sets, such as an electronic address book containing hundreds of entries.

Given the ability to navigate both across and up/down in the device 100 (using the forward, backward, and select keys), another approach one could employ is to allow a user to navigate across the alphabet to a particular alphabetic character and then navigate down names beginning with the letter represented by that alphabetic character. Although such an approach is an improvement over the fast repeat technique, it still remains impractical for all but the smallest of lists. Therefore, a better approach is needed.

B. Preferred approach

In accordance with the present invention, list information is organized into discrete categories. To understand this approach, first consider how information is grouped in a Rolodex. There, tabs are provided for individual letters of the alphabet. Adopting that approach electronically, however, is not an optimal approach, as the user would have to navigate or "tab through" a lot of information before reaching the desired target information. In accordance with the present invention, therefore, information is grouped intelligently at runtime (i.e., dynamically) such that a user can rapidly reach a destination or target item without having to tab through a lot of categories which are not of interest. Unlike a Rolodex (electronic or otherwise), the tabs themselves adjust dynamically at runtime to the user's actual data. Specifically, the tabs adjust on-the-fly to correspond to entries in the user's data. In this manner, the system eliminates the need for navigating or tabbing to categories which do not correspond to the actual user data present in the system.

In a preferred embodiment, both a high level approach and a low level approach are adopted. At the high level, the system employs the alphabet (and digits) broken down into sets of three characters, such as "#AB," "CDE," and the like. If no "E" entries are present in the user's data, for instance, the second tab can adjust to "CDF." When combined with the forward/backward navigation keys or buttons, the approach provides an interface allowing the user to quickly navigate among categories. Unlike a Rolodex, however, the categories are simplified based on the user's actual data.

C. Dynamically adjusting tab (category) interface

Figure 7A:
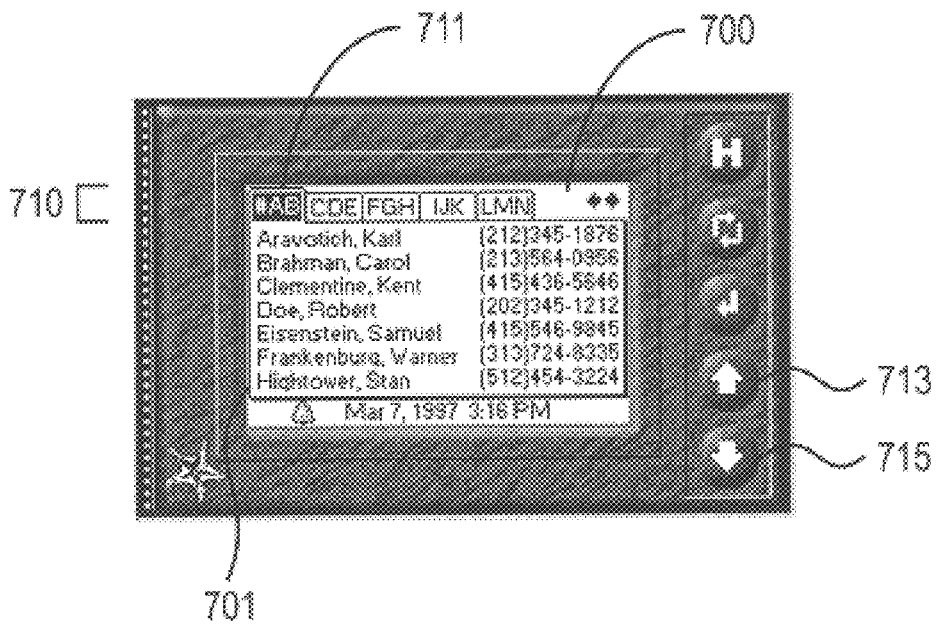
FIGS. 7A–D are bitmap screen shots illustrating use of a dynamically adjusting tab (category) interface for managing a large set of data.

FIGS. 7A–D illustrate an interface which embodies the approach. FIG. 7A illustrates address book interface 700 displaying list information 701. As shown, the interface 700 includes category tabs 710, such as "#AB" tab 711. Since the tab 711 currently has focus, it is highlighted (e.g., displayed in reverse video). To navigate among the categories, the user activates forward (i.e., right or down) and backward (i.e., left or up) keys 715, 713.

Figure 7B:
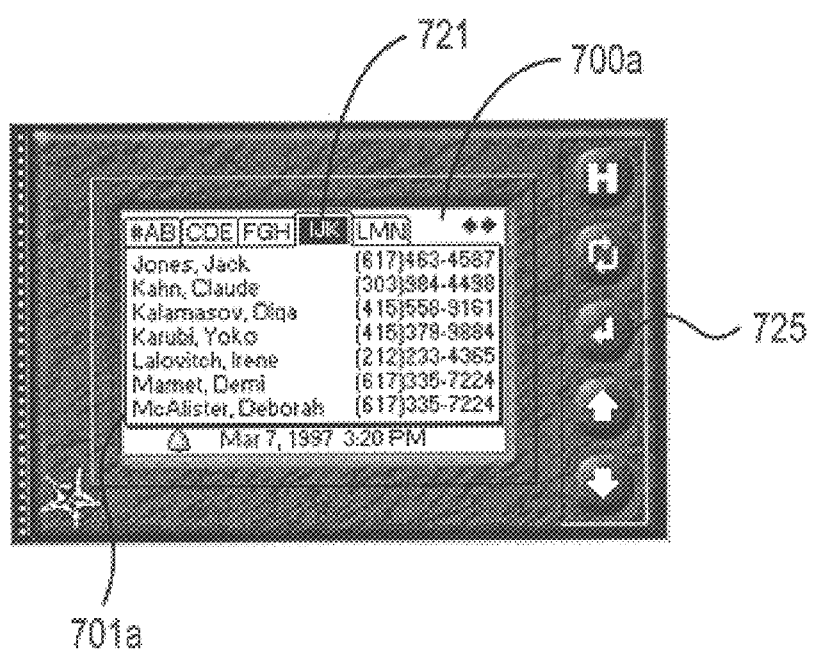

Consider, for instance, the user activity of clicking the forward button or key 715 twice. The result of this action is shown in FIG. 7B. The interface 700 (now 700*a*) shifts focus to tab 721, as shown. In a corresponding manner, the displayed list 701 (now 701*a*) is updated, for displaying entries corresponding to the now-selected category (i.e., tab 721). Upon reaching the desired or target category destination, the user can now invoke the select button, shown at 725 in FIG. 7B, for drilling down into the then currently-selected category.

Figure 7C:
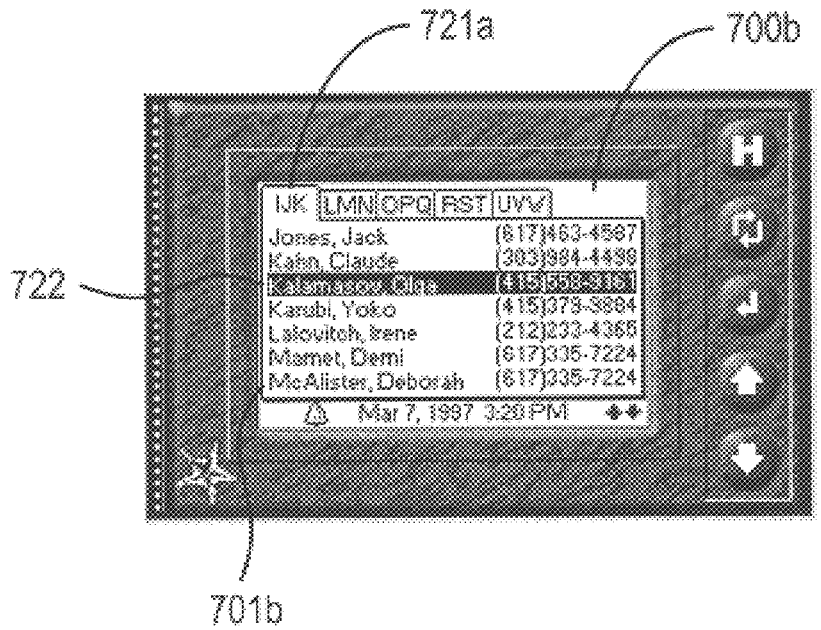
Figure 7D:
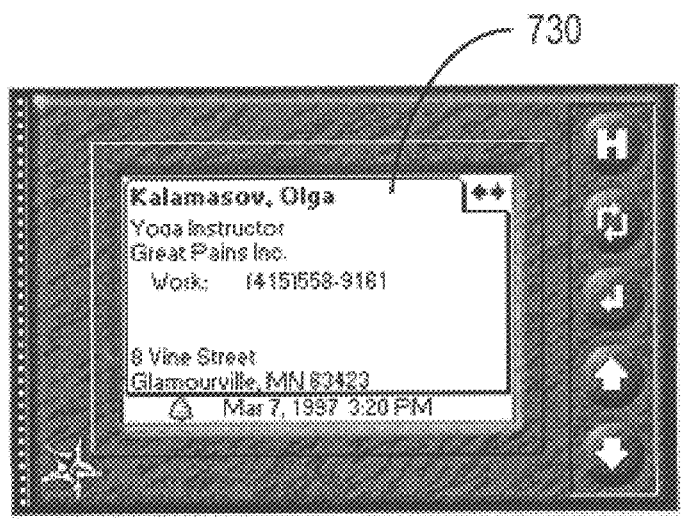

The result of the user action is illustrated in FIG. 7C. Interface 700 (now 700*b*) displays the tab 721 (now 721*a*) as the first category. Further, focus has shifted to a particular item on the list 701 (now 701*b*). Hence, once the user has quickly navigated to the desired category of information, the user can select into that category and proceed to quickly select a particular item from that category. For the example presented in FIGS. 7A–C, the input events can be summarized as follows: across→select→down→select. Upon final selection of the item of interest, the system displays the information record pertaining to that item. Final selection of item 722, for instance, invokes the display of information record 730, as illustrated in FIG. 7D. At any point during this process, the user can easily return to the top-level view by selecting the "home" key.

A method for providing access to a data set which stores information in data records having data fields may be summarized as shown in FIG. 7E. An initial order for Commonly, this will be an alphabetic sort order, such as a descending sort by Last Name. The data set is displayed according to this established order (step 742). To facilitate navigation, the device displays category tabs for navigating among individual data records of the data set. This entails the following. The device determines dynamically, based on actual values stored at the particular data field of the data records, categories of information available for the particular data field (step 743). Based on this determination (tested at step 744), the device displays a tab identifier allowing navigation to a particular category if at least one data item exists for the particular category (step 745). In this manner, at least some tab identifiers are eliminated from display— particularly, tab identifiers are eliminated for those categories of information which currently have no data items. The result is much faster and efficient navigation through large data sets when using a terse or limited key set.

D. Adjusting dynamically for subcategories

Figure 8A:
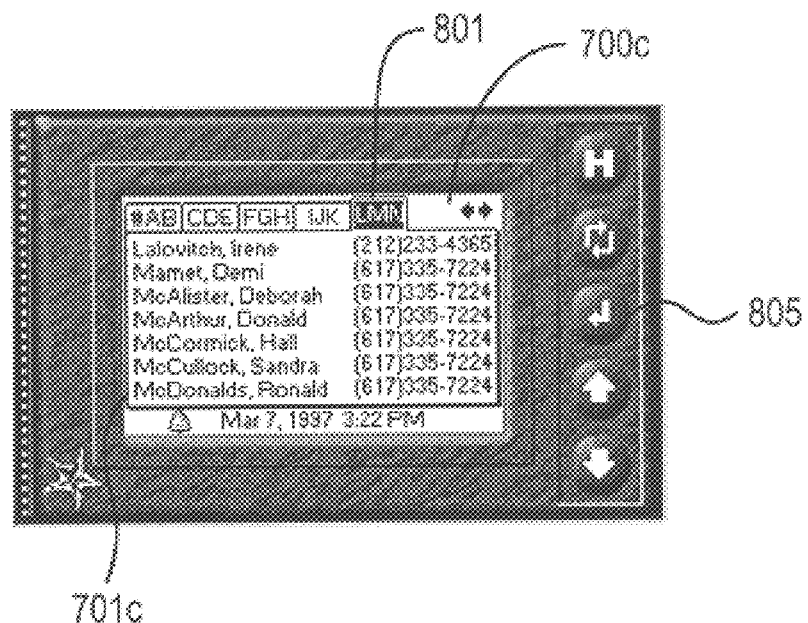
FIGS. 8A–F are bitmap screen shots illustrating the action of tabbing through dynamically-created subcategory tabs.

The foregoing example illustrated a scenario where simple category headings sufficed. At times, however, a simple category heading might not provide sufficient detail. Consider a scenario when the user has navigated to a category having "M" entries only to find that a very large number of "M" entries exist. In an electronic address book, it is not uncommon to find, for example, a large number of "Mc" entries. FIG. 8A illustrates this scenario. Here, the user has tabbed to a category including "M" entries. For the interface 700 (now 700c), this is shown at tab 801. As a result of having selected tab 801, the list 701 (now 701c) is updated and, for this example, includes a large number of "M" entries. To drill down into these entries, the user clicks the select key, shown at 805.

Figure 8B:
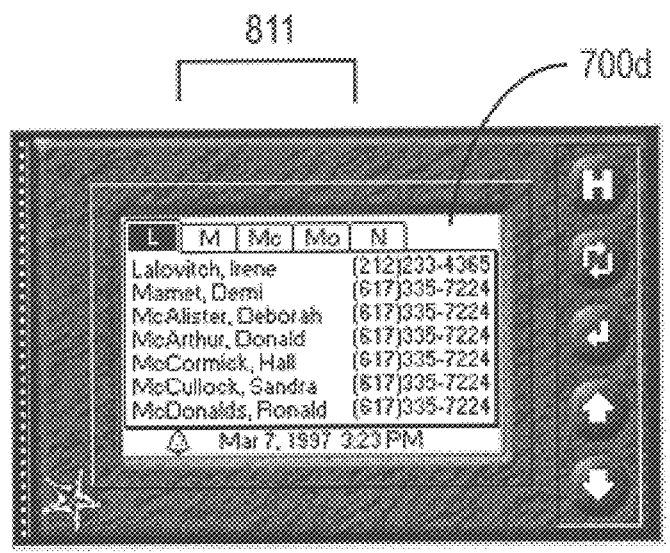

In response to this action, the interface 700 (now 700d) updates, as indicated in FIG. 8B. Note particularly that the category tab has, in effect, "split" into subcategory tabs. For instance, "M" entries are now represented by three tabs 811: "M," "Mc," and "Mo" tabs. Here, since there are a great number of "Mc" entries, the system has synthesized dynamically an "Mc" tab, so those entries have their own subcategory tab. In this fashion, the user can quickly navigate to a particular subcategory of interest, thereby avoiding the need to linearly scan through a subcategory having a large number of entries which are not of interest (e.g., "Mc" entries).

Figure 8C:
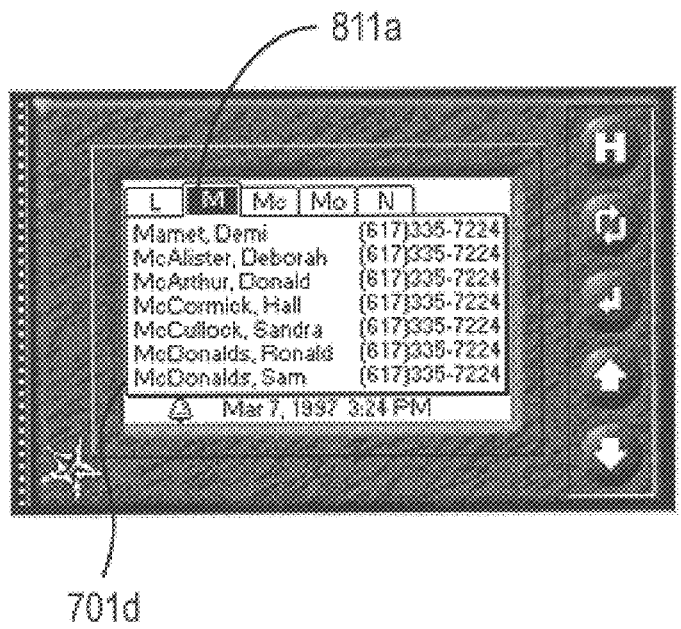
Figure 8D:
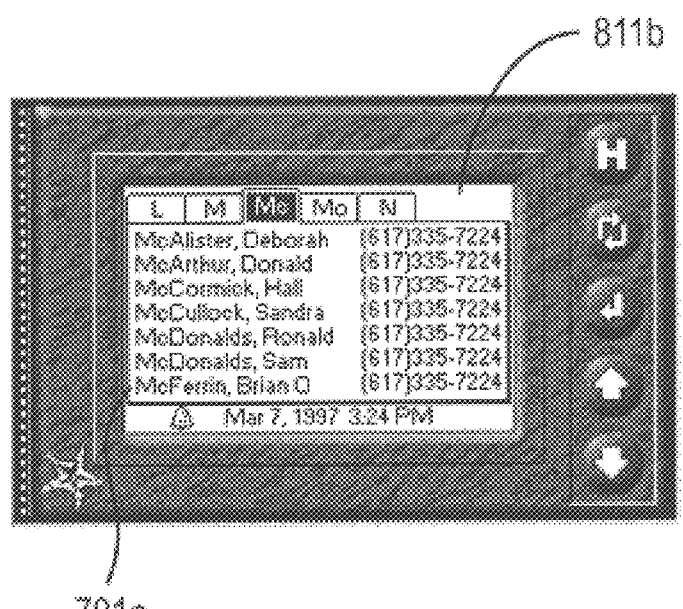
Figure 8E:
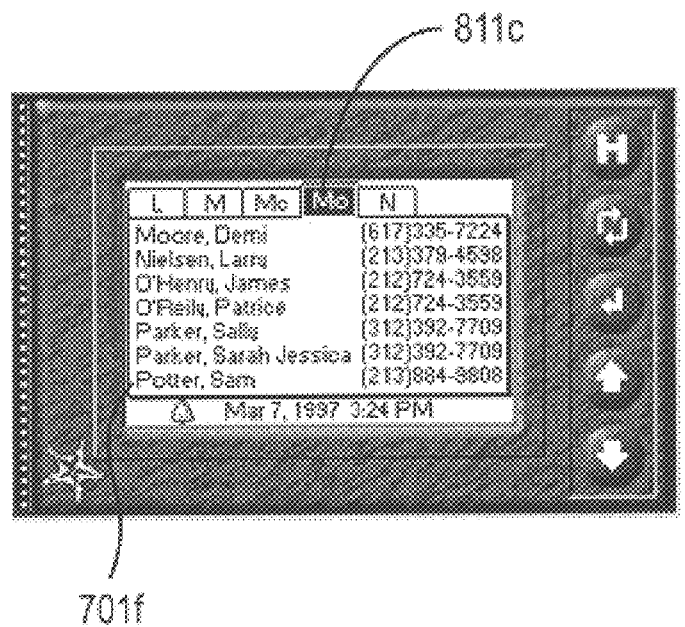
Figure 8F:
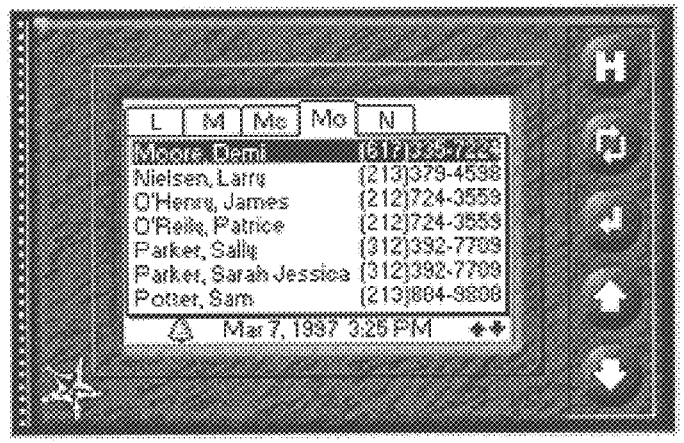

FIGS. 8C–E illustrate the action of the user tabbing through the subcategory tabs 811. As shown in FIG. 8C, upon the user tabbing to subcategory tab 811a, the display list 701 (now 701d) updates to display items corresponding to the newly-selected subcategory tab. In a like manner, the user selecting subcategory tab 811b as shown in FIG. 8D or selecting subcategory tab 811c in FIG. 8E also leads to updating the display list 701, as shown at 701e and 701f, respectively. Upon reaching the subcategory of interest, the user can select into or drill down to a particular item, such as indicated in FIG. 8F. At this point, the user can select the target item of interest using the select key or button. In response, the system displays the corresponding information record (not shown) for that selected item.

E. Screen threshold

The methodology adopted for dynamically adjusting tab categories and subcategories is, in the preferred embodiment, driven in part by the number of lines supported by the display. In the foregoing example, for instance, the interface supports seven displayable lines which the user can navigate. The number of displayable lines is employed to set a threshold number of items which must exist before creating further tab categories (i.e., subcategories). In the currently-preferred embodiment, the number is set equal to the number of displayable lines plus 1 (e.g., the number 8, for a display having 7 displayable lines). Any three-letter category which qualifies for subcategory tabs is determined by eight or greater items which satisfy that key. For clarity of the interface, the method adopted always creates a boundary tab—that is, a category tab for the starting index after the subcategory set. In the example presented above, the next tab category created is "Mo" (instead of the tab category "N"), even though the number of "Mo" entries might be less than the threshold value. By the same token, the methodology ignores combinations which do not exist in the user data. If no "J" items exist, for example, then a "J" tab is not created. Using the foregoing method, the system provides the user with a "find" operation based, not on a linear search, but on dynamically-created categories. The result is much faster and efficient navigation through large data sets when using a terse key set.

F. Changing sort key (index)

Figure 9A:
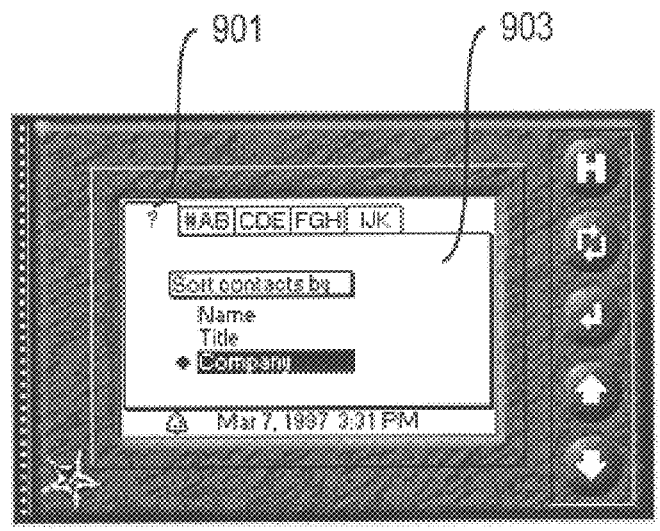
FIGS. 9A–B are bitmap screen shots illustrating a special sort tab, whereupon the tab categories are automatically updated.
Figure 9B:
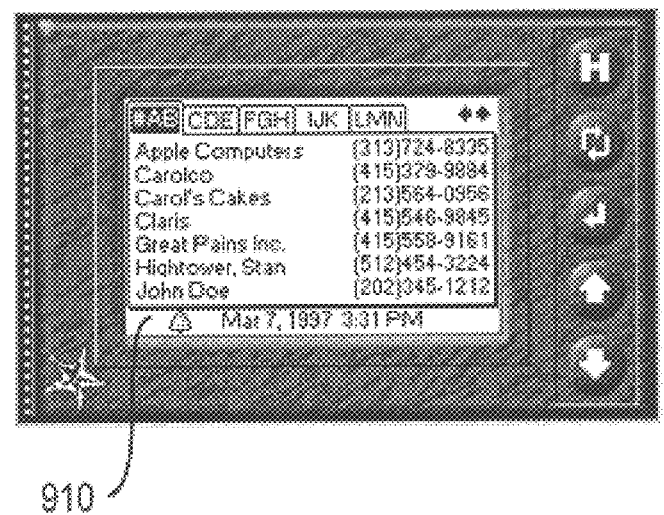

Although the foregoing example illustrates searching based on Last Name, the approach easily accommodates any index or key. As illustrated in FIG. 9A, the interface includes a special sort tab 901. In response to user selection of this tab, the device displays selection screen 903. Here, the user can select another index for presenting the data, such as index by "title" or by "company." As shown in FIG. 9B, at display screen 910, the user data is now sorted by company name. Accordingly, the tab categories are updated. This example demonstrates that the method's operation is generic to a variety of different data sets.

Alternative embodiment: six-button embodiment with light data entry

A. Introduction

Typically for a PC companion such as REX, users employ a desktop or laptop PC to enter and edit the bulk of their information. For instance, REX Classic, the first generation REX device, gave users the ability to carry critical contact, scheduling and task management information in their shirt pockets or wallets, information that was originally entered in a desktop application such as Starfish Sidekick® or Microsoft® Outlook. REX downloads this information from the users' PCs, and keeps it synchronized, by using Starfish TrueSync technology.

Of course users embrace PC companion devices for their portability and convenience. They do not need—and would not want—a credit-card-sized device to include a full-blown text processing system, say for composing lengthy documents or designing a spreadsheet. Although users do not expect a PC companion to perform like a full-blown desktop or laptop computer, users do want the ability to perform light editing and input tasks on the PC companion, and then later re-synchronize with their desktop, laptop or hand-held computer. Such light-duty input tasks include, for example, rescheduling an event, entering a phone number, or creating a new to do item. All told, users want a simple, light data entry mechanism that solves their input needs without sacrificing the size and efficiency advantages of the device.

B. Design considerations for improved input

An improved input system and methodology constructed in accordance with the present invention should provide highly-efficient, simple one-handed operation of the underlying device, thus making it well suited for use with credit card-sized devices—devices where simplicity and efficiency are critical factors. User should not have to fumble with a stylus or have to use both hands to input data. Ideally, the approach should be designed so as to not require a touch screen, thereby allowing the highest possible screen resolution while minimizing hardware requirements. The approach provided should not only forego any special input system, such as input gestures, but should in fact adjust to a user's own working style. The approach employed should include adaptive techniques or built-in intelligence that allows the device to be faster and easier to use with each user session. In this manner, the device may anticipate the tasks users need to perform in specific situations and thus make those tasks increasingly easier. By providing an intelligent, efficient input system and methodology, one which does not require users to memorize codes and commands, the present invention facilitates data input for ultra-portable devices, including credit card-sized devices.

C. Overview of operation

Figure 10:
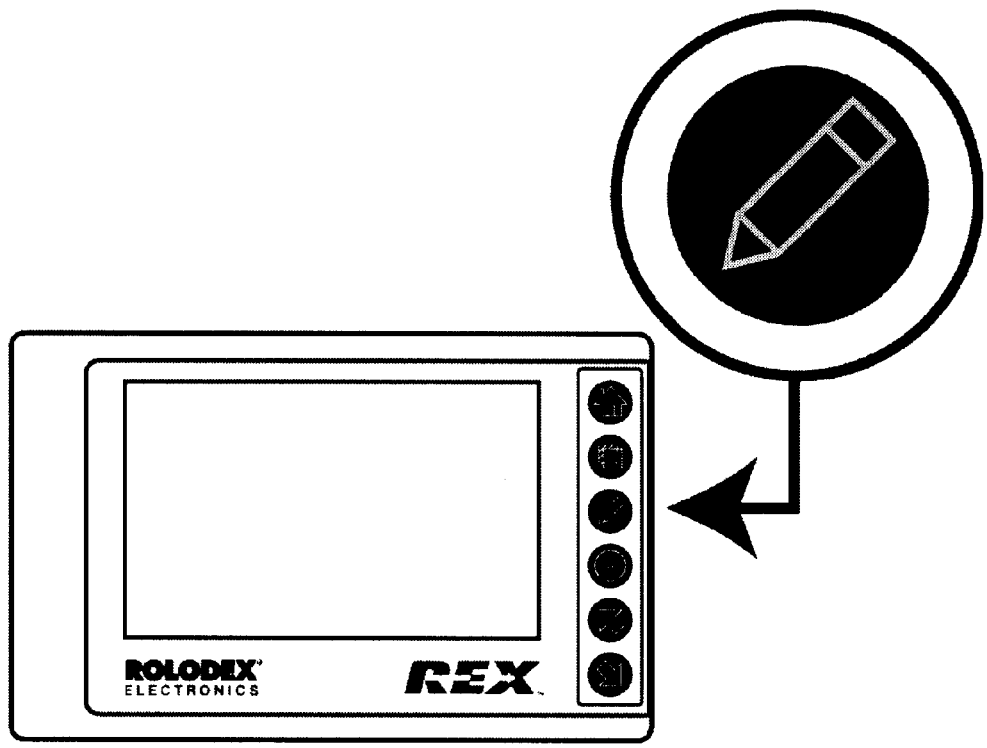
FIG. 10 illustrates the inclusion of a sixth button, the EDIT button.

The present invention provides a "super-key" light entry and editing input system for ultra-portable devices. Underlying the super-key input is a heuristic sub-system that remembers and anticipates user input. By remembering what the user has previously inputted and by using context-sensitive menus and adaptive "quick" lists, the system can anticipate what the user needs to do at any given time and can guide the user through a step-by-step process to complete each task, thus facilitating the tasks that users most often perform. In a preferred six-button embodiment, the REX device is modified to include an additional input button—the EDIT key—as illustrated in FIG. 10. In conjunction with this additional key, the system provides an integrated set of tools that interface directly with the applications on the target device. In user operation, pressing the EDIT key brings up a context sensitive pop-up menu, thus invoking the super-key feature.

Figure 11:
FIG. 11 illustrates a bitmap screen shot that is invoked upon selection of the EDIT button.

Consider a user viewing the Calendar (module) and then pressing the EDIT key. This action activates a context sensitive, pop-up menu that allows the user to create a new event. If he or she selects an existing event in the Calendar and presses the EDIT key, the user instantly gets different in-context options: Reschedule or Cancel the event. Still other in-context options are presented in each application, and during different phases of the execution of a variety of tasks. Consider, for instance, scheduling of a new event as shown in FIG. 11. Typical titles include "Interview," "Reception," "Speech," and so forth. Here, the system's adaptive lists automatically adjust to a user's personal working style. The more the device is used, the better the input system gets at anticipating the user's needs, by presenting the user with choices custom tailored to the user's working style. The choices are modified on the fly by the super-key system and can also be customized on a hand-held device or on the PC. Thus, the EDIT key functions intelligently to present the users with appropriate choices as he or she performs different tasks on the hand-held device.

Once a menu choice has been selected, the super-key system guides the user through the process of entering appropriate information step by step. By intelligently managing adaptive lists of words and phrases, the system learns from the user's employment of the device, and increasingly adapts to and anticipates the user's actions. Since users tend to select titles for items such as tasks or meetings from a relatively small set of words and phrases, the super-key system may employ a simple two-key entry system for completing input (e.g., one key to navigate to a choice, and another to select the choice). From the user's perspective, the system's unique context sensitivity means the ability to get the job done faster, with far less effort, and with no need to worry about methodology or input systems.

D. Implementation

1. Button design and operation

The alternative six-key embodiment includes HOME, VIEW, SELECT, BACK and NEXT buttons together with the new EDIT key or button.

a. Home button

The HOME key or button is used to return to the upper most level of the navigation scheme, the module selector screen. Return to home is done in a step-wise fashion, with each click of HOME moving back a logical step toward the module selector screen. Functionality of the button is, however, modified in this embodiment for use within input controls. Specifically, the HOME key operates as a step-wise undo within a control. For date-time controls, for example, HOME will back through each element of the control. For text input controls, HOME will undo the last typed letter. Holding the HOME key down will return control all the way back to the module selector screen, skipping any intermediate steps. Holding HOME down at the module selector will force the device to shut off. Holding HOME down while in a Smart Entry Assistant (described below) pops up a menu with the option to cancel or continue; choosing to cancel will return focus to the module selector screen and cancel the Smart Entry Assistant.

b. View button

As before, the VIEW button switches views where available. In the calendar, the VIEW button switches between daily, weekly and monthly views. In the contacts module, the view switches between contact categories and among address, number and note views. The alternative embodiment adds a VIEW menu. Rather than cycle through views immediately, the VIEW key pops up a menu of view choices. Clicking VIEW a second time dismisses the VIEW menu. The VIEW button is used in the text input control to switch between letter text input and number/symbol text input. The VIEW button does not have a function in every situation. When the VIEW button is operating, therefore, the symbol for the button appears in the status bar.

c. Edit button

The EDIT button operates on the current context and allows the user to add new data or modify existing data. With the EDIT button, users can start various Smart Entry Assistants to create new schedule, contact, and to do list items. Users can also operate on existing schedule, contact, and to do list items, with the option to change or remove an existing item. The EDIT button pops up an edit menu which offers the relevant choices available for the context in which it was pressed. The EDIT button does not have a function in every situation. When the EDIT button is available, the symbol for the button appears in the status bar.

d. Select and Arrow buttons

The SELECT and BACK/NEXT arrow buttons operate as before. BACK and NEXT arrow buttons either move the highlight to the next logical position (vertically or horizontally depending on context) or increment/decrement the currently highlighted value, depending on context, and SELECT acts on the currently selected item.

2. Status bar design and operation

Figure 12A:
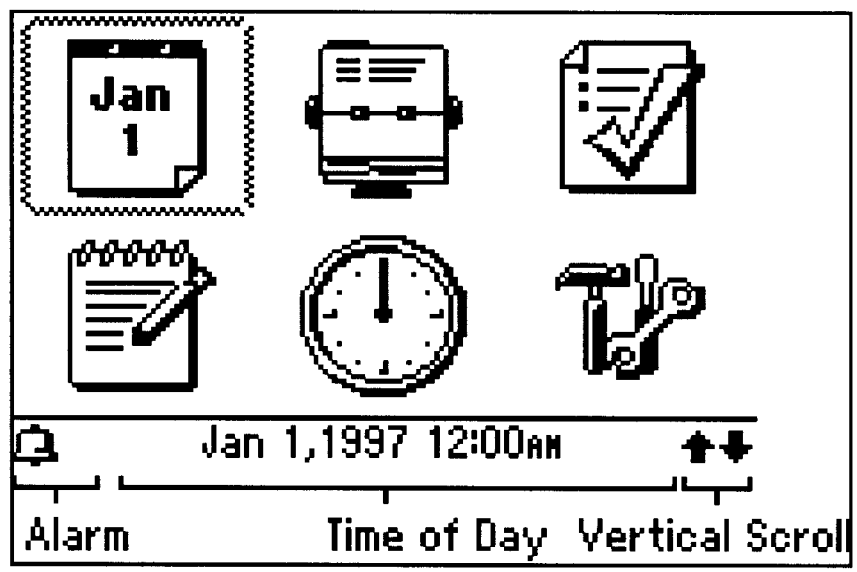
FIGS. 12A–C illustrate bitmap screen shots showing changes to the user interface, which includes a modified status bar.

As shown in FIG. 12A, the status bar icons are slightly changed in the six-button embodiment. The scroll arrow indicators are as before but with the addition of horizontal direction as well as vertical direction options. The VIEW and EDIT key icons appear left of the vertical scroll arrows. The battery warning is removed from the status bar altogether. Instead, battery low alerts will pop up when the unit is first powered on. This alert, which is similar to the unit's memory low alert, must be dismissed before proceeding.

Figure 12B:
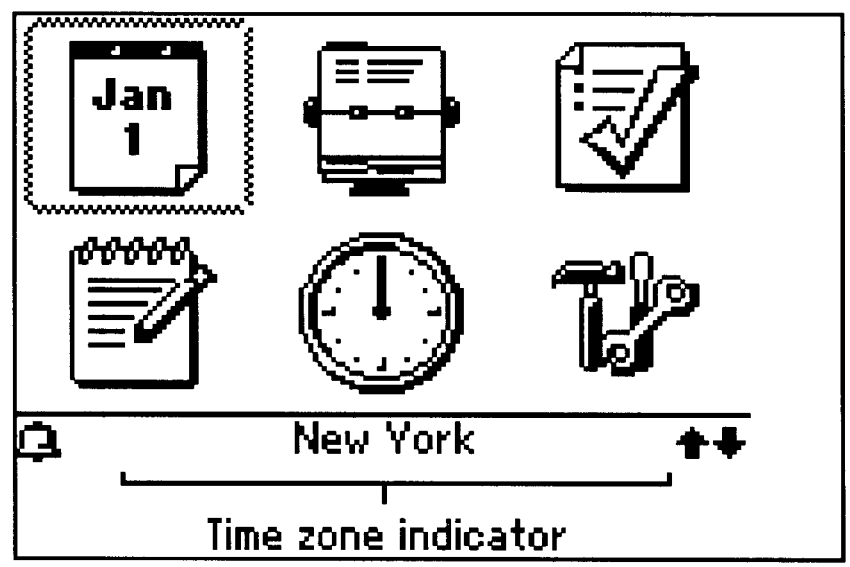
Figure 12C:
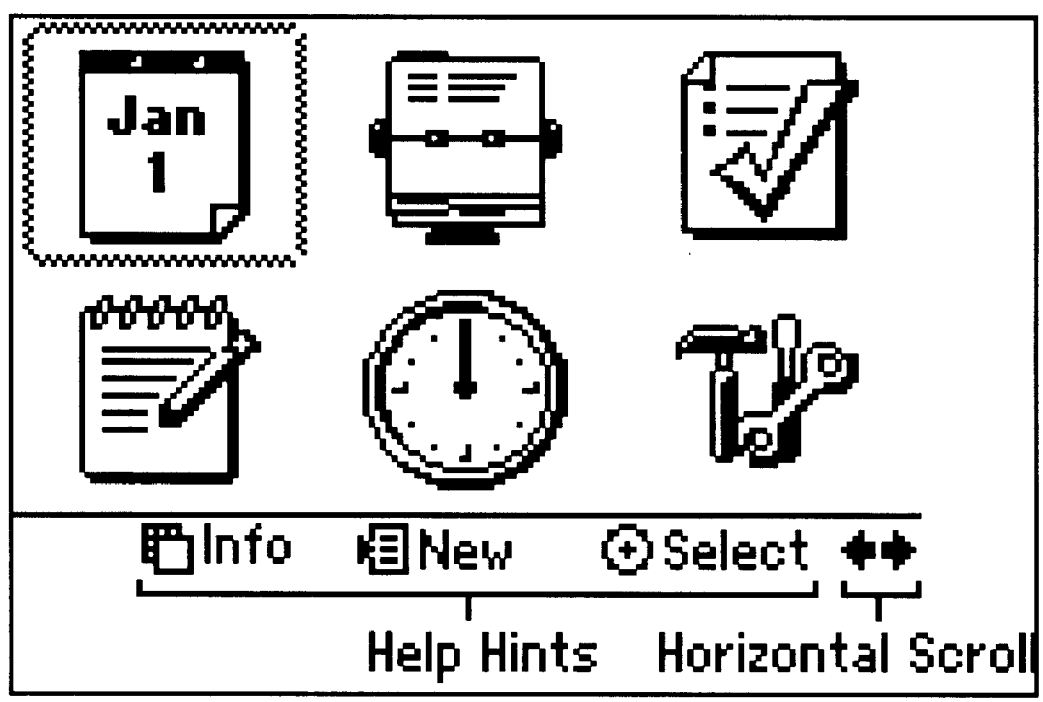

The status bar provides mode cycling—that is, switching content on the status bar every few seconds, thus allowing more information to be packed into the same space. As shown in FIG. 12B, the time of day cycles between the time of day and the name of the time zone city every few seconds when the current zone is not the home zone. As shown in FIG. 12C, the status bar provides help "hints" during operation of Smart Entry Assistants. In hint mode, the status bar icons and time are replaced by a simple legend of key icons and functions. The only standard icons available during hint mode are the scroll indicators.

3. Core user interface controls

The six-button embodiment supports standard (i.e., system-provided) controls that are furnished in the five-key embodiment. These controls remain fundamentally unchanged (except for the occasional use of HOME as an undo operation, as previously described). The six-button embodiment introduces three new controls: a menu control, a text input control, and a "Smart (Entry) Assistant" control. These old and new controls are further described below.

a. Item List Control

The item list control, such as illustrated in FIG. 13A, allows the user to select from a list of items. The list control can render content as text and include optional graphical icons. Scroll indicators can exist inside the list control or on the status bar in the right hand corner. Keys that are functional for an item list control include the BACK, NEXT and SELECT keys. HOME will undo the selection, where applicable, or back out of the current control, where applicable.

b. Chooser Control

The chooser control, illustrated in FIG. 13B, is a compressed one-line item list control. The chooser control has spin indicators to the right hand side. Keys that are functional for a chooser control include BACK, NEXT and SELECT keys. HOME will undo the selection, where applicable, or back out of the current control, where applicable.

c. Menu Control

The menu control, illustrated in FIG. 13C, is a frame extension to the item list control. The menu control contains a caption bar with an optional icon. The menu control is designed to pop up over the screen and to restore the contents beneath after it has been dismissed. As a visual aid, the menu control dithers the backdrop screen while it is operational. Keys that are functional for this control include the BACK, NEXT and SELECT keys. The HOME key as well as the key which activated the menu will both dismiss the menu once it is up.

d. Tabbed List Control

Figures 13D, 13E, 13F, 13G:

The tabbed list control, illustrated in FIG. 13D, combines a horizontal item list control rendered as tabs with a vertical list control. The tabbed list control allows the user to isolate a position within a very large list using the tabs and then to choose a particular item within the list using the vertical item list. The VIEW key can optionally switch lists if there are more than one. This control operates in the exact same manner as the contacts module in the five-key embodiment. Scroll arrows are optionally available in the list or at the right hand corner of the status bar. Keys that are functional in the control include the BACK, NEXT, SELECT and HOME keys. VIEW is available if there are multiple lists to choose from.

e. Password Control

The password control, illustrated in FIG. 13E, is similar to that in the five-key embodiment except that it allows for the use of the sixth EDIT button. This control allows the user to enter a graphical password using any of the keys available on the device. All buttons function with this control.

f. Date-Time Control

The date-time control, illustrated in FIG. 13F, in its three versions, is similar to that used by the five-key embodiment, except that the HOME key is used to back through elements. In particular, the system displays a highlight over the data element (hour, minutes, etc.) currently being set. BACK and NEXT decrement or increment the shown value, respectively. SELECT chooses the shown value and moves the highlight to the next data element to be set, or, if there is no such next data element, completes the entire time/date entry. Prior to completing the time/date entry, HOME returns the highlight to a previous data element within the time-date control. If there is no previous data element (i.e., the current data element being set is the first one), then HOME backs out of the date-time control. The EDIT key is generally not active in this control. Optionally, though, the EDIT key may be used to complete the entire time/date entry, without requiring the user to select through all data elements (in sequence). The date-time control can optionally display both date and time or either date or time elements individually. Keys that are functional in the control include BACK, NEXT, SELECT and HOME keys.

g. Text Input Control

Figure 13H:
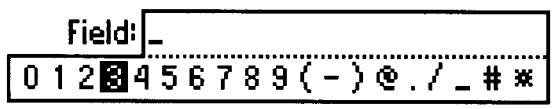

The text input control, illustrated in FIG. 13G, is new to the six-key embodiment. This control allows the entry of simple free-form text. The control uses a letter strip with an active highlight to enter text. The user clicks BACK and NEXT to move to the desired letter (the strip may scroll), and presses SELECT to enter it. HOME acts as a backspace or undo button, reversing the operation of SELECT. There are two letter strips available which can be toggled using the VIEW key. The first contains all of the letters of the alphabet and space. The second contains numbers and a small set of symbols useful for entering phone numbers, e-mail addresses and web addresses. The letters are: A B C D E F G H I J K L M N O P Q R S T U V W X Y Z (space). The letter strip wraps around in both directions. FIG. 13H illustrates the control when used for numeric input. The numbers include digits and special characters: 0 1 2 3 4 5 6 7 8 9 (-) @ . / _ # * ! ~ (space). The number strip also wraps around in both directions. The status bar is in hint mode with a legend for the key operations while a text input control is active. The BACK, NEXT and SELECT keys are used to pick letters. The HOME key is used to undo letters. The VIEW key is used to toggle between letter and number strips and the EDIT key is used to complete the entry.

h. "MessageBox" Control

Figure 13I:
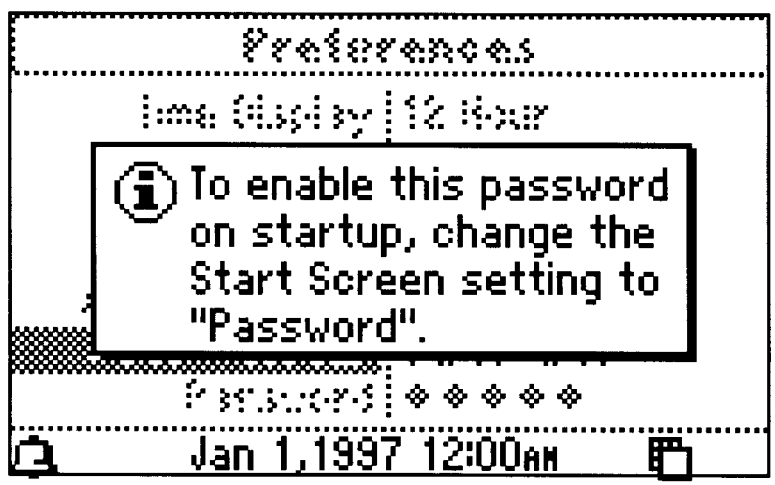

Often, a device will need to display an informational message to the user. A simple pop-up control, illustrated in FIG. 13I, is provided for this purpose. As shown, the control includes a selectable associated icon (e.g., "i" icon for "information"). This Message Box, which includes a drop-shadow outline, automatically resizes vertically to accommodate the message text, and centers horizontally and vertically over a dithered background.

i. Smart Entry Assistant Control

Figure 13J:
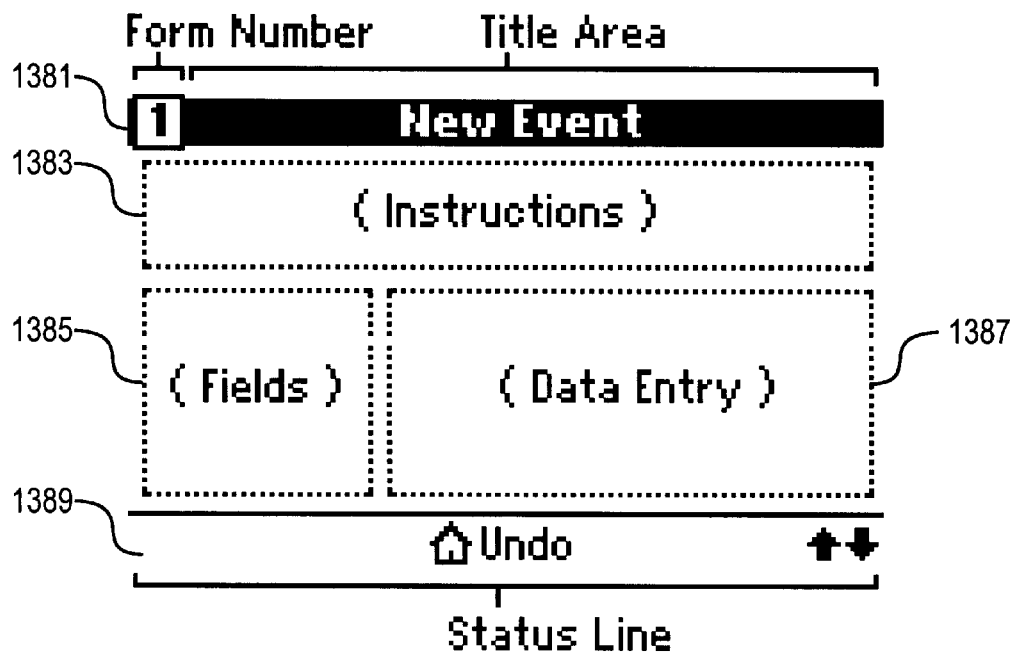

The Smart Entry Assistant control (or simply, "Smart Entry Assistant"), shown in FIG. 13J, is a form-based control which houses text fields and instructions, as well as the other types of controls. The Smart Entry Assistant is broken down into four major areas. The first is the form title area 1381 which includes the form number and a title bar. The second is the instruction area 1383 which houses a simple text statement describing the use of the form. The third is a field title area 1385 which contains right-justified field titles for the various data fields of the form. The fourth area is the data entry area 1387 in which already-entered values for the data fields are displayed and in which the various controls for accepting or editing values for the fields operate.

In the Smart Entry Assistant, the status bar, shown at 1389, operates in hint mode. For the screen shown in FIG. 13J, the status bar indicates that "undo" is accomplished by the HOME key, for instance. Other exemplary hint icons are shown in the leftmost two columns of FIG. 13K. The rightmost two columns of FIG. 13K show exemplary icons that may appear for example as field values or field value choices.

In general, a Smart Entry Assistant is dedicated to a particular task and includes a sequence of one or more "smart" forms. Each of these forms is capable of accepting input or edit of one or more data fields. Each form may itself be considered a separate Smart Entry Assistant. In general, as will be further described, the Smart Entry Assistant is capable of dynamically determining its sequence of forms, and within each form, the sequence of data fields for which input or edit is solicited, and for each field, the initial value, if any, to be presented to the user for edit. This dynamic determination is based on context, including the particular choices and values that the user has already entered, as will be further described.

4. Creating New Entries a. General

The following description demonstrates data entry in the system through example involving input of new calendar events, new contacts and new to do items. In general, new data is entered by the user at the user interface by stepping through a series of fields and controls grouped into a sequence of "smart" forms. Creating new data is preferably done using the EDIT key. The EDIT key operates both from within the home screen and within each module. The EDIT key invokes a list of edit options that relate to the context in which it was called. From within daily view of the calendar, for instance, the edit options include new, change and delete event. More particularly, if no event is currently highlighted in the daily view, the EDIT key invokes only a single option, new event, but if a particular event is currently highlighted in the daily view, the EDIT key invokes the options "Follow UP", "Reschedule", or "Cancel Event". From within the home screen, the edit options include new event, new contact, new to do and new QuickMemo. Specific examples will now be presented.

b. Scheduling Events

Scheduling a new event, because of the variety of options to an event, poses a significant task for a limited-input device. The "Smart Form" approach of the present invention, however, simplifies the task by breaking it up into a series of logical steps. Smart Forms adapt as a user makes choices so as to avoid asking needless questions, which might lead to user confusion. For example, neither the label nor any default or pre-filled value for a field is displayed until the control for inputting or editing that field has been invoked for the first time in a sequence of forms. This avoids confusing the user in case the Smart Assistant dynamically determines that field to be irrelevant, based, for example, on user input for an earlier field.

Figure 14A:
FIGS. 14A–G illustrate bitmap screen shots for exemplary input screens for the user task of scheduling an event.
Figure 14B:

As shown in FIG. 14A, the first step in scheduling an event is to choose the subject of the event from a list, here list 1401. This list contains a small set of common defaults as well as any new subjects which the user has created over time. If the list of choices does not contain the appropriate subject, the user can select "New Subject" 1403 and create a custom one. If the user selects a subject from the list, the NEXT indicator 1405, shown in FIG. 14B, appears at the bottom of the screen, confirming the user's choice and allowing the user to move on to the next step.

Figure 14C:

If the user selects "New Subject," the Smart Assistant adapts and allows the user to create a custom subject. The process is illustrated in FIG. 14C. The first step in creating a custom subject is to choose an event type from a list 1407 of generic event types (e.g., six types). The system provides types covering a broad range of business and personal scheduling needs; examples include:

| | |
|---|---|
| 1. Meeting: | time of day event, optional participant, optionally recurring, optional alarm (e.g., meeting with person, weekly staff meeting, and the like) |
| 2. Event: | time of day event, optionally recurring, optional alarm (e.g., doctor's appointment) |
| 3. All-Day Event: | one day event, optionally recurring (e.g., company outing or casual day) |
| 4. Multi-Day Event: | event over multiple days (e.g., conference, vacation) |
| 5. Annual Event: | one day event which happens every year (e.g., birthday, holiday, and the like) |
| 6. Travel: | time of day event, time zones, alarm, and the like (e.g., flight) |

Figure 14D:
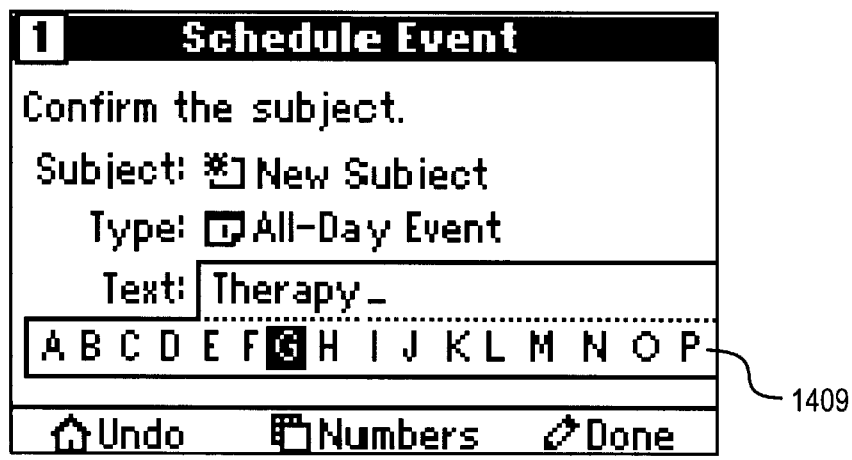
Figure 14E:

After selecting the new event type, the next step is to enter the subject text using the text input control, as shown at 1409 in FIG. 14D. Once the text for the subject has been entered, the NEXT indicator 1411 appears, as shown in FIG. 14E, allowing the user to confirm the newly entered subject and move on to the next step. This newly entered subject will appear in the subject list along with its type icon the next time the user schedules an event. Clicking the SELECT button moves the user on to the next Smart Assistant form.

Figure 14F:
Figure 14G:
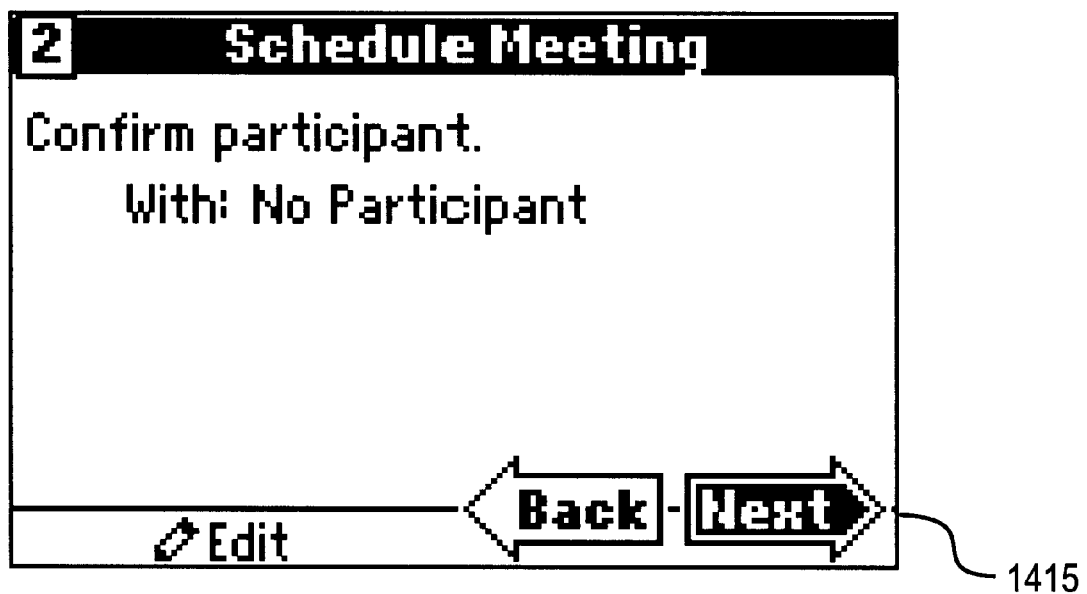

For those events that can have a participant, the next step is to select an optional participant. Event types, such as holidays, can be defined to not support participants. For those that do, at least one participant is supported. In the case of meetings, participants can be people or companies. As shown in FIG. 14F, the first step in choosing a participant is to choose whether the participant is a person or a company and whether the participant exists in the contacts list or must be entered in. The option to have "no participants" is always available as well. If the user chooses "no participant", as shown at 1413 in FIG. 14F, the familiar NEXT indicator appears, as shown at 1415 in FIG. 14G, and the user can click the SELECT button to move on to the next step.

c. Company Create Form

If the user chooses to enter a new company that does not exist in the contact database, the Smart Assistant adapts in a similar manner to the case of a new person, as shown in FIG. 15A. The form allows the user to enter the name of the company. Once the user has completed the name, the user can choose whether and where to file the new company name in the contact database, as shown in FIG. 15B. As usual, once the user has completed the company name and chosen a filing category, the NEXT indicator appears, as shown in FIG. 15C. The user can click SELECT to move on to the next step.

5. Choosing a Time a. General

For those events which require a time, such as meetings, the next step is to select a starting date and a time. The Smart Assistant uses a series of time and date choosers to enter the date and time. The "Time" Smart Assistant takes on four different forms depending on the type of event. For all-day events and annual events, the Smart Assistant will take on a date form. For multi-day events, the Smart Assistant will take on a date-span form. For meetings and events, the Smart Assistant will take on a time-span form. For travel events, the Smart Assistant will take on a zone-span form.

a. Date Form

Figure 16A:
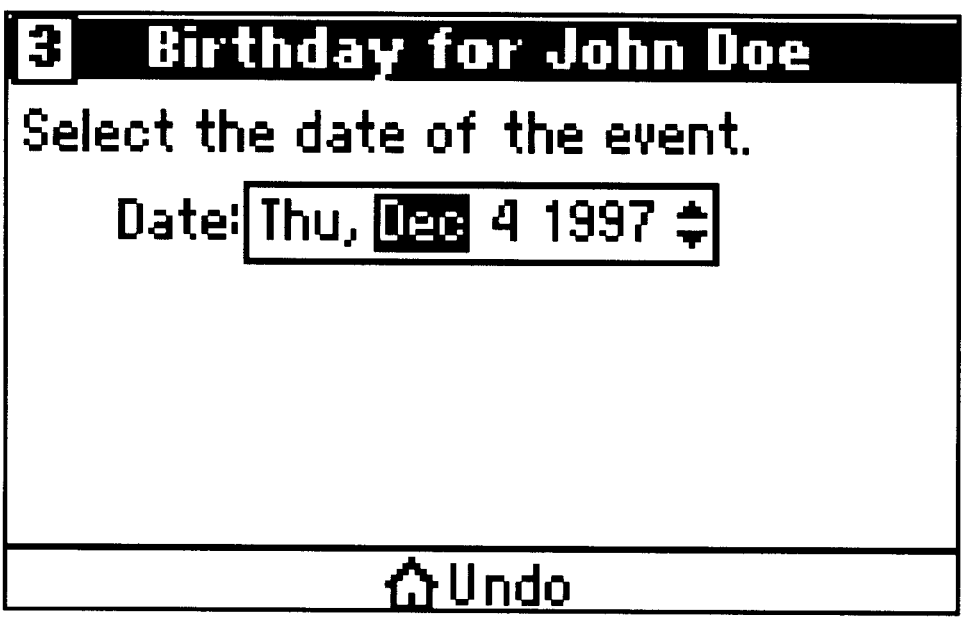
FIGS. 16A–B illustrate bitmap screen shots for the specific example of entering a birthday event.
Figure 16B:
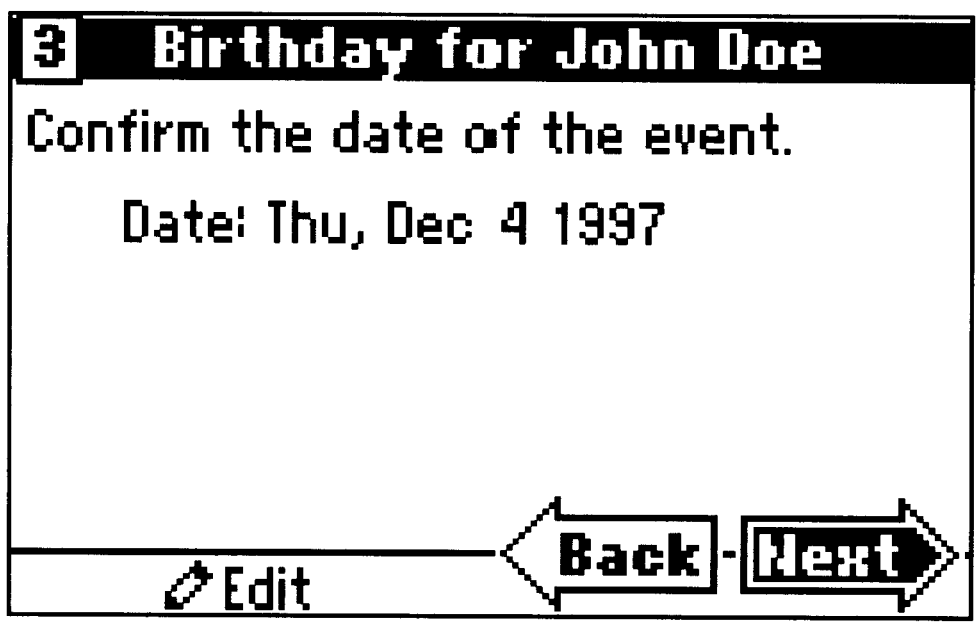

The date form is used for all-day events and annual events. As illustrated in FIG. 16A, this form has only one item, the date on which the event happens. Once the date has been entered, the NEXT indicator appears, allowing the user to confirm the entry and move on to the next step, as shown in FIG. 16B. The user can move on to the next step using the SELECT key.

b. Date-Span Form

Figure 17A:
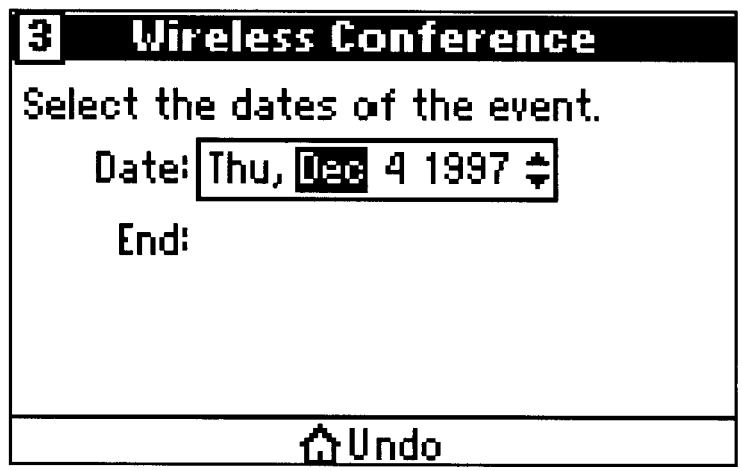
FIGS. 17A–C illustrate bitmap screen shots for the specific example of entering a wireless conference event.
Figure 17B:
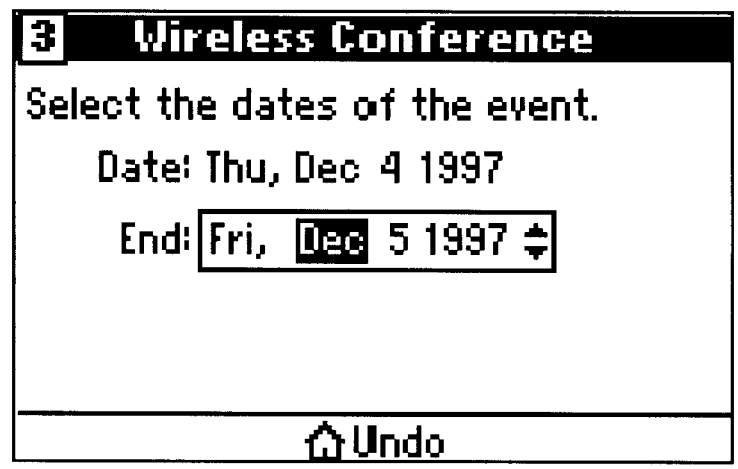
Figure 17C:
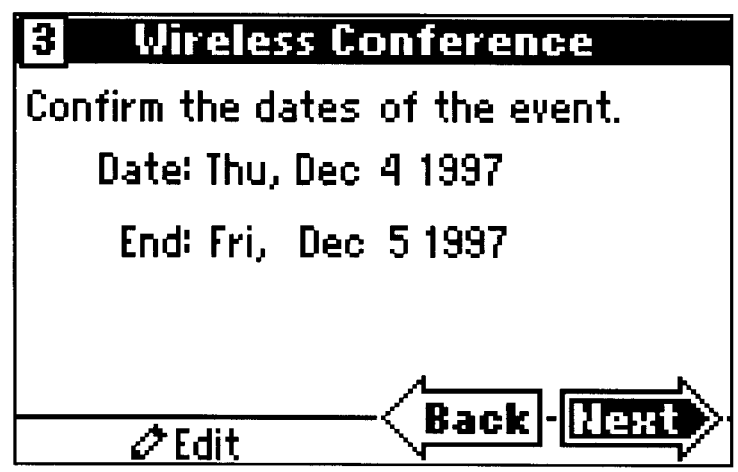

The date-span form is used for multi-day events. This form is similar to the date form with the addition of an end date element. The first step is to enter the event starting date, as illustrated in FIG. 17A. The next step is to enter the ending day for the event, as shown in FIG. 17B. After the starting and ending dates have been entered, the NEXT indicator appears, as shown in FIG. 17C, allowing the user to confirm the date range and continue on to the next step. The user can move on to the next step using the SELECT key.

c. Time-Span Form

Figure 18A:
FIGS. 18A–D illustrate bitmap screen shots for the specific example of entering a meeting with a particular individual.
Figure 18B:
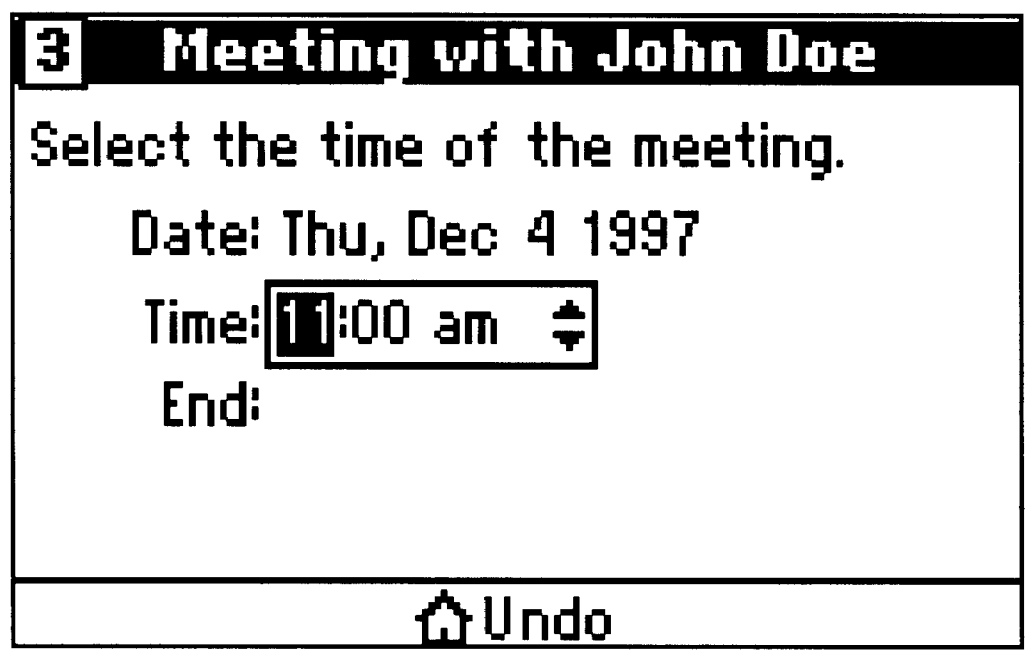
Figure 18C:
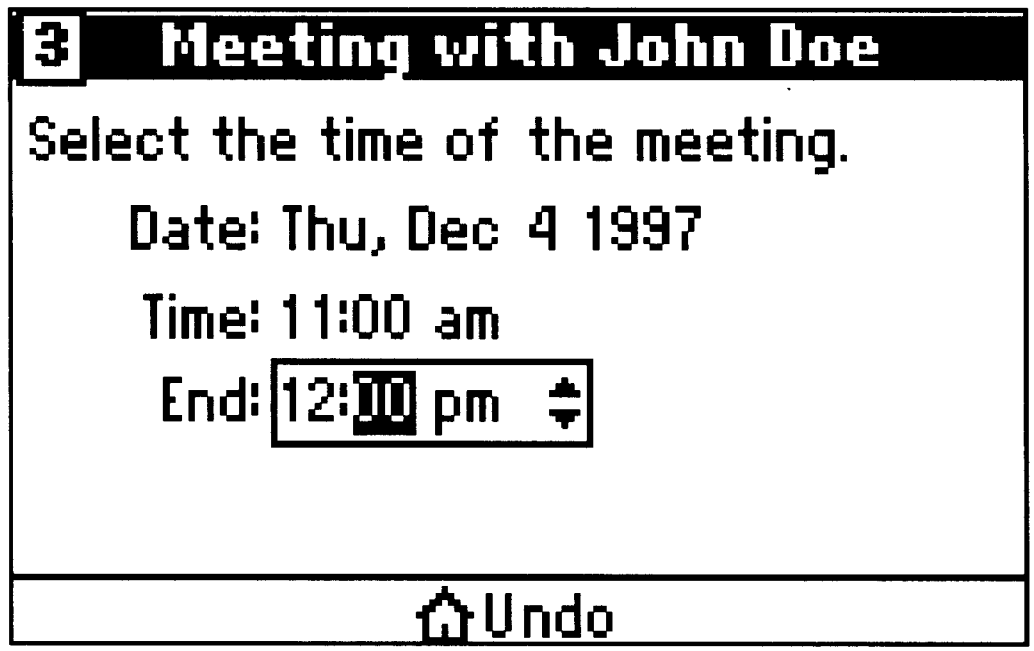
Figure 18D:
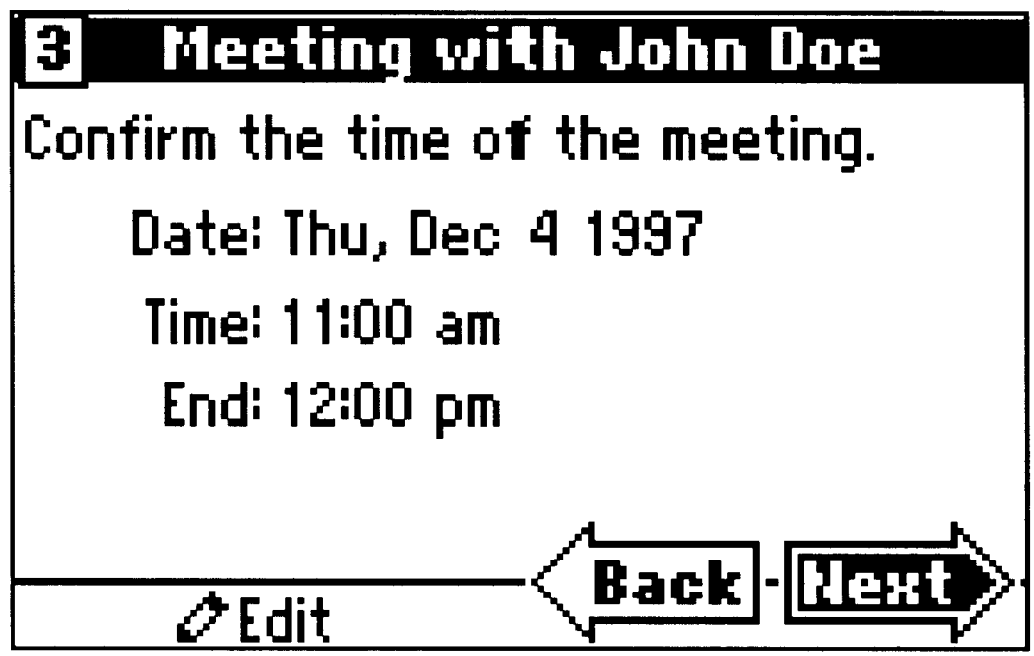

The time-span form, shown in FIG. 18A, is used for meetings and events. The time-span form is similar to the date-span form except that it uses starting and ending times in addition to a starting date. The first step is to enter the starting date, as illustrated in FIG. 18A. Once the starting date is entered, the user enters the starting time, as shown in FIG. 18B. Once the starting time is entered, the user enters the ending time, as shown in FIG. 18C. Once the ending time is entered, the familiar NEXT indicator appears, allowing the user to review the choices and move on to the next step, as shown in FIG. 18D. The user can move on to the next step using the SELECT key.

d. Zone-Span Form

Figure 19A:
FIGS. 19A–H illustrate bitmap screen shots for the specific example of entering a trip, which includes a specific departure time and arrival time, as well as a specific destination.
Figure 19B:
Figure 19C:
Figure 19D:

The zone-span form, shown in FIG. 19A, is a special form used for travel events. This form allows the user to specify a departure time and an arrival time as it would be printed on a travel ticket. This form will compute any time-zone translations if the event crosses time zones. The first step is to enter the departure date, as shown in FIG. 19A. The next step is to enter the departure time, as shown in FIG. 19B. The third step is to select the departure city from the list of available cities as shown in FIG. 19C. This is the same list which is used by the EarthTime clock module (which is described in further detail in commonly-owned U.S. application Ser. No. 08/609,983, filed Feb. 29, 1996, the disclosure of which is hereby incorporated by reference). Finally, the NEXT indicator appears, as shown in FIG. 19D, confirming the user's selection and allowing the user to move on to selecting the arrival time.

Figure 19E:
Figure 19F:
Figure 19G:
Figure 19H:
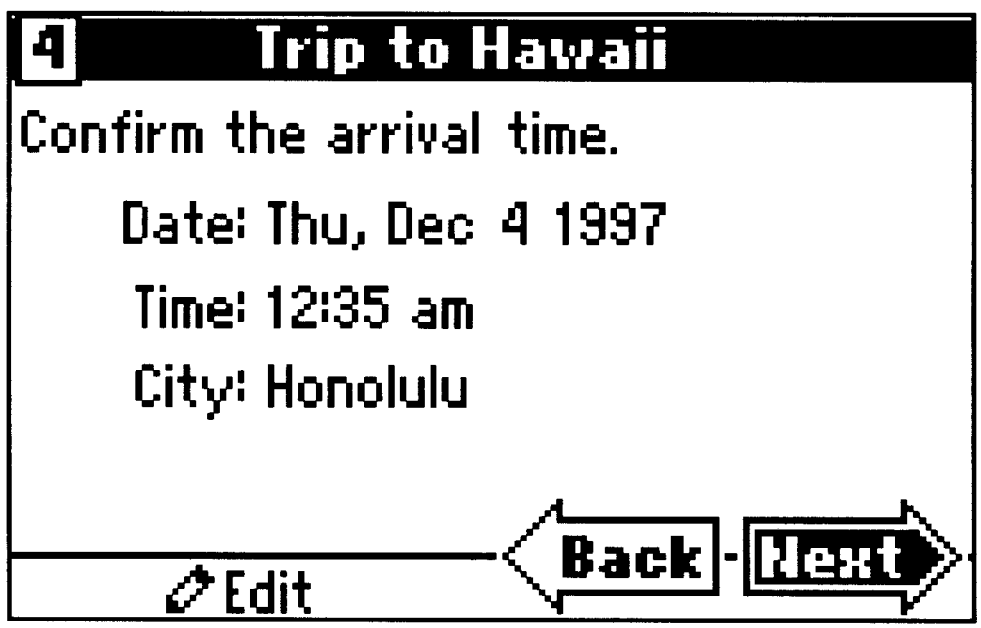

The arrival time sequence is identical to the departure time sequence. The first step is to enter the arrival date, as shown in FIG. 19E. The next step is to enter the arrival time, as shown in FIG. 19F. The final step is to enter the arrival city, as shown in FIG. 19G. If this city is in a different time zone from the departure city, the system will automatically compute time zone adjustments when storing the event. Finally, the usual NEXT indicator appears, confirming the arrival time and allowing the user to move on to the next step, as shown in FIG. 19H. The user can move on to the next step using the SELECT key.

6. Choosing a Recurrence Pattern

The next step for those event types which support recurring behavior, such as meetings, is to enter the recurrence pattern. The first choice is always "none" if the user does not require recurring behavior. The other choices are weekly, bi-weekly, monthly on a day, monthly on a date and yearly. The actual text for the choices is based on the starting date entered earlier. In this example, the starting date was Thursday, Dec. 4, 1997. The choices would then be:

1. no
2. Weekly on Thursdays
3. Bi-weekly on Thursdays
4. Monthly on 4th
5. Monthly on 1st Thursday
6. Yearly on December 4

In the cases where the date falls on the last day of the week of the month or the last day of the month the following additional cases are added:

7. Monthly on last Thursday
8. Monthly on last day

Figure 20A:
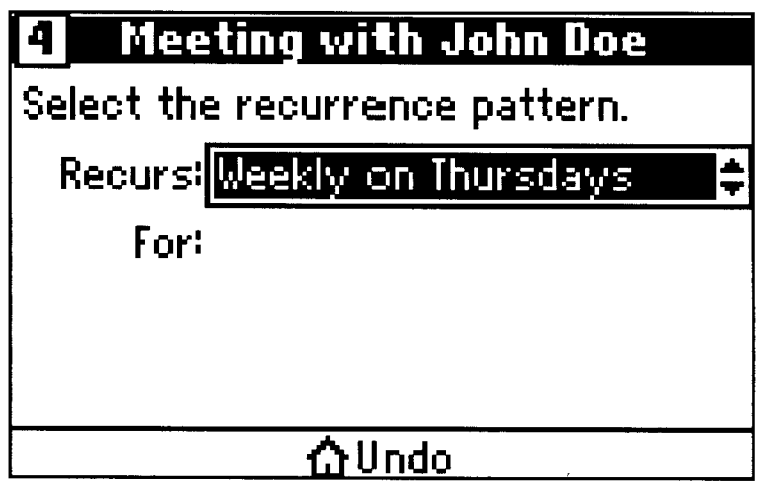
FIGS. 20A–C illustrate bitmap screen shots for an entry having a recurrence pattern.

The result is shown in FIG. 20A. Although not every possible recurrence pattern is supported, the majority of patterns which occur are.

Figure 20B:
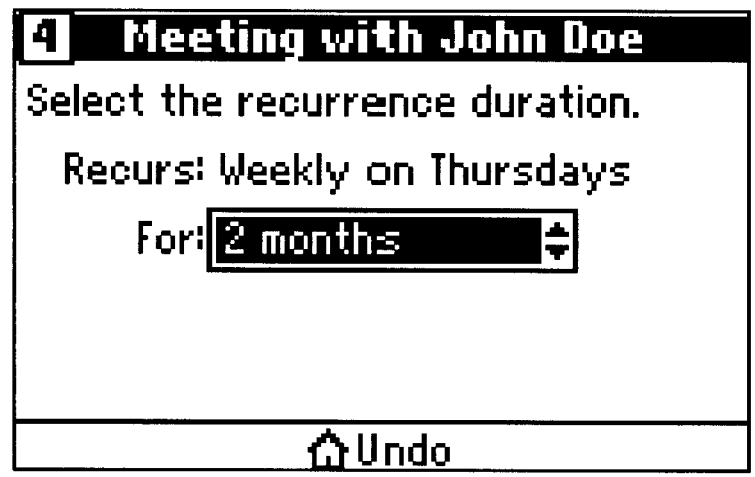
Figure 20C:
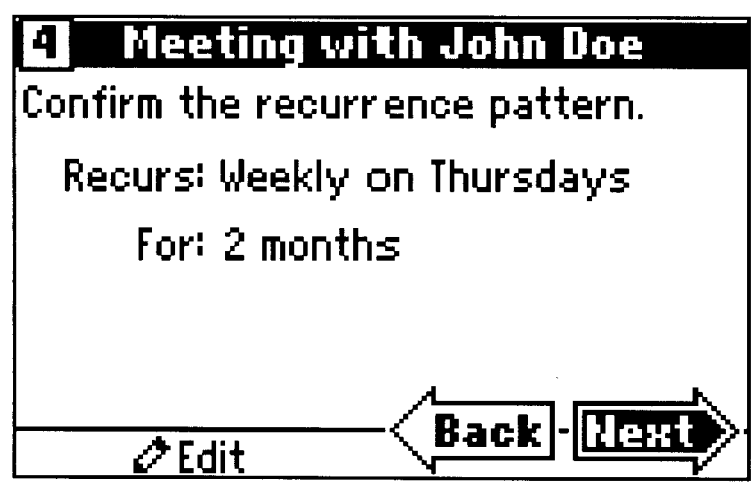

Once the recurrence pattern has been chosen, the user then selects the duration of the recurrence. The granularity of choices is limited by the recurrence type, weekly, monthly or yearly. The choices, which are displayed as illustrated in FIG. 20B, include:

1. 2 weeks, . . . , 7 weeks
2. 2 months, . . . , 11 months
3. 1 year, . . . , 10 years
4. Indefinitely Once the user has selected a recurrence pattern and a duration, the familiar NEXT indicator appears, confirming the user's choices, as shown in FIG. 20C. The user can hit SELECT to move on to the next stage.

7. Choosing a Reminder

Figure 21A:
FIGS. 21A–C illustrate bitmap screen shots for setting a reminder for an event, such as a reminder for a meeting.
Figure 21B:
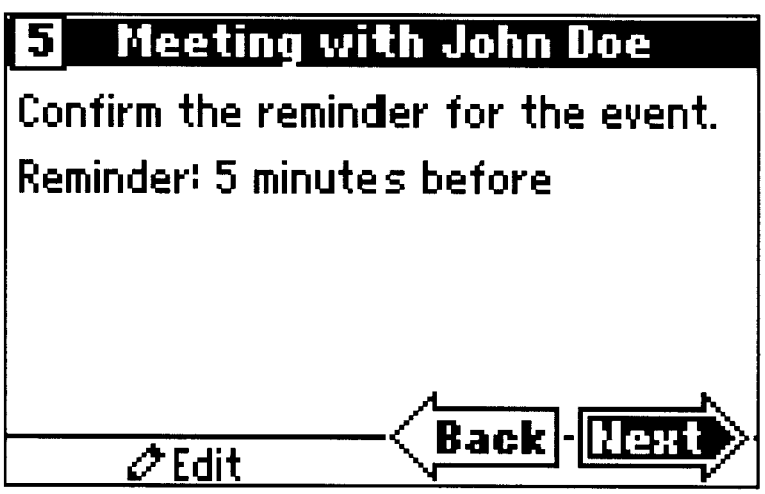

The next step for events which have a time, such as meetings, is to choose whether to activate the event reminder. This Smart Assistant allows the user to activate the reminder and specify the prior notification period of the reminder. The choices, which are displayed as shown in FIG. 21A, include:

1. none
2. 5 minutes before
3. 15 minutes before
4. 30 minutes before
5. 1 hour before
6. 2 hours before
7. 3 hours before
8. 4 hours before
9. 5 hours before Once the user has chosen whether to activate the reminder and what to use as a prior notification period, the familiar NEXT indicator appears, as shown in FIG. 21B, confirming the user's choice. The user can hit SELECT to move on to the next stage.

8. Summary Screen

Figure 21C:
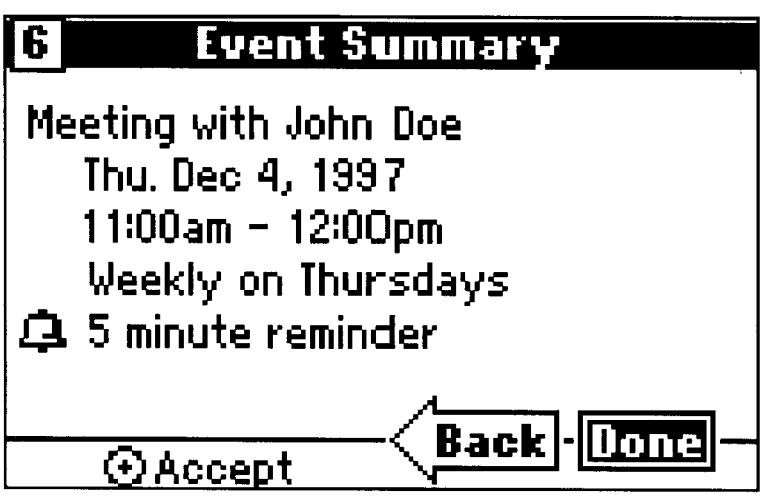

The final stage of any sequence of Smart Assistant is the "Summary" (display). For events, the Summary illustrates the complete sequence of user choices and allows the user to review the event before submitting it to the system, as demonstrated in FIG. 21C. To accept the new event, the user simply hits the SELECT key and the Smart Assistant entry system returns to the screen and module from which it was invoked.

9. Smart Entry Assistant Layouts for Event Types

The follow is a summary of the Smart Entry Assistants used in the preferred six-button embodiment to construct the various types of events.

Meeting

The following forms are used to enter a meeting.
1. Subject Entry
2. Participant Entry (Person I Company)
3. Date Entry (Time-Span Form)
4. Recurrence Pattern Entry
5. Reminder Entry
6. Summary Event The following forms are used to enter an event.
1. Subject Entry
2. Date Entry (Time-Span Form)
3. Recurrence Pattern Entry
4. Reminder Entry
5. Summary All-Day Event The following forms are used to enter an all-day event.
1. Subject Entry
2. Date Entry (Date Form)
3. Recurrence Pattern Entry
4. Summary Multi-Day Event The following forms are used to enter a multi-day event.
1. Subject Entry
2. Date Entry (Date-Span Form)
3. Summary Annual Event The following forms are used to enter an annual event.
1. Subject Entry
2. Date Entry (Date Form)
3. Summary Travel The following forms are used to enter a travel event.
1. Subject Entry
2. Date Entry (Zone-Span Form)
3. Summary 10. Making Corrections Making corrections with the Smart Assistant system is possible and quite simple. Whenever a NEXT or DONE indicator appears, the user has the option to review the information on the form and change anything by pressing the EDIT key as indicated in the status bar. The user can also back up to a previous form by pressing the left arrow to move to the BACK indicator and hitting the SELECT button.

Figure 22A:
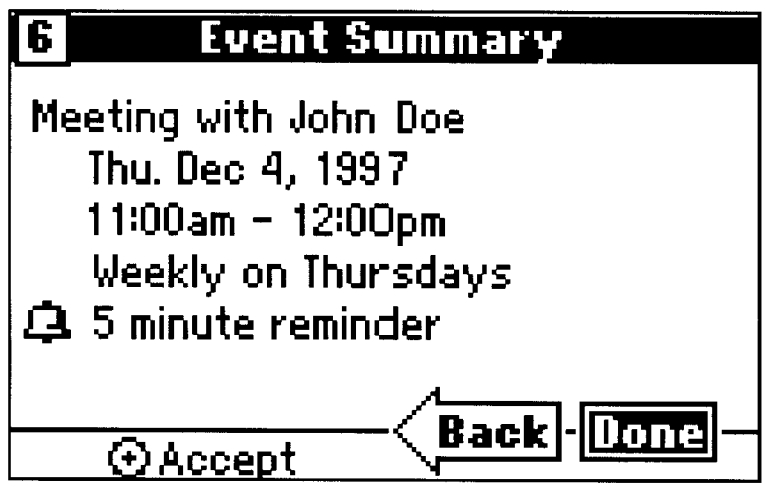
FIGS. 22A–J illustrate bitmap screen shots for making corrections using a "Smart Assistant" provided by the system of the present invention.

This is perhaps best illustrated by example. Suppose, for example, that the user notices that the last name for a meeting participant is incorrect. The user does not notice this until the last minute, at the summary screen. The name should be "John Dunn" instead of "John Doe" that is shown in FIG. 22A.

Figure 22B:
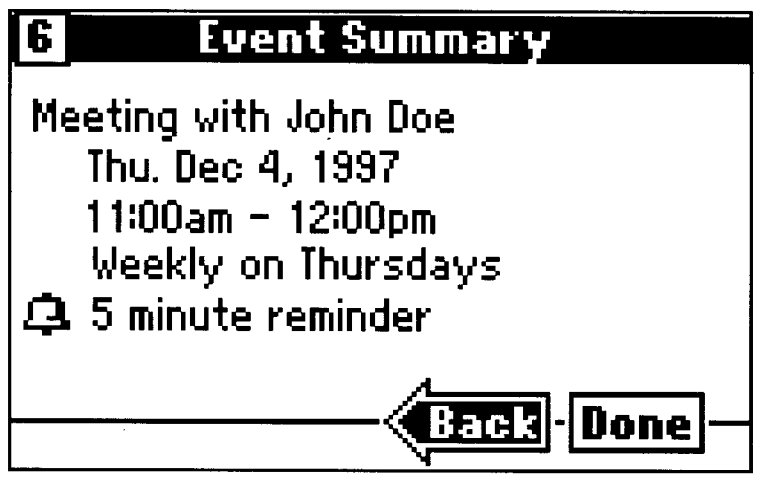
Figure 22C:
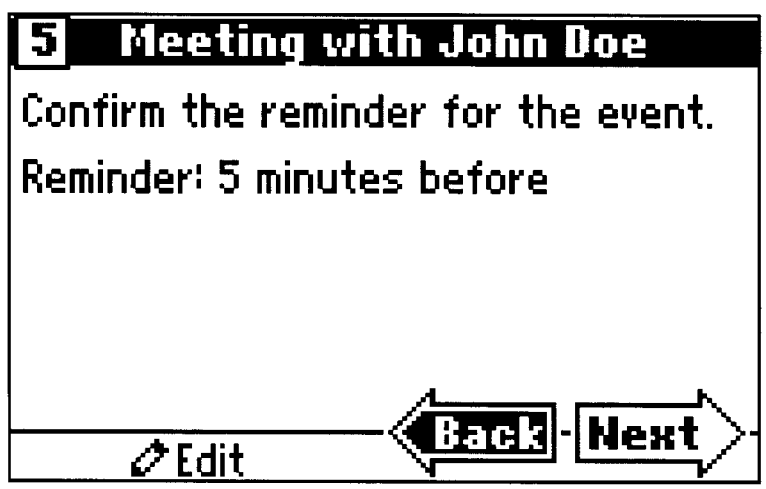
Figure 22D:
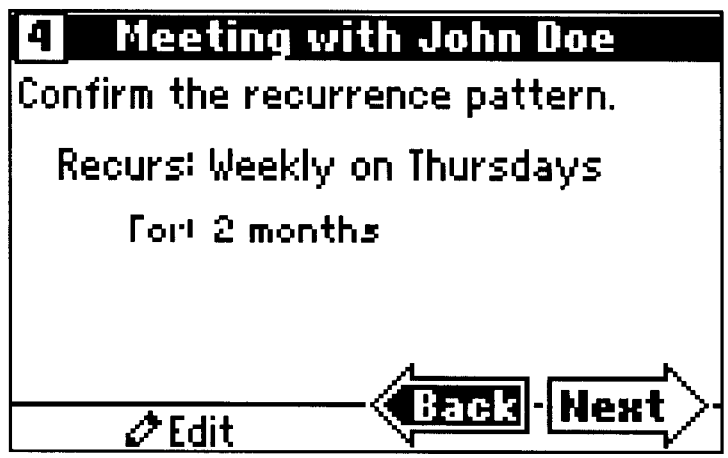
Figure 22E:
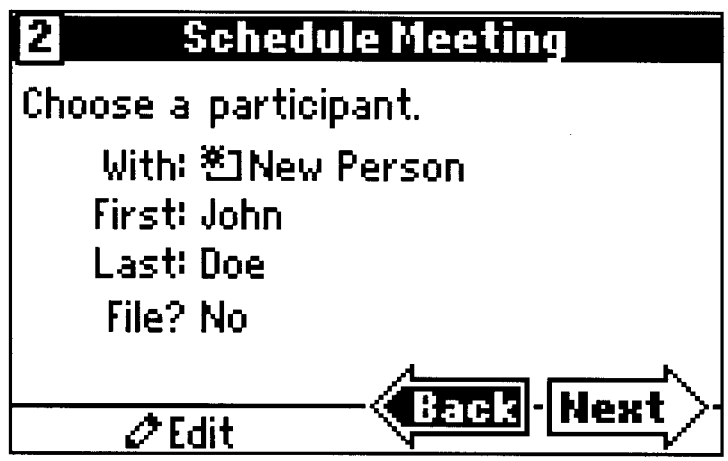
Figure 22F:
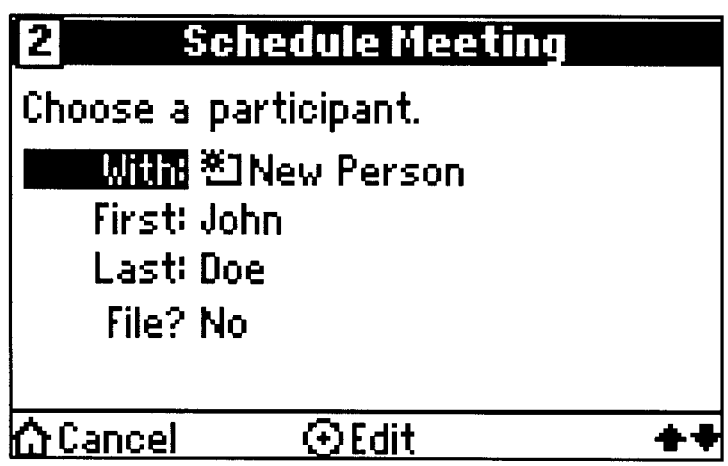
Figure 22G:
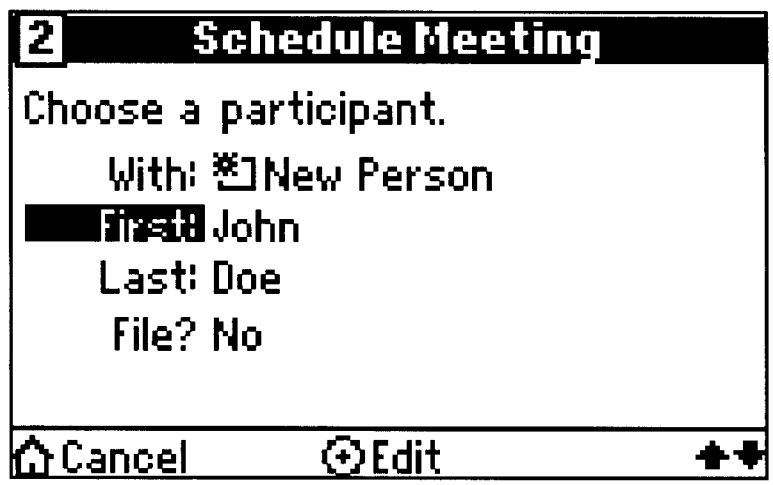
Figure 22H:
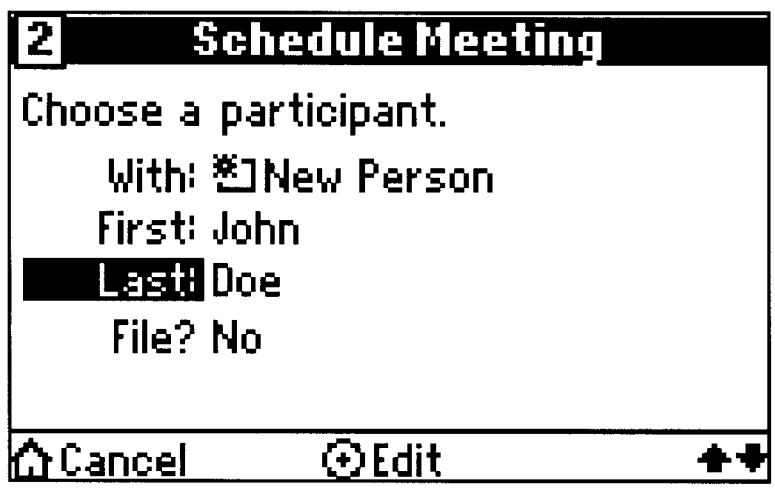
Figure 22I:
Figure 22J:
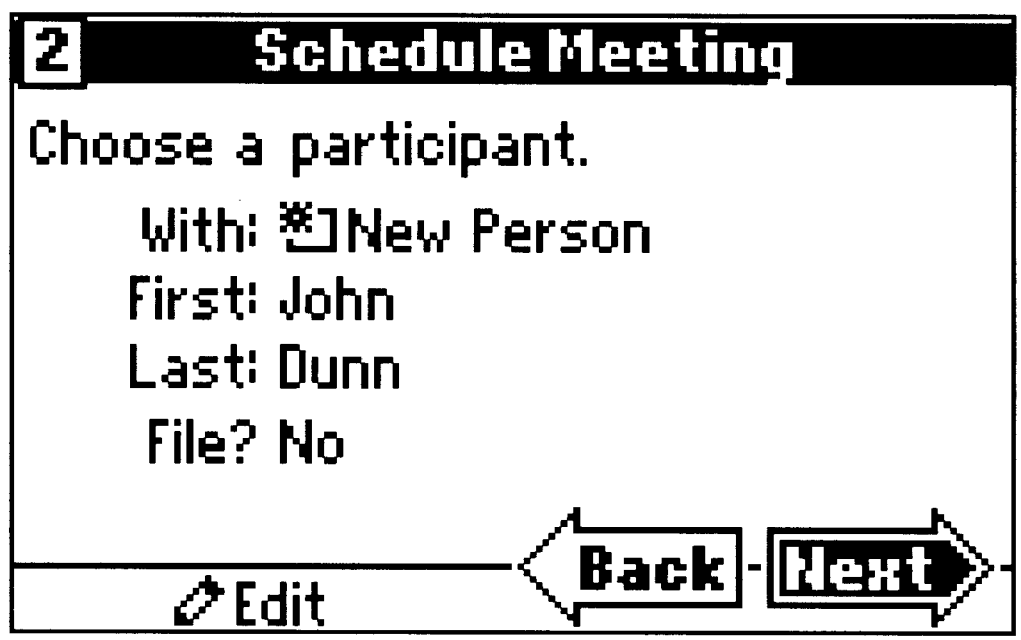

The first step is to hit the left arrow key to reverse to the BACK indicator and then press the select key to go back to the previous form, as shown in FIG. 22B. Hitting SELECT will move the input focus back to the previous form, the reminder, with the BACK indicator showing, as illustrated in FIG. 22C; hitting SELECT again will take the user to the previous form, the recurrence form, with the BACK indicator showing, as illustrated in FIG. 22D. Hitting SELECT yet again will take the user to the previous form, the participant form, with the BACK indicator showing, as illustrated in FIG. 22E. This is the form with the last name field which needs to be changed. The next step is to hit the EDIT key as indicated in the status bar to begin editing the form. Once the EDIT key is pressed, the BACK/NEXT indicator is removed and the first field on the form is highlighted, as shown in FIG. 22F. By using the up and down arrow keys, the user can move the highlight to a particular field for editing. Hitting the down arrow key moves the highlight from the "with" field to the "first" name field, as shown in FIG. 22G. Hitting the down arrow key again moves the highlight to the "last" name field which is the field the user wishes to change, as shown in FIG. 22H. Once on the field which needs edits, the user can hit the SELECT key to change the field value, as indicated by the status bar. In this case, the user changes "Doe" to "Dunn," as shown in FIG. 22I. Once the user is done editing the field, the highlight returns to the BACK/NEXT indicator, as shown in FIG. 22J. The user can use SELECT to continue to the next form until reaching the summary again. The user can make additional changes anywhere along the way.

In certain cases, such as during a change to the type of participant, the Smart Assistant must adapt in response. In the example above, if the user selected the "with" field and changed it to a "New Company" instead of "New Person," the Smart Assistant would remove the first and last name fields and add a blank company title field. Instead of moving immediately to the BACK/NEXT indicator, in this case, the Smart Assistant would require that the user enter data to complete the form first. This will now be illustrated.

Figure 23A:
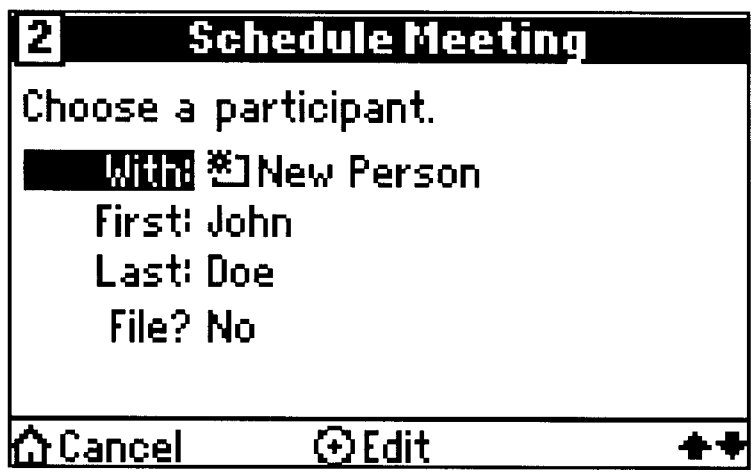
Figure 23B:
Figure 23C:

From the BACK/NEXT indicator at the bottom of the participant form, the user hits the EDIT key to begin edits, as FIG. 23A illustrates. The user then hits SELECT to change the "with" field. The list control will pop up with the current selection already highlighted, as shown in FIG. 23B. The user then changes the selection to "New Company," as illustrated in FIG. 23C. Because the new type requires modification to the form, the Smart Assistant resets. The "Company" text field is added and the user is required to enter the text for the company name, as shown in FIG. 23D. The Smart Assistant then continues with the form as though all fields from the point of modification on are blank. In this case, the user also has the option of filing the company, as shown in FIG. 23E. Finally, the Smart Assistant returns to the BACK/NEXT state shown in FIG. 23F, once the form is completed. This mechanism allows the user to review and make changes to any data in the Smart Assistant system.

Figures 24A, 24B, 24C:
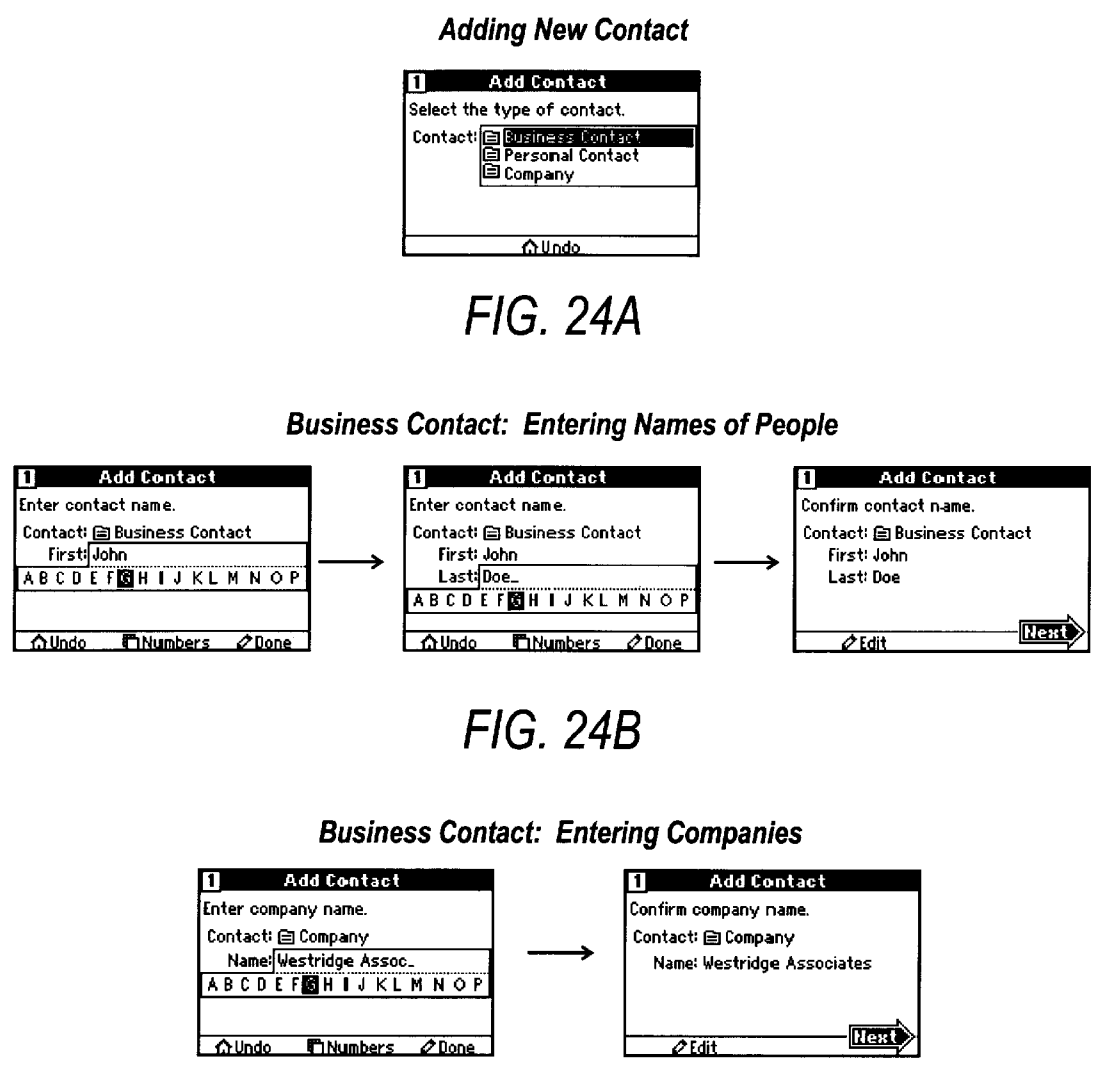

FIGS. 24A–E demonstrate exemplary input screens for the task of adding a new contact. This example illustrates the additional task of inputting the company name of a new company. In FIG. 24A, the user selects the type of contact, here a "business contact". Next, the user enters a name for the business contact, a person. Specifically, as shown at FIG. 24B, the user enters a first and last name for the business contact, using the Text Input Control. Now, the user enters a company name, as shown at FIG. 24C, again using the Text Input Control. As shown in FIG. 24D, the user can now specify how the new entry should be filed. In this example, the user decides to file the new entry under "Business". FIG. 24E demonstrates the process for the task of adding company information for the contact, here Westridge Associates. Had the company been previously entered, the user may simply select it from the company pull-down list. For this example, however, the company name is new. Therefore, the user enters the name of the new company, using the Text Input Control. The company name need only be entered once; for subsequent contacts of that company, the user will be able to simply select the company name from the pull-down list. As shown in FIG. 24F, the user enters contact information, such as a work phone number. As illustrated in the figure, the user provides this input using the Text Input Control. Thereafter, the user has completed input of the "Business Contact" entry and may select the "Next" button, for proceeding to the Summary screen as illustrated in FIG. 24G. The user completes the task by invoking the "Done" screen button.

Figures 25A, 25B, 25C:
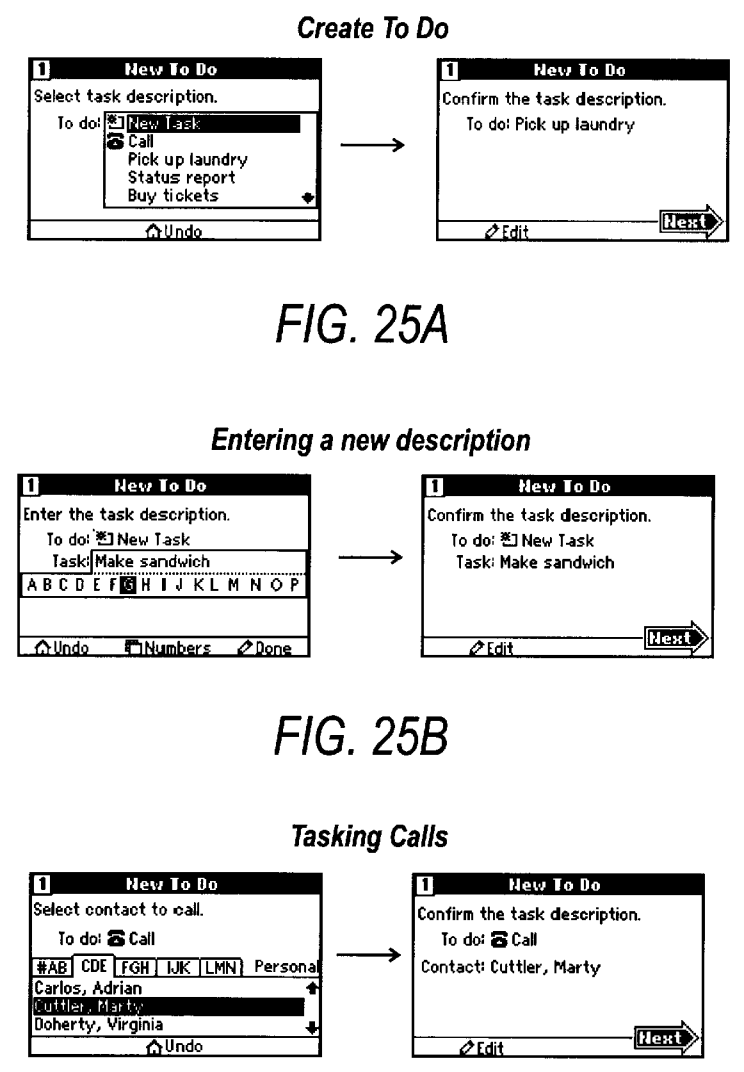
Figure 25D:
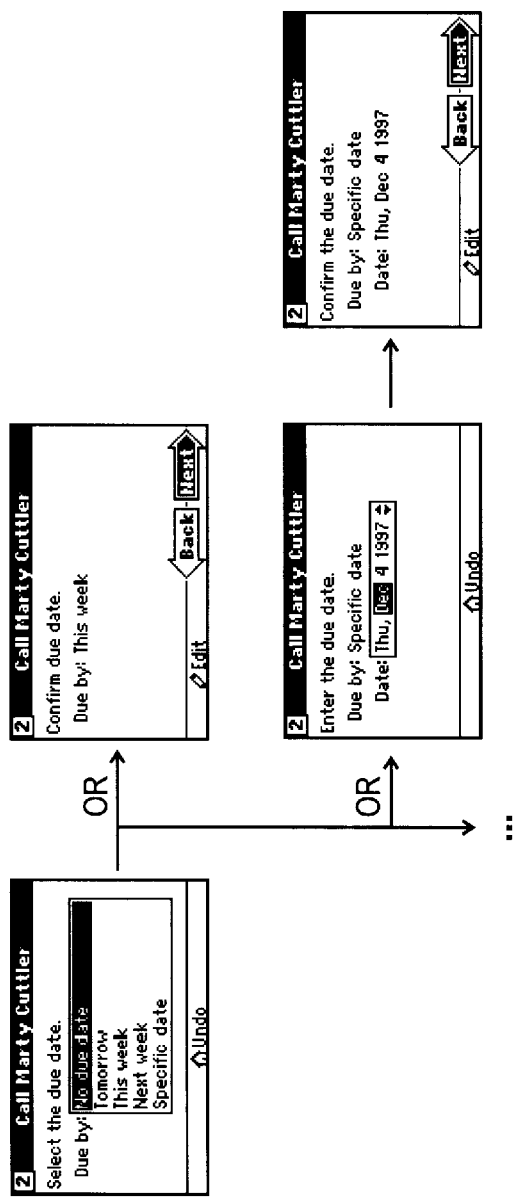
Figure 25E:
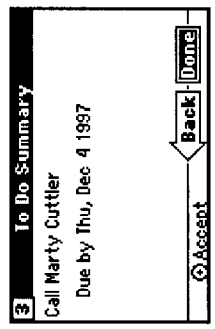

FIGS. 25A–E illustrates exemplary input screens for the task of creating a "to do" item. FIG. 25A illustrates the additional task of specifying a new task description (i.e., one which is not available from the pull-down list). As shown in FIG. 25A, the user may select a task description from the task description pull-down list, such as the task of "pick up laundry". Alternatively, however, the user may define a new task description. This is done by instead selecting "New Task", as shown. Continuing onto FIG. 25B, the user now enters a new description, again providing the input via the Text Input Control. Here, the user enters a task description of "make sandwich".

FIGS. 25C–D demonstrates the task of completing input for a "call" to do item. As shown, in FIG. 25C, the user simply selects a contact (i.e., person) from the Tabbed List Control. Had this been a new contact, however, the user could have entered a new individual using the Text Input Control. As shown in FIG. 25D, the user can specify a due date by selecting from a "Due by" pull-down list. For example, the user could specify that this is due by "this week". For this example, however, the user specifies that the due date is a specific date. Accordingly, the user enters a particular date, using a date input control. After completing input, the user selects the "Next" button, for proceeding to the Summary screen, as demonstrated in FIG. 25E. The user completes the task by invoking the "Done" screen button.

11. Text Entry

The text input control automatically performs intelligent capitalization as the user types. This provides a great convenience for the user and largely eliminates any need for the text input control to accept both upper- and lower-case letters. Automatic capitalization depends on context (e.g., the type of data field involved). Automatic capitalization works for names (e.g., of a contacts) and titles (e.g., subject of an event) according to the following rules:

Rule 1. Immediately capitalize an entered letter if it is the first character in a field.

Rule 2. Immediately capitalize an entered letter if it immediately follows a non-letter, non-apostrophe, non-digit character. (E.g., do not capitalize 's' in the following example texts: "Ester", "Tom's", "1st")

Automatic capitalization works for the body of memos (e.g, "QuickMemos") according to the following rules:

Rule 1. Immediately capitalize an entered letter if it is the first character of the field.

Rule 2. Immediately capitalize an entered letter if it immediately follows a string of one or more <space>s that is immediately preceded by a <period>or <exclamation point>.

Automatic capitalization works for states (e.g., in a contact) according to the following rules:

Rule 1. If the first character in the field is a letter, immediately capitalize it, and then
   if the second character in the field is a letter, immediately capitalize it, and then
     if any third character is entered into the field, immediately uncapitalize the second character in the field and handle the third and subsequent characters by using the capitalization rules for names and titles. (And if the user at any time backspaces over the third character, immediately recapitalize the second character.)

Rule 2. If the first character in the field is a not a letter, use the capitalization rules for names and titles.

12. Optional Features a. Alternative Text Input Control, with 'Erase' Entry

Figure 26:
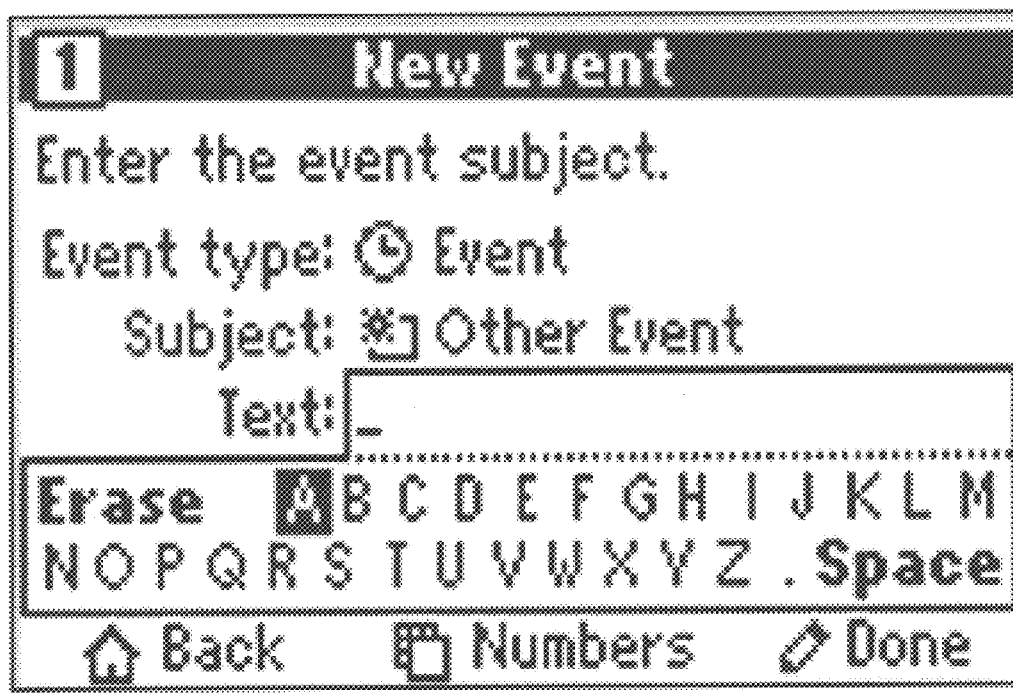
FIG. 26 illustrates a bitmap screen shot of an alternative text input control that includes a special, functional character, "Erase".

In an embodiment of the invention, an Alternative Text Input Control, as shown in FIG. 26, is used. This Alternative Text Input Control resembles the original version described above (e.g., in FIG. 13H) except for the following features. The letter strip includes multiple rows (e.g., two rows) of entries (e.g., characters) on the screen, instead of just one, and all entries within the letter strip are simultaneously visible on-screen. The entries, as well as the highlight for the entries, wrap from one end of one row to an end of an adjacent row (e.g., top row's right end to second row's left end), and vice versa. (Another example: the bottom row's right end wraps into the top row's left end.) The first of two available letter strips includes the following entries: Erase A B C D E F G H I J K L M N O P Q R S T U V W X Y Z (period) Space. The second available letter strip includes the following entries: Erase 123456789 (–) *# @ $ % & ' ? ! (period) Space.

The Erase entry, if selected by the user in the same manner as any other entry, acts as a backspace or undo button. The HOME key is not used as a backspace button. Rather, the HOME key acts to bring the user back one logical step before the user entered text entry mode. For example, the HOME key brings the user back to the previously displayed screen before the Alternative Text Input Control was invoked. A user who has already entered text in the Alternative Text Input Control may depress the HOME key just once to return to the previous screen, without backspacing over (and thereby losing) all text that has already been selected. The status bar, in hint mode, identifies the HOME key with a "Back" function.

In general, even after returning to the previous screen in response to the HOME key, the device will retain in its memory the text that has already been selected in the Alternative Text Input Control for a particular information field. In this way, the user who is entering information for one information field is provided with a way to correct choices or entries made at previous screen(s) and then resume entering information for the one field without losing data already entered for the one field and without having to first complete the entry of the one field (e.g., by pressing EDIT). More particularly, the user can use a single-click "previous screen" command (namely, HOME) to return to the previous screen (or step-wise to an even earlier screen) for this purpose.

An example can illustrate this capability. Consider a user in the process of adding a new contact record. The user classifies the new contact as a "Business Contact" in a first screen via an Item List Control. He or she next enters and completes the new contact's first name, "John", in a second screen via an Alternative Text Input Control. He then begins inputting the new contact's last name in a third screen via an Alternative Text Input Control. The three screens resemble FIG. 24A and the left-most two screens shown in FIG. 24B, respectively, except that the Alternative Text Input Control is used. At the third screen, without yet pressing EDIT to complete the last name field, the user can push the HOME key once to return to the previous, second screen, without thereby erasing any already-entered text, for example, "Doe". At the second screen, the previously entered first name, "John" is already, automatically displayed and the user can re-edit this text. The user can also push the HOME key again, to return to the next previous, first screen. Once returned to the first screen, the previously chosen entry, "Business Contact", is highlighted and the user can move the highlight to select a new entry, for example, "Personal Contact". Upon receiving the user's corrected selection, the Smart Assistant control again proceeds forward to present screens that are appropriate for the user's corrected (first screen) selection. In particular, the Smart Assistant control first brings up a screen to receive the next field, First Name. The previously entered first name, "John" is already, automatically displayed and the user can re-edit this text. After the user pushes EDIT, then the Smart Assistant control brings up a screen to receive the next field, Last Name, with the previously entered text, "Doe", already, automatically displayed for any further editing.

The usage of the HOME key in the Alternative Text Input Control can be advantageously applied to the previously described method of making corrections. In particular, instead of providing a separate confirmation screen for each field, as shown in, for example, FIGS. 22C and 22D, the Smart Entry Assistant can simply return the user to the actual form that the user used to enter even multiple fields. In general, the user is returned to a screen showing the form, with the entry control for the form's last field invoked. From that entry control, the user can simply press HOME again, to go to the next previous screen, which will typically show the same form with an entry control invoked for editing the next-to-last field (if the form has multiple fields).

b. Exit Confirmation for Smart Entry Assistant Sequence

An exit-confirmation feature is provided to prevent accidental exit by the user from a task of entering a new information record or revising an existing record. To appreciate this feature, it may be useful to recall that as the user enters information through a sequence of forms, which sequentially invoke controls for specific fields, he may traverse these fields and forms in a reverse direction in order to make corrections, without losing information already entered in the sequence of forms. As the user makes this rearward traversal, for example, by repeatedly pressing the HOME key of the Alternative Text Input Control, the optional exit-confirmation feature presents a yes-no confirmation screen just before the user would otherwise exit the sequence of forms altogether. In particular, the confirmation is an item list that can be satisfied using a button (e.g., SELECT) other than the one that the user has been using (e.g., HOME) to cause rearward traversal. In this way, overenthusiastic, repeated pressing of the HOME key will not cause accidental exit (and loss of entered information) from the forms.

c. Alternative Event Entry Sequence

An alternative sequence of smart forms may be used for entering new events that differs from the particular scheme described earlier. To appreciate this alternative sequence, it is helpful to summarize the earlier-described scheme. In the earlier-described scheme, entry of a new event ("Schedule Event") starts with selecting a subject from a softlist of subjects. The softlist includes known subjects (i.e., factory-programmed and previously-user-entered subjects). The choices also include an "other subject" choice for entry of a new subject. Each subject is of a specific type. For existing, known subjects, an icon indicates its type (e.g., a person's head for "meeting", a clock for "event", a calendar for "annual event"). For new subjects, the user chooses an associated type from a list (e.g., a factory-programmed list) of possible event types, and the user enters an associated subject (text) title. One characteristic of this earlier-described scheme is that the softlist of known subjects may become rather long with use, as the user enters ever more subjects. (However, the software may optionally limit the length of the list by choosing only the N most recently used subjects for the softlist.) Another consequence of this old scheme is that if the user desires to use the same text to describe different event subjects (i.e., subjects of different types, e.g., multi-day event AND all-day event), then there may be multiple entries in the softlist of known subjects that have the same text and differ only in their type icons. This may be confusing.

The alternative sequence of smart forms provides improved usability. Under the alternative sequence, entry of a new event (e.g., called "New Event") starts with selecting an event type followed by the selecting of a subject, from a type-dependent softlist of subjects. This type-dependent subject softlist includes all known subjects (i.e., factory-programmed and previously-user-entered subjects) for only the selected event type. The choices also include an "other subject" choice for entry of a new subject for the selected event type. After the event type and event subjects have been thus entered, the appropriate remaining fields are accepted from the user in the previously-described manner. Note that entry of a new subject requires only new text, since the type is already selected. Note also that, preferably, the event types are reorganized such that the "Meeting" type described in a previous section is renamed "Recurring Event", and the sequence of smart forms used by the other types (e.g., "Event" and "All-Day Event" types) are modified to not ask the user for a recurrence pattern.

Smart Assistants: Detailed internal operation

A. Entry into a Smart Assistant

As has been mentioned above, when the user hits the EDIT key from a non-edit (e.g., ordinary navigation) mode, the device generally responds by providing a context-dependent list of possible actions (e.g., in an item list control) for the user's choice or confirmation. For example, if the EDIT key was hit from the top-level view, the choices include New Event, New Contact, New To Do, and New QuickNote. The initial highlight for the choices is also generally context-dependent. For example, if in the top-level view, the Contacts icon was highlighted when the EDIT key was hit, then the New Contact choice is automatically initially highlighted in the item list control. If the EDIT key is initially pressed from within particular modules, the general paradigm for offering context-dependent initial choices is as follows:

(a) If no particular record of the particular module is highlighted prior to the initial EDIT keystroke, then the choices will include just a Smart Assistant for entering a new record. (Smart Assistants are also sometimes referred to as "edit modes," or "wizards".)

(b) If a particular record is displayed in detail (e.g., full page) by itself, then the choices will include just Smart Assistants for modifying the record or following up the record (e.g., creating a new record with fields pre-filled with the old record's values, for edit/confirmation).

(c) If a particular record is highlighted in a displayed summary list of possible multiple records, then the choices will include Smart Assistants for modifying the record, following up the record, or entering a new (unrelated) record.

The following are examples of action choices provided in response to an initial EDIT keystroke from within particular modules. In the following subsections, a context will be described, and then its corresponding choices will be described.

1. Initial Choices in the Calendar Module

Context 1a: Any view in the Calendar module capable of listing multiple events (e.g., Daily view), when a (user-navigable) highlight is on a single listed event.

Choices: Follow Up, Reschedule, Cancel Event, and New Event. Also, Find in Contacts (described in further detail below), if the highlighted event includes a participant (e.g., in its Subject string) that matches a contact in the Contacts module.

Context 1b: Any detailed (e.g., full page) view in the Calendar module of a specific event.

Choices: Follow Up, Reschedule, and Cancel Event. Also, Find in Contacts, if the specific event includes a participant (in its Subject string) that matches a contact in the Contacts module.

Context 1c: Any other view in the Calendar module (e.g., monthly view, weekly view, or daily view without any (user-navigable) highlight on a single event).

Choice: New Event.

2. Initial Choices in the Contacts Module

Context 2a: Any view in the Calendar module capable of listing multiple contacts, when a (user-navigable) highlight is on a single listed contact. (For example, a navigation view using the category tabs with the (user-navigable) highlight on a particular name in the list of names.)

Choices: Meet, Call, Remove, and New Contact.

Context 2b1: Any view of a particular contact in the Contacts module, when a (user-navigable) highlight is on a particular field (generally, from among multiple displayed fields). (For example, the Numbers view that displays all non-empty fields for phone numbers and email and Web addresses, etc.)

Choices: Change <highlighted field name>, Remove <highlighted field name>, New Number, and Display this Number (if the highlighted field is not currently designated as this contact's "Display" field, which is further discussed below for Context 2c).

Context 2b2: Any view of a particular contact in the Contacts module in which no (user-navigable) highlight is to be provided or shown. (For example, the Work Address, Home Address, or Notes views.)

Choices: Change <view's fields' collective name>(e.g., "Change Work Address"), Remove <view's fields' collective name>, and New Number.

Context 2c: Any other view in the Contacts module. (For example, a navigation view using the category tabs before the highlight descends from the tabs onto any particular name in the list of contact names. Note that this list typically includes on each row a contact's name followed by the value of a contact-specific, user-chosen one of the contact's fields, e.g., Work Phone, called the "Display" field.)

Choices: New Contact.

3. Initial Choices in the To Do module (Task List)

Context 3a: Any view in the To Do module capable of listing multiple tasks, when a (user-navigable) highlight is on a single listed To Do item.

Choices: Check Off, Reschedule, Remove, and New To Do. Also, Find in Contacts, if the highlighted To Do item includes a participant (e.g., in its Subject string) that matches a contact in the Contacts module.

Context 3b: Any detailed (e.g., full page) view in the To Do List module of a specific To Do item.

Choices: Check Off, Reschedule, and Remove.

4. Initial Choices in the Memos module

Context 4a: Any view in the Memos module capable of listing multiple memos, when a (user-navigable) highlight is on a single listed memo.

Choices: Append, Remove, and New QuickNote.

Context 4b: Any detailed (e.g., full page) view in the Memos module of a specific memo.

Choices: Append and Remove.

B. The Smart Assistants

Shown below are examples of sequences of particular fields intelligently accepted by particular Smart Entry Assistants and some of the default choices offered for these fields (e.g., via factory-programmed initial soft-lists). The examples below are for contexts that includes a system setting from the user indicating that he or she is to be treated as a "business professional". Other initial choices may be provided along similar lines for other system settings (e.g., in which the user is to be treated as a "student" user or a "home" user, or the like).

1. Smart Assistants for the Calendar Module a. New Event Smart Assistant

This Smart Assistant creates a new event. The fields that this Smart Assistant accepts are as follows.

| Field | Choice(s) (in italics) |
|---|---|
| Type: | Event, Recurring Event, All-Day Event, Multi-Day Event, and Annual Event. |
| Subject: | If Event was chosen for the Type field:<br>Flight, Meeting, Appointment, Presentation, Conference Calls, Conference, Seminar, Interview, and Other Event (i.e., free-form text to add to this softlist for next use).<br>If Recurring Event was chosen for the Type field: |

-continued

| Field | Choice(s) (in italics) |
|---|---|
| | Review, Meeting, Conference Call, Appointment, Report, Presentation, Project Status, and Other Recurring Event.<br>If All-Day Event was chosen for the Type field:<br>Conference, Seminar, Workshop, Off-Site, Trip, Holiday, Day Off, Party, and Other All-Day Event.<br>If Multi-Day Event was chosen for the Type field:<br>Vacation, Conference, Seminar, Trade Show, Trip, Medical Leave, Sabbatical, and Other Multi-Day Event.<br>If Annual Event was chosen for the Type field:<br>Review, Report, Birthday, Anniversaiy, Holiday, Check-Up, and Other Annual Event. |
| Participant: | None, Person in Contacts, Company in Contacts, New Person, and New Company. (The Person in Contacts choice causes the Smart Assistant to invoke a tabbed list control allowing selection of a name from a list of all contacts (from all files) of the Contacts module. The Company in Contacts choice causes the Smart Assistant to invoke a tabbed list control allowing selection of a company name from a list having a row for each contact of the Contacts module, wherein each row lists <company>:<person>(e.g., "Acme Inc.:Smith") for a contact (e.g, Bill Smith of Acme Inc.). The New Person choice causes the Smart Assistant to invoke a form for accepting only limited information for a new contact to be added also into the Contacts module, wherein the limited information includes just first name, last name, and the file from the Contacts module in which to file the new contact. The New Company choice is like the New Person choice, except that the limited information collected for the new contact includes just the company name and the file from the Contacts module. The participant name is appended to the end of the Subject field, prefaced by "with" (e.g., "Meeting with Bill Smith"). |
| Date: | <highlighted/current date>. If a date was highlighted or selected on entry into the Smart Assistant, it is the initial choice to be edited/confirmed. Otherwise, the current (today's) date is the initial choice. |
| Time: | <first free hour of Date, starting with 9am, or if no free hour, 9am>. |
| End Time(/Date): | <Time-plus-1 hr>(1 hour), <Time-plus-1.5 hrs>(1.5 hours), <T+. . . > (2 hours), <T+. . . >(2.5 hours), <T+. . . >(3 hours), <T+. . . >(3.5 hours), <T+. . . >(4 hours), <T+...>(4.5 hours), <T+...>(5 hours), <T+. . . >(5.5 hours), <T+. . . >(6 hours), <T+. . . >(15 minutes), <T+. . . >(30 minutes), and <T+. . . >(45 minutes). For example, if user entered "11:40 pm" for the Time field, the End Time/Date field would show "12:40 am (1 hour)" as the first choice, which corresponds to one hour later, and in this example, into the next day (even if the event was not initially identified as a multi-day event). |
| Reminder: | None, 5 minutes before, 15 minutes before, 30 minutes before, 1 hour before, 2 hours before, 3 hours before, 4 hours before, and 5 hours before. | b. Follow Up (Event) Smart Assistant

This Smart Assistant creates a new follow-up event to an existing event. This Smart Assistant automatically creates the Subject field of the follow-up event by pre-pending "Follow up to" to the existing event's Subject. The other fields that this Smart Assistant accepts are as follows.

| Field | Choice(s) (in italics) |
|---|---|
| Date: | <existing event's end date>. |
| Time: | <existing event's end time>. |
| End Time(/Date): | <Time-plus-1 hr>(1 hour),<br><Time-plus-1.5 hrs>(1.5 hours), . . . |
| Reminder: | None, . . . | c. Reschedule (Event) Smart Assistant

This Smart Assistant reschedules an existing event. The fields that this Smart Assistant accepts are as follows.

| Field | Choice(s) (in italics) |
|---|---|
| Date: | <existing event's start date>. |
| Time: | <existing event's start time>. |
| End Time(/Date): | <Time-plus-1 hr>(1 hour),<br><Time-plus-1.5 hrs>(1.5 hours), . . . | d. Cancel Event Smart Assistant

This Smart Assistant cancels an existing event. It simply asks for yes-no confirmation ("Are you sure?") via an item list control and deletes the event if user confirms "yes".

e. Find in Contacts Smart Assistant

For an existing event with a participant that matches a contact in the Contacts module, this Smart Assistant immediately takes the user to a view (preferably, Numbers view) of the matching contact in the Contacts module. This Smart Assistant is further described in detail elsewhere in this document.

2. Smart Assistants for the Contacts Module a. New Contact Smart Assistant

This Smart Assistant creates a new contact. The fields that this Smart Assistant accepts are as follows.

| Field | Choice(s) (in italics) |
|---|---|
| Contact Type: | Business Contact, Personal Contact, and Company. |
| First Name: | |
| Last: | |
| Category: | <name of file 1 of Contacts module>, <name of file 2 of Contacts module>, . . . |
| Method: | None, Work, Home, E-mail, Work Fax, Home Far, Cell, Car, Pager, Other, Main, and Web. |
| Number: | If a Method choice other than None was selected, then depending on the Method chosen (context), a text input control is invoked with either text character-mode active (if E-mail or Web were selected as the Method choice) or with numbers/symbols-mode active (otherwise). | b. Meet (Contact) Smart Assistant

This Smart Assistant creates a new event that will involve an existing contact as a participant. This Smart Assistant automatically creates the Subject field of the new event by pre-pending "Meet" to the existing contact's name (or, if none, the existing contact's company), e.g., "Meet John Hansen". The other fields that this Smart Assistant accepts are as follows.

| Field | Choice(s) (in italics) |
|---|---|
| Date: | <current date>. |
| Time: | <first free hour of Date, starting with 9 am, or if no free hour; 9 am>. |
| End Time(/Date): | <Time-plus-1 hr>(1 hour), <Time-plus-1.5 hrs>(1.5 hours), . . . |
| Reminder: | None, . . . | c. Call (Contact) Smart Assistant

This Smart Assistant creates a new To Do item (of type Call) that will involve an existing contact as a callee, or participant. This Smart Assistant automatically creates the Subject field of the new event by pre-pending "Call" to the existing contact's name (or, if none, the existing contact's company), e.g., "Call Bob Jones". The other fields that this Smart Assistant accepts are as follows.

| Field | Choice(s) (in italics) |
|---|---|
| Due Date: | No due date, Today, Tomorrow, This Week, Next Week, and Specific date. If the user chooses This Week (or Next Week), the date of the next (or next after next) last-day-of-week is automatically used, wherein last-day-of-week is user-settable to, e.g., Friday, Saturday, or Sunday. If the user chooses Specific date, a date input control is invoked. | d. Remove (Contact) Smart Assistant

This Smart Assistant removes an existing contact. It simply asks for yes-no confirmation ("Are you sure?") via an item list control and deletes the contact if the user confirms "yes".

e. Change <highlighted field name>Smart Assistant

This Smart Assistant simply invokes an appropriate control (e.g., text input control) for editing/confirming the existing value of an existing field.

f. Remove <highlighted field name>Smart Assistant

This Smart Assistant removes an existing field's value. It simply asks for yes-no confirmation ("Are you sure?") via an item list control and resets the existing field's value to null or empty if the user confirms "yes".

g. New Number Smart Assistant

This Smart Assistant accepts a new phone number or email or Web address for an existing contact. The fields that this Smart Assistant accepts are as follows.

| Field | Choice(s) (in italics) |
|---|---|
| Method: | Work, Home, E-mail, Work Fax, Home Fax, Cell, Car, Pager, Other, Main, and Web. (Of these, only the choices corresponding to previously-empty fields are actually offered.) |
| Number: | Depending on the Method chosen (context), a text input control is invoked. | f. Display this Number Smart Assistant

This Smart Assistant designates an existing field as the "Display" field (which will be displayed alongside the contact's name in the navigation view). This Smart Assistant does not ask for confirmation.

h. Change <view's fields' collective name>Smart Assistant

This Smart Assistant invokes an appropriate control to accept input of values for a set of fields. For Change Work Address and Change Home Address, the control is simply a text control for editing/confirming the entire current address displayed as a single string. Once the user has completed modifying/confirming the entire address string, the Smart Assistant parses the string according to standard methods into its constituent fields (Address, City, State, etc.)

3. Smart Assistants for the To Do (Task List) module

The Smart Assistants for the To Do module work in analogous ways to the Smart Assistants discussed in detail above.

a. New To Do Smart Assistant

This Smart Assistant accepts the following fields:

| Field | Choice(s) (in italics) |
|---|---|
| To Do Type: | Task, Call, and Deliverable |
| (If the user selects Task as the To Do Type) | |
| Subject: | Budget review, Business plan, Presentation, Product Demo, Product Review, Project Plan, Research, Review, and Other Task. |
| Due by: | No due date, Today, Tomorrow, This Week, Next Week, and Specific date. |
| (If the user selects Call as the To Do Type) | |
| Call: | Person in Contacts, Company in Contacts, New Person, and New Company. |
| Due by: | No due date, Today, . . . |
| (If the user selects Deliverable as the To Do Type) | |
| Subject: | Report, Review, Plan, Forecast, Proposal, Schedule, Presentation, Gift, and Other Deliverable. |
| Due by: | No due date, Today, |
| For: | Person in Contacts, Company in Contacts, New Person, and New Company. |
| Due by: | No due date, Today, . . . | b. Other Smart Assistants for To Do Module

Other Smart Assistants for the To Do module include Check Off, Remove, and Find in Contacts. These Smart Assistants behave in ways essentially as described above for similarly named Smart Assistants.

4. Smart Assistants for the Memos module

The New QuickNote Smart Assistant invokes a text input control to accept a single field, Text, which may be quite long. The Append Smart Assistant invokes a text input control to edit/confirm an existing memo. The Remove Smart Assistant deletes an existing memo, upon yes-no confirmation by the user.

D. Control flow methodology of Smart Entry Assistant (SEA)

FIGS. 27A–F illustrate a methodology of the present invention for Smart Entry Assistant control flow—that is, the general flow of control for each Smart Entry Assistant. Internally, the system provides a variety of Smart Entry Assistants, used for entering a variety of different information (e.g., new contact, new event, and the like) on a target device. Each assistant is composed of one or more pages. The pages are sequentially arranged, with the user typically starting at a first page and then proceeding to one or more subsequent pages. Each page itself may be "on" or "off", which determines whether the page is currently displayed to the user. Typically, the first page will be turned "on", with subsequent pages being turned either "on" or "off" depending on the user input in prior pages. For example, user input of a particular type on the first page may render certain subsequent pages irrelevant; thus, the system may turn "off" these irrelevant pages, as desired.

Each page itself is composed of individual controls. As previously demonstrated above, each page includes input controls together with a "Next/Back" control (or in the case of the last page, a "Back/Done" control). Like a page, each control on a page can be "on" or "off". In a manner similar to that described for pages, the system may turn "on" or "off" a particular control, based on the then-current state of user input. Thus, irrelevant controls may be removed from display (i.e., made invisible), as desired. Further, each control has an associated value, which corresponds to the input value for that control (e.g., value entered by the user). Also, each control can be "filled" or "unfilled". "Filled" means that the user has entered a value into that field; "unfilled" means that the user has yet to enter any value into that field. The following description will focus on exemplary logic employed for navigating among pages and navigating among individual controls on a given page.

Figure 27A:
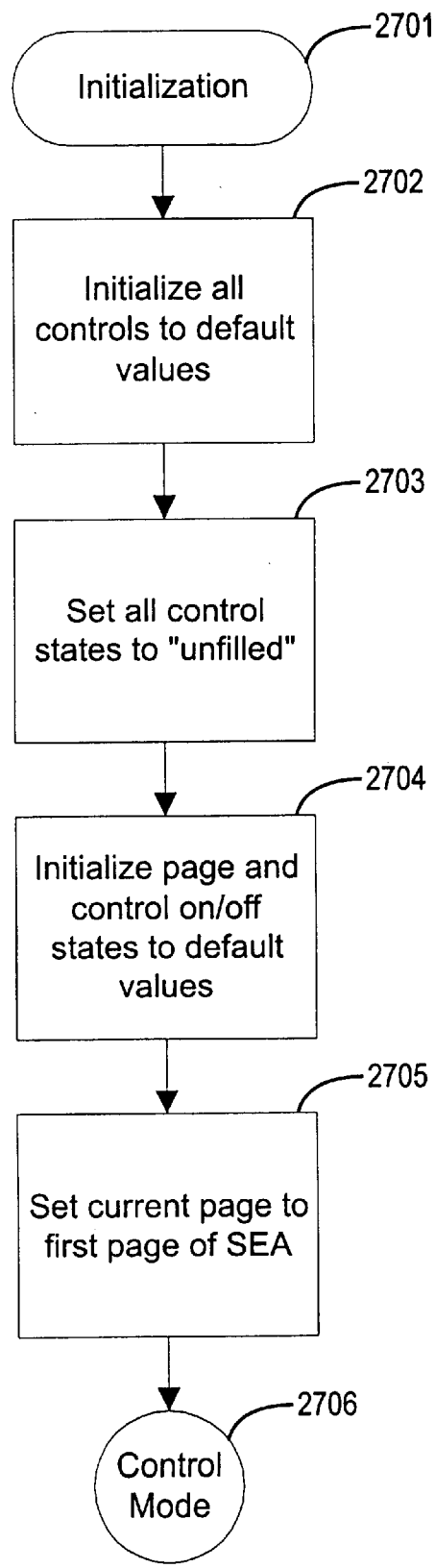
FIG. 27A is a flowchart illustrating a "Smart Entry Assistant" control flow methodology of the present invention.

As shown by FIG. 27A, the methodology begins with an initialization sequence 2700, which begins as indicated by step 2701. Specifically, the method proceeds as follows.

At step 2702, the system initializes all relevant controls to their default values (if any). For a counter control, for example, the system might initialize it to the current date. At step 2703, the states of the individual controls are set to "unfilled". This indicates that the controls, at this point in time, do not yet contain values completed or confirmed by the user. In a similar manner, at step 2704, all pages are initialized to their default values (i.e., initializing each page to either "on" or "off", depending on the page's default value). Then, at step 2705, the method sets the current page (focus) to the first page of the Smart Entry Assistant (SEA). Finally, the method has completed initialization, and now may enter a "Control Mode," as indicated at step 2706.

Before describing the Control Mode, it is helpful to briefly summarize the various context information employed by the Smart Entry Assistant. The system keeps track of a "current control" (i.e., the particular control which currently holds input focus) and a "current page" (i.e., the particular page currently being displayed). Also, the system keeps track of different context "modes." In the currently-preferred embodiment, the system employs four modes: Control Mode, Entry Mode, Next/Back Mode, and Edit Mode. The Control Mode is a transitional mode—a decision state—where the system determines where it is going to go next (i.e., what mode it is to enter next) after an event has occurred. The Entry Mode is a mode where the system receives user input. Here, the user has positioned the cursor at a particular control and is entering input. The Next/Back Mode is a navigational mode where the user has gone through all the (relevant) controls of a page and focus is now at the Next/Back button at the bottom of the screen, for moving among pages. Finally, the Edit Mode is a mode where the user is going to pick a particular control on a page, for entering a correction or making a change.

Figure 27B:
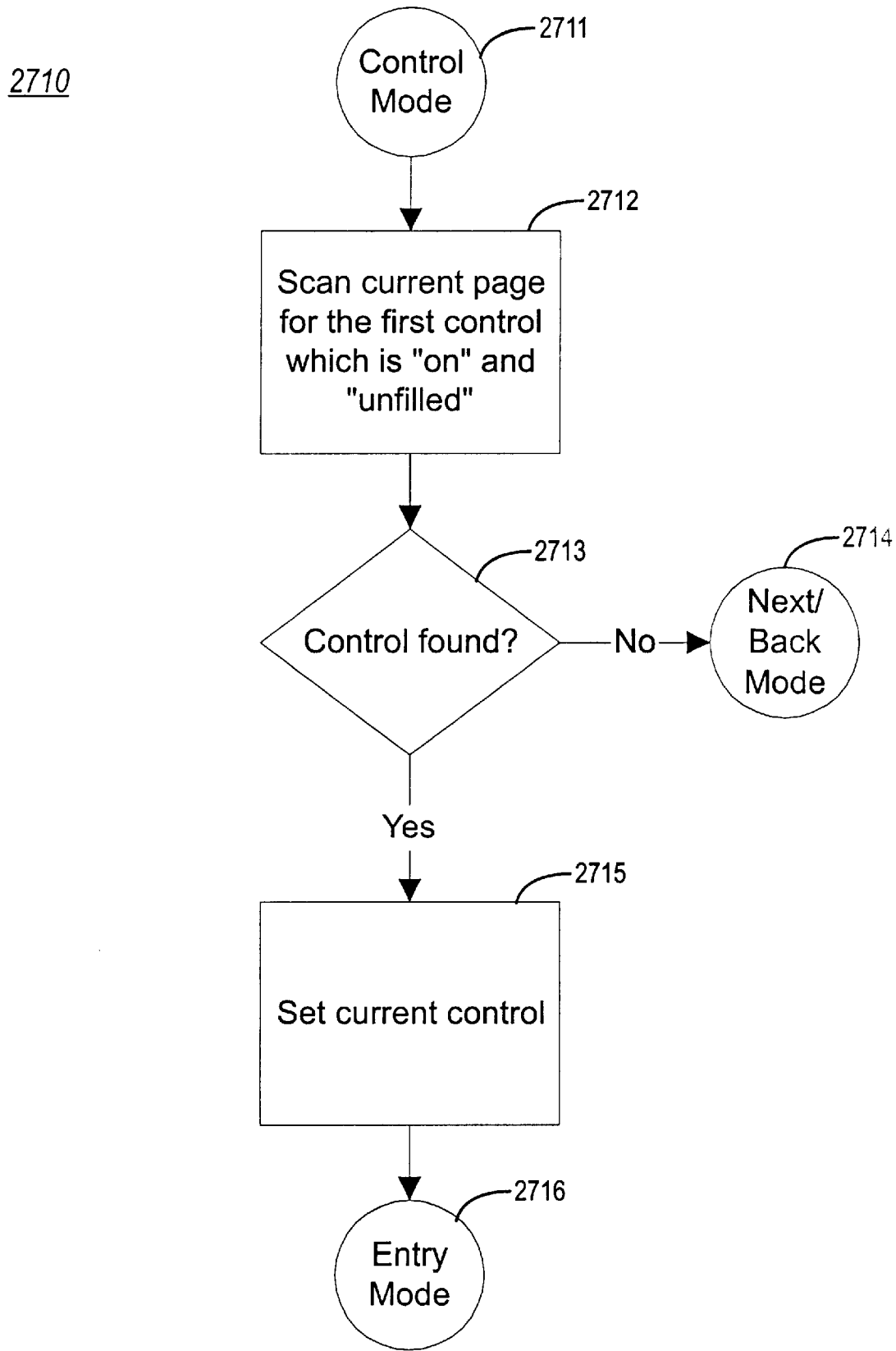
FIG. 27B is a flowchart illustrating a "Control Mode" for the control flow methodology of the present invention.

FIG. 27B illustrates a flowchart 2710 illustrating the basic operation or methodology for the Control Mode. Step 2711 indicates that the system has entered the Control Mode (e.g., after completion of the initialization sequence 2700). At step 2712, the method scans the current page for the first control which is "on" and "unfilled". Note at this point that there may not be a control at the current page meeting these conditions. This is tested at step 2713. The purpose of step 2712 is to find the appropriate control for setting focus, based on the then-current state of user input. If such a control does not exist, then the system will switch into a Next/Back mode. This is especially important in the context of a user returning to a previously-entered control (i.e., one in which the user has already entered information). In such a case, after completion of the change, the system will not make the user navigate back through all the controls that have been "filled". Instead, the method causes the system to switch into navigation mode, as indicated by step 2714. In other words, if there is not a control on the current page that is "on" and "unfilled", then the user has already filled now all relevant controls on that page and may proceed next/back, as desired. By tracking controls that contain values completed/confirmed by the user (using "filled" and "unfilled" flags) and by entering the navigation (Next/Back) mode when appropriate, the method is able to save the user a lot of time with the task of inputting information.

If, on the other hand, there is a control that is "on" and "unfilled", then there is a control on the page that is appropriate for user input. Accordingly (i.e., "yes" at step 2713), the method sets the current control to that control, as indicated at step 2715. Now, the method is ready to switch the system into the Entry Mode. This is indicated at step 2716.

Figure 27C:
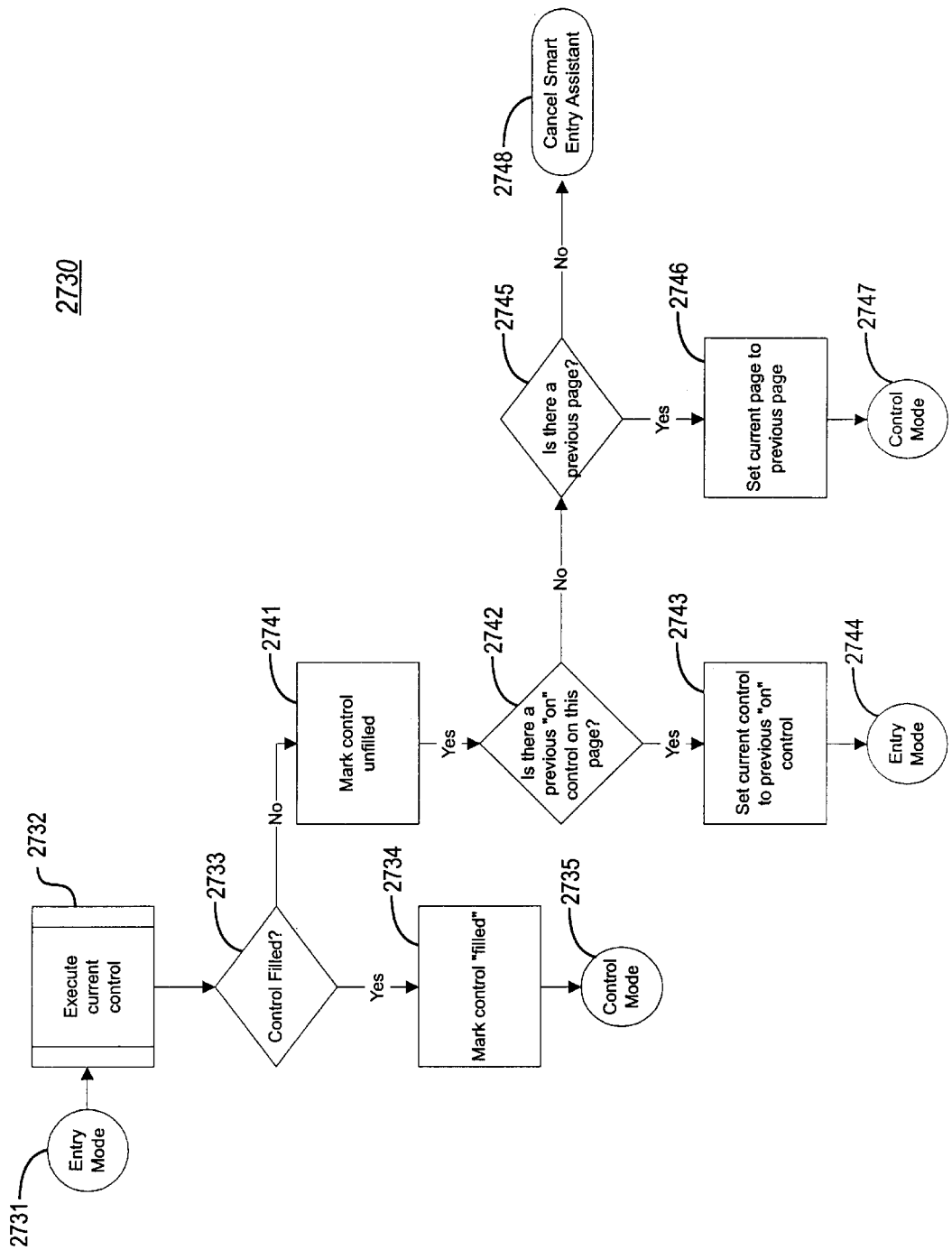
FIG. 27C is a flowchart illustrating an "Entry Mode" for the control flow methodology of the present invention.

FIG. 27C illustrates operation of the method during Entry Mode, as represented by flowchart 2730. Step 2731 indicates that the system has entered Entry Mode. At step 2732, the method simply executes the current control. In other words, the system at this point passes execution control to the control for executing its own logic, which varies from control to control depending on control type (e.g., text input control, calendar control, or the like). Although the individual logic for the various controls differ, at some point execution exits the control. Execution exits in one of two ways: either the control is now "filled" or "unfilled".

Thus, once execution control has returned to the method (i.e., upon exiting step 2732), the method may test, at step 2733, whether the control was "filled". If the control now has completed/confirmed user input (i.e., it was filled by the user), the method marks the control as "filled" at step 2734. Then, at step 2735, the method switches back into the Control Mode (which will effectively take the user down to the next "unfilled" control).

If, on the other hand, the control was not filled (i.e., "no" at step 2733), the method proceeds to step 2741 to mark the control as "unfilled". Situations where the user has provided input but then suspended or canceled the input (e.g., via the HOME key) are also treated as "unfilled". After marking the control as "unfilled", the method proceeds to step 2742 for determining whether there exists a previous "on" control on the current page. If such a control is found (i.e., "yes" at step 2742), then the method proceeds to step 2743 to set the current control (focus) to the previous "on" control. In other words, the method at this point sets focus to the previous control. Now, the method may enter the Entry Mode for providing input to that control, as indicated at step 2744.

If there is no previous "on" control on the page (i.e., "no" at step 2742), the method proceeds to step 2745 for determining whether a previous page exists. If there is no previous page at step 2745, then the user has canceled out of the Smart Entry Assistant, as indicated at step 2748. If there is a previous page, however, the method will switch the system back to that page. This is indicated at step 2746, where the method sets the current page (focus) to the previous page. Now, the method may enter Control Mode, as indicated at step 2747. The Control Mode, as previously described, will function to find the first "unfilled" control on that page. Hence, the particular control that the user ends up on upon entering Control Mode depends on the then-current state of user input. On the other hand, if everything had already been filled on that page, the system would switch into the Next/Back Mode, thereby allowing the user to navigate to another page as appropriate.

Figure 27D:
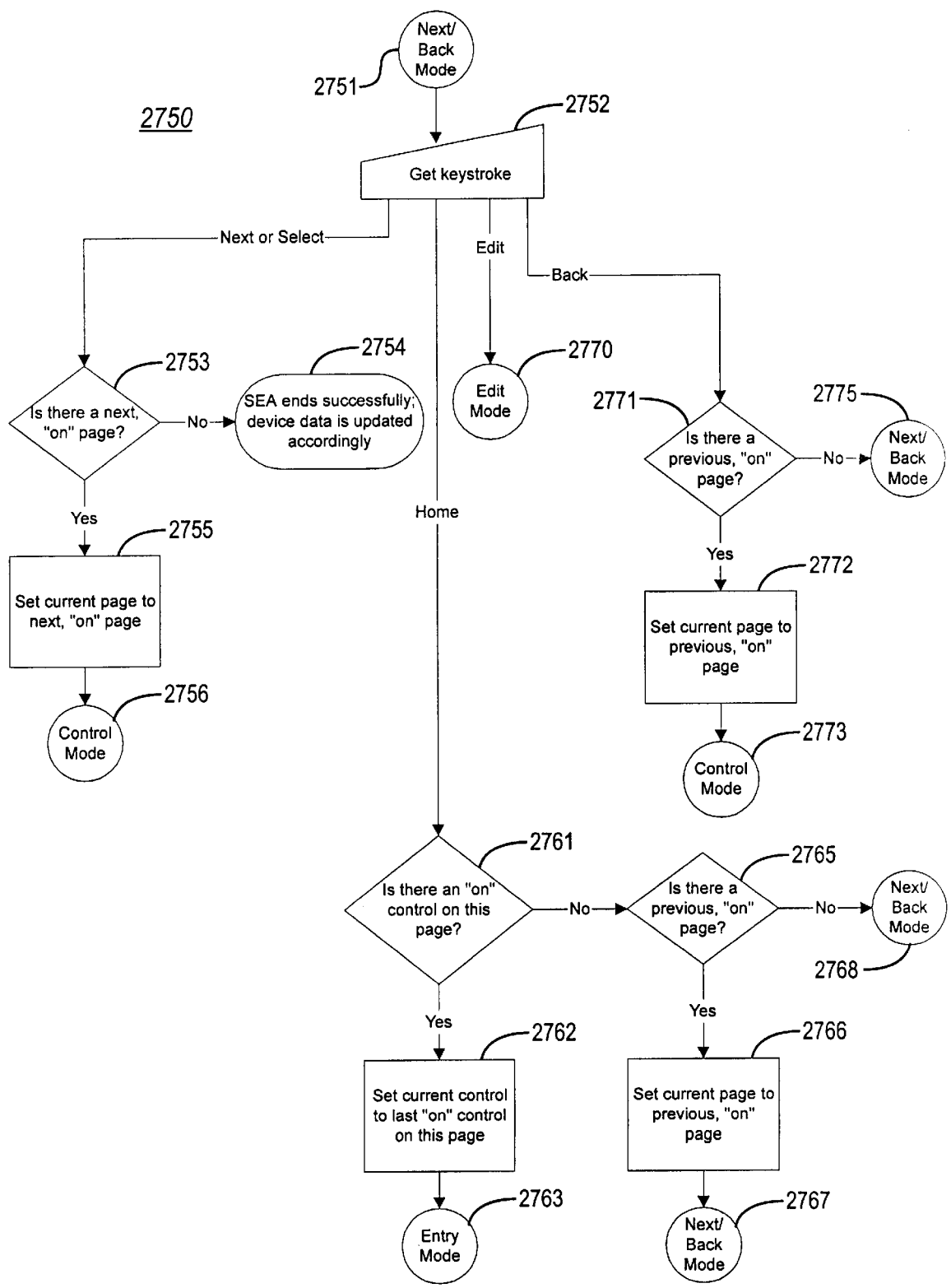
FIG. 27D is a flowchart illustrating a "Next/back Mode" for the control flow methodology of the present invention.

FIG. 27D shows a flowchart 2750 that illustrates operation of the system during Next/Back Mode. Step 2751 illustrates that the system has now entered the Next/Back Mode. The Next/Back Mode arises, for instance, when the system enters Control Mode with no unfilled controls on the current page. During the Next/Back mode there are four basic possibilities that may happen. During the Next/Back mode, the system displays the Next/Back button (arrows) at the bottom of the screen and awaits a user keystroke. The simplest scenario is where the user has selected the Edit key. In this case, the system simply enters Edit Mode, as indicated by the method proceeding to step 2770.

In the event that the user has pressed the Select key or selected the Next screen button, the method proceeds to step 2753 to determine whether there exists a next "on" page (i.e., is there a next page in this sequence that is enabled). If one in fact exists (i.e., "yes" at step 2753), then the method proceeds to step 2755 to set the current page to the next "on" page and then switches back to the Control Mode, as indicated by step 2756. Typically when switching back in this manner, the next page will not have been filled before and, therefore, the system will set control or focus to the first (unfilled) control up on that page. If there is not a next (on) page at step 2753, then the user must be on the last page of the Wizard or Assistant. At this point, the user has effectively selected "Done", thus successfully completing input for the Smart Entry Assistant. Accordingly, the method proceeds to step 2754 to commit the user's inputs by updating the device data, as appropriate. Step 2754 represents, therefore, the completion or finish point for operation of the Smart Entry Assistant.

If the user selects the Back button, the method proceeds to step 2771. Here, the method determines whether there exists a previous "on" page. If such a page does exist, the method sets the current page to that previous "on" page, as indicated by step 2772, and then enter Control Mode, as indicated by step 2773. If, however, there is not a previous "on" page at step 2771, the method simply stays in Next/Back Mode, as shown at step 2775. In effect, nothing happens (i.e., the system remains in the same mode) if there is no previous "on" page.

The last possibility is that the user has selected the Home key. In this case, the method determines whether there exists any "on" control on this (current) page, as indicated by decision step 2761. Typically, there will be a control meeting this condition, as the only page usually not having controls in the preferred embodiment is a Summary page (at the very end). If one is found (i.e., "yes" at step 2761), the method proceeds to set the current control to the last "on" control on this (current) page, regardless of filled status, as indicated at step 2762. This is immediately followed by switching into Entry Mode, as indicated by step 2763.

If there are no "on" controls on this page (i.e., "no" at step 2761), then the method will proceed to step 2765. In the currently-preferred embodiment, this will only happen for a Summary page. At step 2765, the method tests whether there exists a previous "on" page. If there is a previous page (which there typically will be), the system switches back to that page by setting the current page to this previous "on" page, as shown at step 2766, and then reenters the Next/Back Mode, as shown at step 2767. Thus, in other words, hitting the Home key causes the system to jump back to the previous page, if any. In the case where there is no previous "on" page (i.e., "no" at step 2765), the method simply reenters the Next/Back Mode, as indicated by step 2768. In the wizards for the currently-preferred embodiment, this scenario does not arise.

Figure 27E:
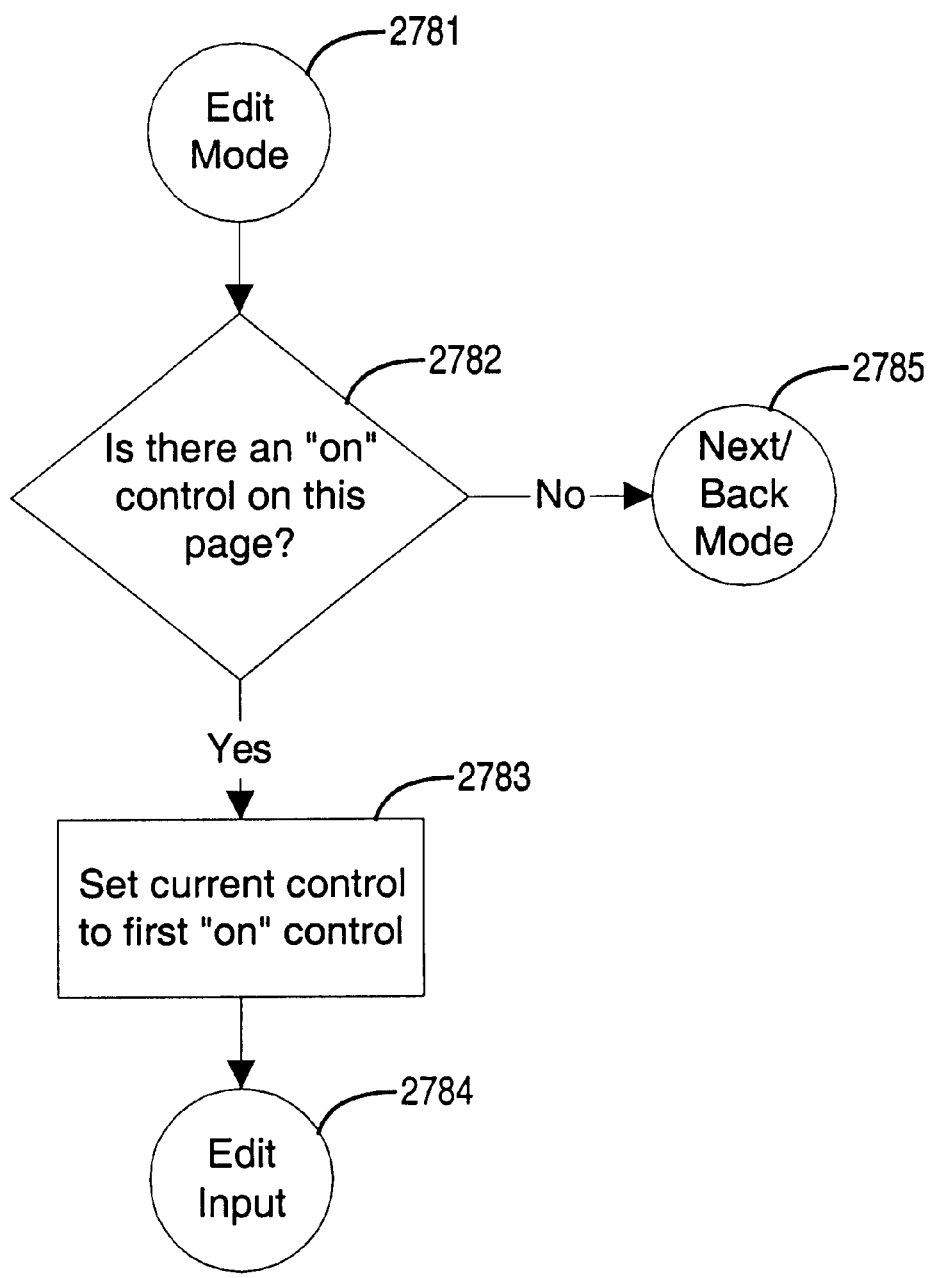
FIG. 27E is a flowchart illustrating an "Edit Mode" for the control flow methodology of the present invention.

FIG. 27E shows a flowchart 2780 that illustrates operation of the Edit Mode. As previously shown, the system only enters this mode when the user has invoked the Edit key during the Next/Back Mode. Here, the user is navigating between pages (i.e., operating the system in Next/Back Mode) and sees something that he or she wishes to edit and, thus, presses the Edit key. In the Edit Mode, the system provides highlighting of descriptive text (e.g., field name) provided next to the control (e.g., field), thus allowing the user to easily pick an appropriate choice. Step 2781 indicates that the system has entered Edit Mode. At step 2782, the method determines whether there exists an "on" control on this (current) page. If there is not one (which only occurs at the Summary page), the system simply returns to the Next/Back Mode, as indicated by step 2785. If there is such a control (which typically will be the case), then the current control is set to be the first enabled (i.e., "on") control, indicated by step 2783, and the system enters an Edit Input loop, as indicated by step 2784.

Figure 27F:
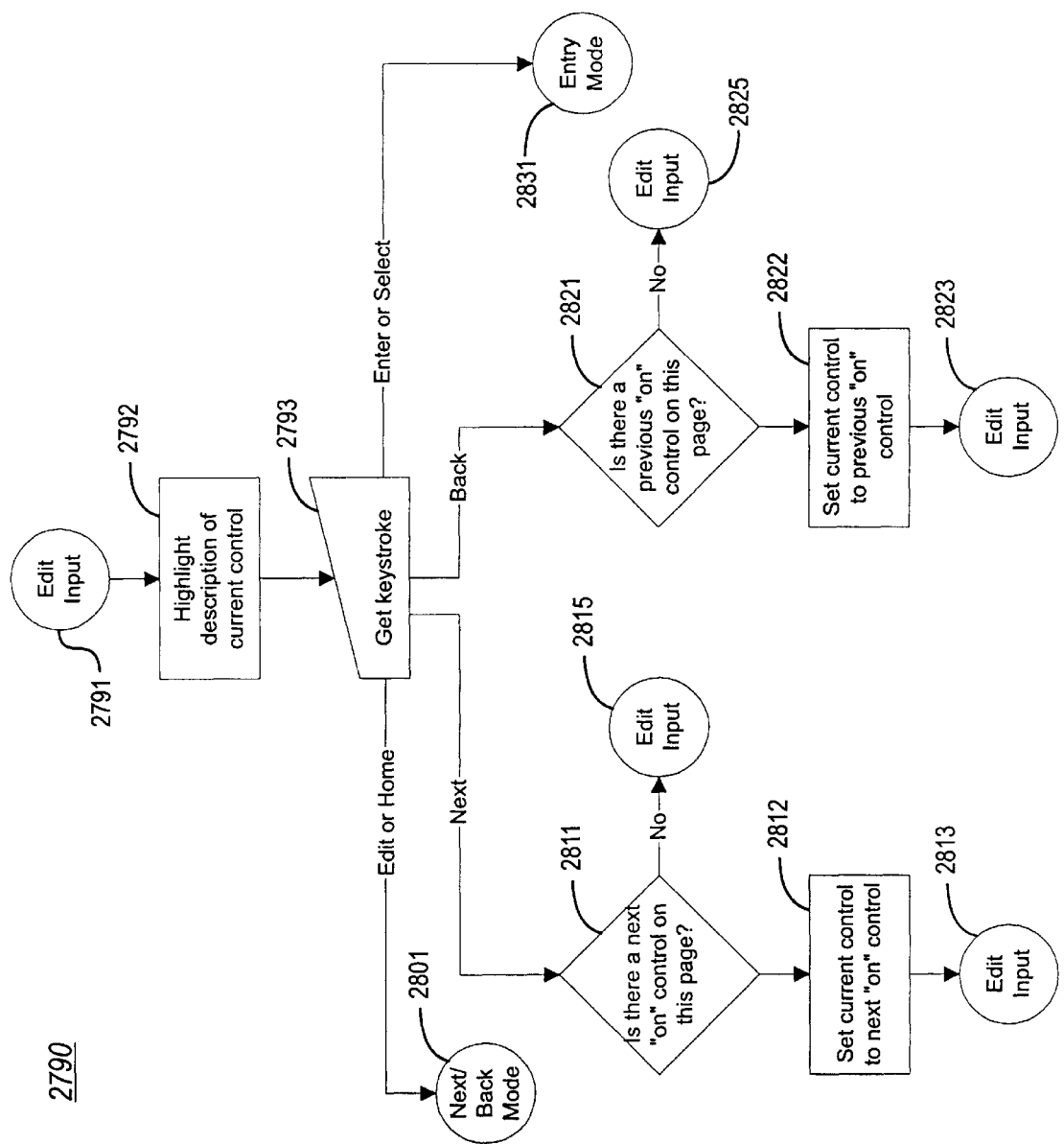
FIG. 27F is a flowchart illustrating an Edit Input processing loop for the control flow methodology of the present invention.

FIG. 27F shows a flowchart 2790 illustrating operation of the system during the Edit Input loop. Step 2791 indicates that the system has entered this loop. At step 2792, the system highlights the description of the current control. This is a visual cue provided by the system that allows the user to complete input by selection, instead of actual data entry. The method proceeds to step 2793, where the system awaits a keystroke. At this point, four input options are available: (1) Edit or Home, (2) Next, (3) Back, and (4) Enter or Select. In the event that the user selects the Next key, the method proceeds to step 2811. Here, the system will determine whether there exists a next "on" control on this (current) page. If such a control is found (which typically will be the case), the method sets the current control to the next "on" control, as indicated at step 2812, and then reenters (loops back to) the Edit Input loop, as indicated at step 2813. If there is not a next "on" control (i.e., "no" at step 2811), the method simply loops, as indicated at step 2815, with no change.

Operation of Back is, essentially, that of Next in reverse. If there exists a previous "on" control on the current page, tested at step 2821, the method sets the current control to that previous "on" control (including highlighting its description), as indicated at step 2822. Thereafter, at step 2823, the method reenters the Edit Input loop. If there is no previous "on" control (i.e., "no" at step 2821), the method simply reenters the Edit Input loop, as indicated at step 2825.

In the event that the user invokes the Edit key or Home key, the system essentially cancels out of the Edit Input loop, by returning to the Next/Back Mode. This is indicated by step 2801. On the other hand, if the user invokes the Enter key or Select key (with the label highlighted), the system switches into the Entry Mode on that control, as indicated by step 2831.

By virtue of the fact that the Control Mode keeps track of control statistics (i.e., keeping track of what controls have been filled), in combination with the above described methodology, the system of the present invention is able to provide intelligent support for light data entry for terse-input devices in a manner that facilitates user input, while eliminating unnecessary navigation for completing input. With just a set of terse input keys, the above described input methodology of the present invention allows users to navigate smoothly among controls, navigate smoothly among pages (i.e., groups of controls), enter data in those controls, and easily cancel out of input.

E. Find in Contacts

Figure 28A:
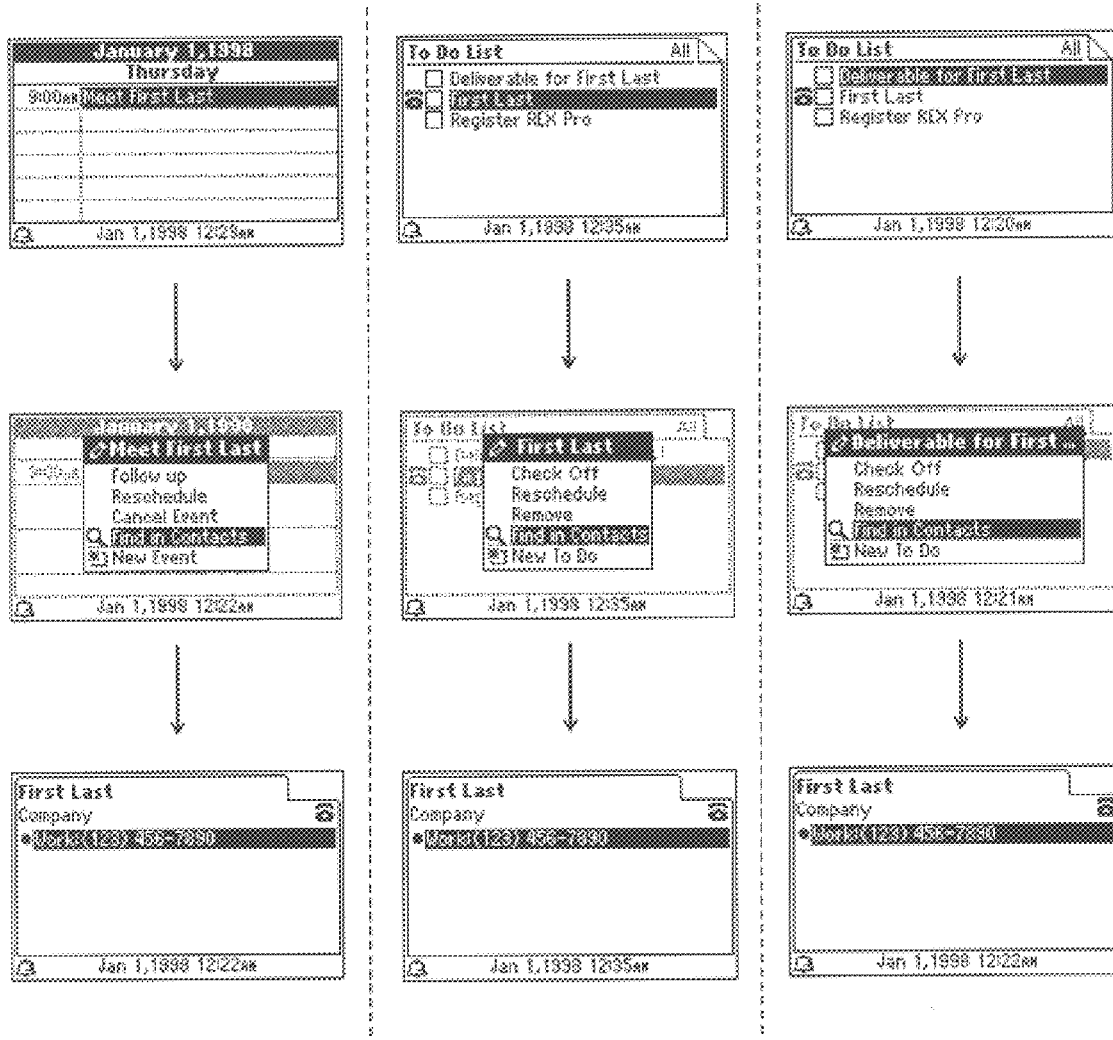
FIGS. 28A–B are bitmap screen shots illustrating a "Find in Contacts" feature of the present invention.

A problem arises when a user is viewing an Event (e.g., a Meeting) or To Do (e.g., a Call or a Task With Deliverable), if that item is planned with a participant. In particular, the user may need to quickly reference that participant's phone, address, or notes information, for example, when entering Event or To Do information, such as illustrated in FIG. 28A. The present invention solves this problem as follows. When an Event or To Do contains the name of a person that exists in Contacts, a "Find in Contacts" menu item is made available to the user, using the Edit menu for that Event or To Do, as shown in the figure. When the user selects the "Find in Contacts" item, regardless of which module the user is viewing, the participant associated with that Meeting, Call, or Task with Deliverable is located in Contacts and displayed to the user.

Figure 28B:
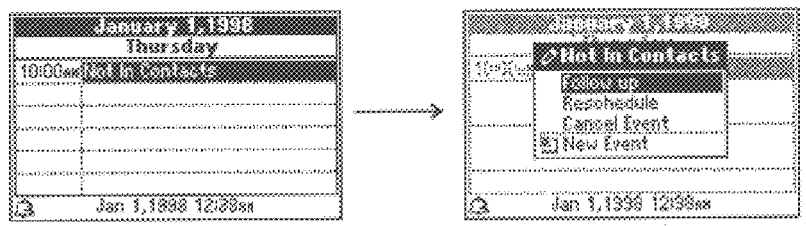

In the preferred embodiment, the "Find in Contacts" menu item is not displayed for Events or To Dos that do not contain a personal name matching an entry in Contacts. In other words, the contact is actually looked up before presenting the menu item. If there is a matching contact, the "Find in Contacts" selection immediately jumps the user to that contact. If there is no matching contact, the user is not even presented with the menu item. FIG. 28B illustrates this scenario with a "Not in Contacts" entry. As shown, the pop-up menu does not include a "Find in Contacts" choice.

This is helpful so that the system can present only the menu selections that are valid, in order to save the user from entering keypresses to attempt to look up an invalid item. As an additional time-saving feature, the device begins searching the Contacts module for names or company names that match word(s) in an Event's or To Do's Subject string as soon as any single listed Event or To Do is highlighted during navigation, just in case the user decides to press EDIT. This searching happens automatically "in the background" without needing the user's awareness. The search may optionally be limited to the last words in an Event following the word "with" or "Meet" (e.g., the last words in "Interview with Bill Jones" or "Meet Bob Smith") or the last words following the word "for" in a To Do of type Task With Deliverable (e.g., the last words in "Report for Acme Corp.") or the last words in a To Do of type Call (e.g., the last, and only, words in "Bob Smith").

While the invention is described in some detail with specific reference to a preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a portable information processing device capable of providing selective viewing of information via a graphical user interface, wherein the user interface includes a plurality of available views, a method for accepting input by a user to affect content of the information, the method comprising:

providing a terse set of input keys for inputting first commands that are capable of being invoked by the user for controlling viewing of the information;

accepting invocations of the first commands by the user;

responsive to the invocations of the first commands, selectively providing views, from among the plurality of views, for display to the user;

providing a dedicated physical edit key that is capable of being invoked by the user while any one of multiple views of the plurality of views is displayed, wherein the key is substantially dedicated to initiating an edit mode for the device wherein user input is received to affect content of the information, and at least some of the multiple views are for ordinary user viewing of portions of the information;

responsive to input received at the edit key from the user while one of the multiple views is displayed invoking said edit mode for the device;

determining, based on a context, a set of context-appropriate user input activities for affecting content of the information, wherein the context includes the particular one view displayed when the input at the key was accepted; and the determined set of user input activities would have been different had a particular other view, of the multiple views, been displayed when the input at the key was accepted;

while in said edit mode for the device, accepting input from the user for indicating a desired one of the user input activities; and in response to the input received while in said edit mode, displaying user-selectable information that the user may select as user input, thereby assisting the user in performing the desired user input activity that affects content of the information.

2. The method of claim 1 further comprising, prior to the step of accepting input from the user for indicating the desired activity, communicating the determined context-appropriate user input activities to the user.

3. The method of claim 2 wherein the step of communicating the determined context-appropriate user input activities comprises suppressing context-inappropriate user input activities from being communicated to the user.

4. The method of claim 1 wherein the step of selectively providing views for display to the user comprises providing views via a display no larger than about the area of a credit card.

5. A portable information processing device with improved user input capability, for viewing and possible altering of information by a user, the device comprising:

a microprocessor;

a memory;

a display for displaying views from a plurality of views, including views for displaying portions of the information;

a physical input key that is substantially dedicated to initiating a mode for user alteration of the information, wherein the input key remains visible to the user substantially throughout ordinary use of the device;

logic operating to react to a user input at the input key when a view is being displayed by determining, based on the particular displayed view, referred to hereinafter as the context-view, a set of context-appropriate user input activities for altering the information, including displaying user-selectable information that may serve as user input for the alteration of said information, wherein a user input activity that is context-appropriate for a first possible context-view is context-inappropriate for a second possible context-view; and logic operating to communicate at least some of the determined context-appropriate user input activities to the user;

logic operating to accept from the user an indication of a desired one of the determined context-appropriate user input activities, and logic operating to assist the user in performing the desired user input activity.

6. In a portable information processing device capable of providing selective viewing of information via a graphical user interface, wherein the information includes records grouped into multiple modules, and the user interface includes a plurality of available views, a method for accepting input by a user to alter the information, the method comprising:

providing first commands that are capable of being invoked by the user for controlling viewing of the information;

accepting invocations of the first commands by the user;

responsive to the invocations of the first commands, selectively providing views, from among the plurality of views, for display to the user;

providing a second command from a continually-available, dedicated edit key that is capable of being invoked by the user while any one of multiple views of the plurality of views is displayed, wherein the second command is predominantly for initiating user input to affect content of the information, and form of the second command is consistent regardless of which of the multiple views is then displayed, and at least some of the multiple views include portions of the information for display;

accepting an invocation of the second command by the user while one of the multiple views is displayed, herein referred to as the context-view;

determining a set of context-appropriate user input activities for altering the information, wherein the determining step comprises:

determining a first set of user input activities as the set of context-appropriate activities, if the context-view relates primarily to a first module of the modules; and determining a second set of user input activities as the set of context-appropriate activities, if the context-view relates primarily to a second module of the modules;

wherein the first and second modules are different modules, and the first and second sets of activities are not identical;

communicating the determined context-appropriate user input activities to the user and suppressing context-inappropriate user input activities from being communicated to the user;

accepting from the user an indication of a desired one of the user input activities; and in response to the indication, assisting the user in performing the desired user input activity, including displaying user-selectable information that may serve as user input for altering said content of the information.

7. The method of claim 6 wherein the step of determining the set of context-appropriate user input activities further comprises determining a third set of user input activities as the set of context-appropriate activities, if the context-view is a module-selector view that does not relate primarily to any particular one of the plurality of views; wherein the third set of activities is not identical to either of the first or second sets of activities.

8. The method of claim 6 wherein the multiple views include a first view in which attention is focused on a particular record, and the step of determining the first set of user input activities comprises determining the first set of user input activities to include a selected one of deletion of the focused-on record and modification of the focused-on record, if the context-view is the first view.

9. The method of claim 6 wherein the first view is either:
a view displaying data for only the focused-on record, or
a view displaying indicators for a plurality of records including the focused-on record, in which a focus indicator indicates the focused-on record for the user.

10. In a device for processing information, a method for alerting a user of availability of information from a related data set that corresponds to information currently present in an input form having at least one input control that is receiving user input:

maintaining a first set of information comprising a plurality of information records;

displaying an input form for entering input for a second set of information, said second set of information being maintained separately and independently from said first set of information, said input form having at least one input control for inputting information by the user;

based on information already present at said at least one input control, attempting to locate in the first set of information a particular information record that corresponds to information currently present in said at least one input control;

if a particular corresponding information record is located, indicating to the user that corresponding information is available; and if a particular corresponding information record is not located, refraining from indicating to the user that corresponding information is available.

11. The method of claim 10, wherein said first set of information comprises contact information.

12. The method of claim 11, wherein said contact information includes name and address information for different contacts.

13. The method of claim 10, wherein said second set of information comprises scheduling information.

14. The method of claim 13, wherein said scheduling information includes a selected one of meeting, phone call, and to do task-based information.

15. The method of claim 10, wherein said step of indicating to the user that corresponding information is available further comprises:

displaying a control on the form allowing the user to invoke display of the particular corresponding information record.

16. The method of claim 15, wherein said step of refraining from indicating to the user that corresponding information is available further comprises:

removing from display the control on the form that allows the user to invoke display of a corresponding information record.

17. The method of claim 15, wherein the control on the form that allows the user to invoke display of a corresponding information record comprises a menu choice that is displayed in a pop-up menu.

18. The method of claim 10, wherein said particular corresponding information record is located based on name information currently displayed at said at least one control.

19. The method of claim 18, wherein said name information is automatically extracted from another text string within which the name information appears.

20. The method of claim 10, wherein said attempting to locate step occurs without the user's awareness.

* * * * *